US010522983B2

(12) United States Patent
Bertini et al.

(10) Patent No.: US 10,522,983 B2
(45) Date of Patent: Dec. 31, 2019

(54) INJECTION ELECTRICAL CONNECTOR

(71) Applicant: Novinium, Inc., Kent, WA (US)

(72) Inventors: Glen J. Bertini, Fox Island, WA (US); Donald R. Songras, Kent, WA (US); Glenn J. Luzzi, Mt. Bethel, PA (US)

(73) Assignees: NOVINIUM, INC., Kent, WA (US); RICHARDS MFG, CO., Irvington, NJ (US)

( * ) Notice: Subject to any disclaimer, the term of this patent is extended or adjusted under 35 U.S.C. 154(b) by 0 days.

(21) Appl. No.: 15/581,585

(22) Filed: Apr. 28, 2017

(65) Prior Publication Data

US 2017/0317478 A1 Nov. 2, 2017

Related U.S. Application Data

(60) Provisional application No. 62/329,132, filed on Apr. 28, 2016.

(51) Int. Cl.
*H02G 1/00* (2006.01)
*F16K 1/36* (2006.01)
(Continued)

(52) U.S. Cl.
CPC ......... *H02G 1/00* (2013.01); *B29C 45/14639* (2013.01); *B29C 45/20* (2013.01);
(Continued)

(58) Field of Classification Search
CPC . H01B 17/28; H01B 7/29; H01B 3/20; H01B 3/22; H01B 7/282; H01B 9/06;
(Continued)

(56) References Cited

U.S. PATENT DOCUMENTS 131,073 A 9/1872 Woodward
205,566 A 7/1878 Miller
(Continued)

FOREIGN PATENT DOCUMENTS

EP 0059733 11/1985

OTHER PUBLICATIONS

Final Office Action, dated May 31, 2018, received in U.S. Appl. No. 15/581,405.
(Continued)

*Primary Examiner* — Pete T Lee
(74) *Attorney, Agent, or Firm* — Davis Wright Tremaine LLP; Heather M. Colburn

(57) ABSTRACT

A cable accessory for injecting fluid into a cable. The accessory has first and second ends configured to be coupled to the cable and an external cable accessory, respectively. The accessory has an injection port configured to introduce the fluid to a stranded conductor of the cable. The accessory may include a body and conductive rod. The body defines a through-channel configured to receive the conductor. The rod has a first portion that extends outwardly from the second end to be received inside the external cable accessory and to form an electrical connection therewith. The rod has a second portion configured to be coupled to the conductor and form an electrical connection therewith. The second portion (with the conductor coupled thereto) is positionable inside the through-channel with the first portion extending outward from the second end. The fluid is injectable into the conductor through injection port, which extends into the through-channel.

30 Claims, 34 Drawing Sheets

(51) Int. Cl.
*H02G 1/16* (2006.01)
*H01B 7/28* (2006.01)
*H02G 15/013* (2006.01)
*B29C 45/14* (2006.01)
*B29C 45/20* (2006.01)
*F16K 15/02* (2006.01)
*F16K 15/18* (2006.01)
*B29K 101/12* (2006.01)
*B29L 31/34* (2006.01)

(52) U.S. Cl.
CPC ............. *F16K 1/36* (2013.01); *F16K 15/021* (2013.01); *F16K 15/18* (2013.01); *H01B 7/2813* (2013.01); *H02G 1/16* (2013.01); *H02G 15/013* (2013.01); *B29K 2101/12* (2013.01); *B29L 2031/3462* (2013.01)

(58) Field of Classification Search
CPC ........ H02G 15/20; H02G 15/34; H02G 15/22; H02G 15/23; H02G 15/02; H02G 15/04; H01J 5/20; H01J 5/30; H05K 5/06; H05K 5/00
See application file for complete search history.

(56) References Cited

U.S. PATENT DOCUMENTS

| | | |
|---|---|---|
| 711,792 A | 10/1902 | Smith |
| 1,246,892 A | 3/1917 | Donnelly |
| 1,667,590 A | 4/1928 | Donnelly |
| 2,072,742 A | 3/1937 | Luigi |
| 2,180,425 A | 11/1939 | Meyer |
| 2,261,742 A | 11/1941 | Matsumoto |
| 2,960,998 A | 11/1960 | Sinker et al. |
| 3,664,371 A | 5/1972 | Schneider |
| 3,726,008 A | 4/1973 | Buroni |
| 3,731,905 A | 5/1973 | Piet |
| 4,107,454 A | 8/1978 | Jakobsen |
| 4,403,110 A * | 9/1983 | Morrisette ............. H02G 15/18 174/76 |
| 4,477,376 A | 10/1984 | Gold |
| 4,478,587 A | 10/1984 | Mackal |
| 4,615,722 A | 10/1986 | Steffan et al. |
| 4,691,734 A | 9/1987 | Fort |
| 4,763,562 A | 8/1988 | Haytayan |
| 4,766,628 A | 8/1988 | Walker |
| 4,946,393 A * | 8/1990 | Borgstrom ............. H01R 13/53 324/122 |
| 5,479,960 A | 1/1996 | Kirkman |
| 5,589,666 A | 12/1996 | Decarlo et al. |
| 5,931,190 A | 8/1999 | Engstrom |
| 6,332,785 B1 | 12/2001 | Muench, Jr. et al. |
| 6,338,637 B1 | 1/2002 | Muench, Jr. et al. |
| 6,489,554 B1 | 12/2002 | Bertini et al. |
| 6,517,366 B2 | 2/2003 | Bertini et al. |
| 6,623,012 B1 | 9/2003 | Perry et al. |
| 6,719,003 B2 | 4/2004 | Schroeder et al. |
| 6,796,545 B2 | 9/2004 | Enzaki et al. |
| 7,004,186 B2 | 2/2006 | Ferrel |
| 7,104,822 B2 | 9/2006 | Jazowski et al. |
| 7,168,446 B2 | 1/2007 | Chalk et al. |
| 7,195,504 B2 | 3/2007 | Bertini et al. |
| 7,256,350 B2 | 8/2007 | Stagi et al. |
| 7,288,718 B2 | 10/2007 | Stepniak et al. |
| 7,331,806 B2 | 2/2008 | Stagi et al. |
| 7,344,396 B2 | 3/2008 | Stagi et al. |
| 7,353,601 B1 | 4/2008 | Bertini |
| 7,410,145 B1 | 8/2008 | Elze et al. |
| 7,538,274 B2 | 5/2009 | Bertini et al. |
| 7,611,748 B2 | 11/2009 | Bertini |
| 7,704,087 B1 | 4/2010 | Stagi et al. |
| 7,708,025 B2 | 5/2010 | Johnson |
| 7,723,611 B2 | 5/2010 | Stagi et al. |
| 7,878,849 B2 * | 2/2011 | Hughes ................. H01R 11/26 439/578 |
| 7,958,631 B2 | 6/2011 | Hughes et al. |
| 7,976,747 B2 | 7/2011 | Bertini |
| 8,205,326 B2 | 6/2012 | Bertini et al. |
| 8,475,194 B2 | 7/2013 | Bertini et al. |
| 8,539,975 B2 | 9/2013 | Schroeder et al. |
| 8,550,102 B2 | 10/2013 | Small |
| 8,656,586 B2 | 2/2014 | Bertini et al. |
| 8,893,745 B2 | 11/2014 | Voss |
| 9,163,737 B2 | 10/2015 | Andersson |
| 9,416,885 B2 | 8/2016 | Andersen et al. |
| 9,435,449 B2 | 9/2016 | Shelly |
| 9,505,334 B2 | 11/2016 | Maness et al. |
| 2008/0173467 A1 | 7/2008 | Bertini et al. |
| 2011/0244702 A1 * | 10/2011 | Bertini ................. H01R 13/005 439/190 |
| 2012/0171900 A1 * | 7/2012 | Sebald ................ B60L 11/1818 439/626 |
| 2012/0227839 A1 | 9/2012 | Veit |
| 2013/0037739 A1 | 2/2013 | Millard |
| 2013/0068497 A1 | 3/2013 | Cinquemani et al. |
| 2015/0004843 A1 | 1/2015 | Siebens et al. |

OTHER PUBLICATIONS

Non-Final Office Action, dated Jul. 26, 2018, received in U.S. Appl. No. 15/581,890.
International Search Report and Written Opinion, dated Aug. 30, 2016, received in International Application No. PCT/US2016/035934.
Non-Final Office Action, dated Oct. 20, 2017, received in U.S. Appl. No. 15/581,405.
Information Disclosure Statement Transmittal filed herewith.
Notice of Allowance, dated Sep. 21, 2018, received in U.S. Appl. No. 15/581,496.
Notice of Allowance, dated Oct. 26, 2018, received in U.S. Appl. No. 15/581,405.
Notice of Allowance, dated May 2, 2019, received in U.S. Appl. No. 15/581,890.
Notice of Allowance, dated Aug. 1, 2019, received in U.S. Appl. No. 15/581,595.
U.S. Pat. No. 131,073, patented Sep. 3, 1872, issued to Woodard.
U.S. Pat. No. 205,566, patented Jul. 2, 1878, issued to Miller.
U.S. Pat. No. 711,792, patented Oct. 21, 1902, issued to Smith.

* cited by examiner

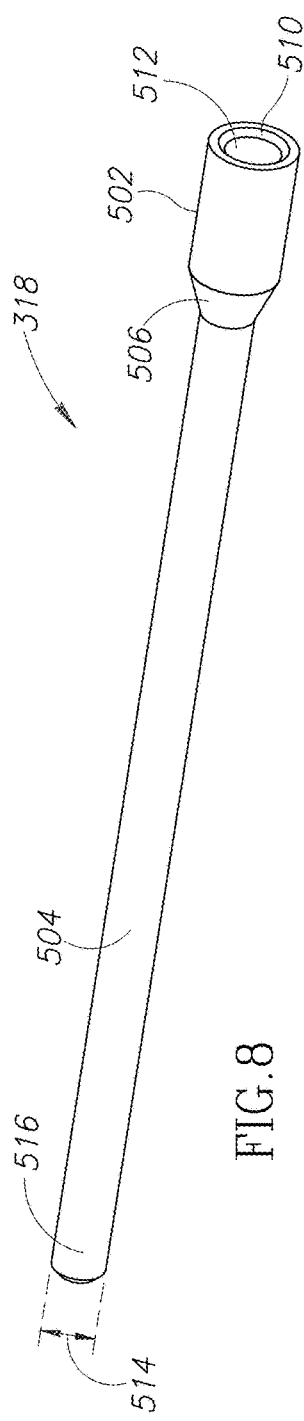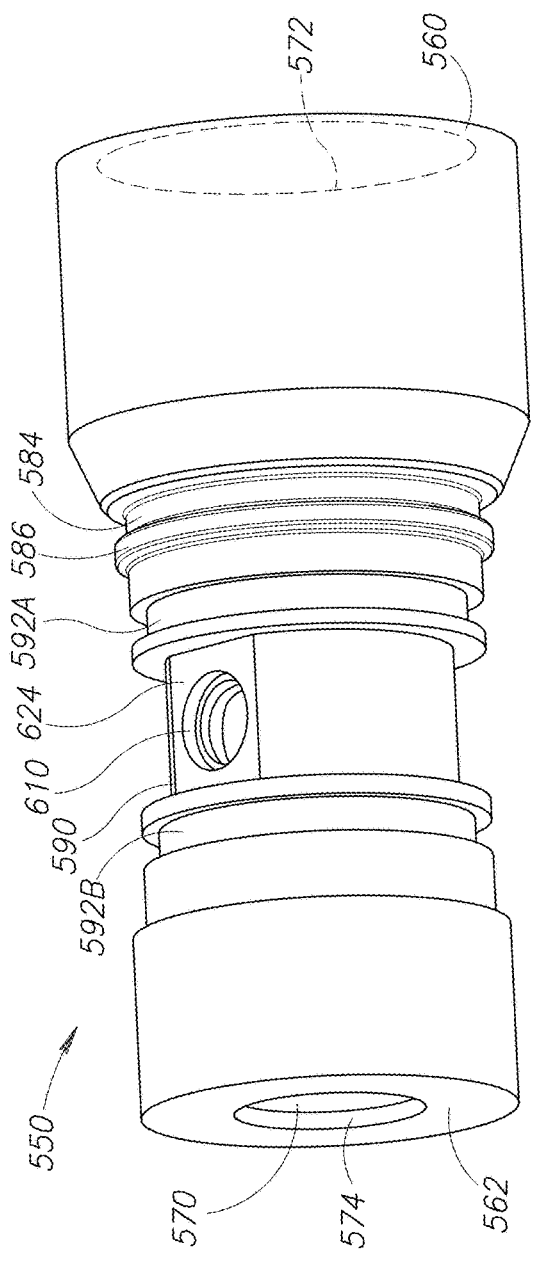
FIG.8
FIG.9

INJECTION ELECTRICAL CONNECTOR

CROSS REFERENCE TO RELATED APPLICATION(S)

This application claims the benefit of U.S. Provisional Application No. 62/329,132, filed on Apr. 28, 2016, which is incorporated herein by reference in its entirety.

BACKGROUND OF THE INVENTION

Field of the Invention

The present invention is directed generally to components used with medium voltage electrical power cables and, more particularly, to components used to inject a fluid into an interior of a cable.

Description of the Related Art

A known problem that occurs in power cables (e.g., medium voltage solid dielectric power cables in underground distribution networks) is the formation of concentrations of moisture, sometimes referred to as "water trees," in the insulation that surrounds the cable conductor (e.g., twisted wire strands). This dielectric breakdown is generally attributed to a "treeing" phenomena (i.e., formation of oxidized polymer in dendritic patterns within the insulation material that resemble trees), which leads to a progressive degradation of the cable's insulation.

Treatment fluids (e.g., phenylmethyldialkoxysilane, dimethyldialkoxysilane, tolylethylmethyldialkoxysilane, cyanobutylmethyldialkoxysilane, and the like) have been developed that are injected into the interior of the cable, diffuse into the insulation, and interact with the moisture in the micro-voids. This process is sometimes referred to as cable rejuvenation. To inject the treatment fluid, an injection port must be installed that provides fluid communication with the interior of the cable. For example, U.S. Pat. Nos. 7,195,504 and 7,538,274 describe injection adapters suitable for Sustained Pressure injection of rejuvenation treatment fluid into a power cable. Sustained Pressure Rejuvenation ("SPR") differs from earlier injection methods because the injection occurs at higher pressures, typically greater than 30 psi, and the pressure is sealed inside the cable, and sustained therein, when injection has been completed. Such SPR injection is generally performed on de-energized cables. However, SPR injection may be used on energized cables terminated at both ends by live-front terminators that allow physical fluid access to the interior of the cable.

There are times when it is desirable to introduce a treatment fluid into and withdraw a treatment fluid from an energized cable having at least one dead-front termination (e.g., when rejuvenating a cable with a dielectric enhancement fluid). This is typically done at dead-front terminations implemented using dead front injection elbows, such as those described by U.S. Pat. Nos. 4,946,393 and 6,332,785. But it can also be done at single piece injection splices and modular injection splices, which each have an injection port. Cable accessories that include an injection port are generally referred to hereinafter as "injection components."

Unfortunately, currently available dead front injection components (e.g., dead front injection elbows and injection splices) used to introduce a restorative fluid into a cable's interior suffer from at least one or more of the following eight shortcomings.

First, because the treatment fluid comes into intimate contact with the entirety of the annular interior of the injection component, a portion of the treatment fluid is wasted. Injection components typically include a semi-conductive insert, a surrounding layer of insulation, and a semi-conductive exterior layer. Unfortunately, a significant wasted portion of the treatment fluid injected into the injection component permeates into the semi-conductive insert, the surrounding layer of insulation, and the semi-conductive exterior layer. Further, at least some of the wasted portion exits the injection component into the surrounding environment, and represents a significant fluid loss. Depending upon cable geometry, fluid delivery method, injection pressure, and operating temperature, this loss may range from about 5% to about 15% of the treatment fluid supplied to the injection component. Further, this loss could exceed 15%.

Second, the treatment fluid may cause subcomponents of the injection component to swell and exceed desired tolerances and/or fail. For example, the treatment fluid may cause ethylene propylene diene monomer ("EPDM") rubber and ethylene propylene rubber ("EPR"), the most common polymers used in injection components, to swell in excess of $40\%_w$ at cable operating temperatures above about 50° C. This is a larger factor when a soak period is utilized (e.g., in small cables) to provide sufficient fluid to the interiors of the cables. An injection component experiencing such swelling will no longer meet industry standard dimensional requirements, such as those of IEEE 386™. Further, the treatment fluid may cause silicone rubber (often used to construct cable termination and splicing accessories) to swell in excess of $40\%_w$, at ambient temperatures of about 20° C. Swelling to these extents can lead to failure of the component.

Third, currently available injection components limit maximum injection pressures to a level that is less than optimum for cable rejuvenation. Cable accessories (e.g., elbows and splices) that have been designed to accommodate fluid injection rely on an interference fit between the cable accessory and the cable insulation to retain fluid pressure. Generally this interface cannot contain pressures in excess of 30 psi. On the other hand, testing has shown that cable insulation can withstand pressures up to 1000 psi (dependent on configuration and insulation material) and that using higher pressures improves the quality of the treatment. Bertini & Keitges, "Silicone Injection: Better with Pressure," ICC, Sub. A., May 19, 2009.

Fourth, externally applied conventional hose clamps that compromise the electrical integrity of the injection component are required to operate the injection component at higher pressures. Currently utilized injectable components can withstand a maximum internal pressure within a range of about 5 psig to about 30 psig depending upon the size of the cable, the design of the injection component, operating temperature, and the materials used to construct the injection component. Often, to operate at the higher end of this range, an external hose clamp is applied to the injection component to counteract hoop stress caused by the fluid pressure. Unfortunately, the hose clamp deforms the injection component and compromises the electrical integrity of the injection component. Additionally, the hose clamps are typically left in place, and creep over time, which further compromises the electrical integrity of the injection component. While these hose clamps may be removed after the treatment is completed, doing so requires an additional visit to the cable termination, which increases both expense and risk of injury.

Fifth, a portion of the treatment fluid may leak from the branch of a treatment elbow that houses the probe pin. Injection elbows are the most common dead-front components used to inject treatment fluid into a cable. An O-ring or D-ring seal is conventionally applied to the base of the probe pin to prevent fluid from leaking out of the branch of the elbow housing the probe pin and into the environment or a mated bushing. Unfortunately, this seal has been known to leak, causing damage to bushings, and creating a fire or explosion hazard. This problem is described in Bertini & Brinton, "A Comparison of Rejuvenation Hazards," EDIST 2009, Jan. 13, 2009, which is incorporated herein by reference in its entirety.

Sixth, whenever the injection port is open (e.g., an injection cap or a permanent cap has been removed) some of the treatment fluid may flow out through the open injection port. This decreases residual pressure in the cable and (proportionally) the volume of the treatment fluid in the cable. Treatment fluid may spray or dribble from the injection port and create a hazard potential for fire, injure personnel, and/or contaminate the environment.

Seventh, the permanent cap used to close the injection port of some types of injection components may be mistaken for a cap used to seal other types of devices found on cable accessories that are not used to inject treatment fluid into cables. For example, many permanent caps have an external ring-shaped attachment point that is used to remove and install the cap. This ring-shaped attachment point may be mistaken for the external ring-shaped attachment point of a cap used on other devices mounted on cable accessories. For example, the external ring-shaped attachment point of the permanent cap may be mistaken for an eye (or eyelet) included on an elbow and used to pull on the elbow. By way of another example, the external ring-shaped attachment point of the permanent cap may be mistaken for a similar structure on a cover used to close a capacitive test point that can easily be removed by a standard hot stick implement. Such mistakes can result in the permanent cap being removed from the injection port, which exposes the cable conductor directly to atmosphere, creates a passage through which foreign objects can come in contact with the voltage of the cable conductor, and a passage through which potential can spontaneously and violently flash-over creating an arc flash and a power outage. The temperature of an arc flash can reach 35,000° F. and hence poses a substantial threat to operators and nearby equipment. Personnel unfamiliar with the function of the injection port can expose themselves to danger, create a hazard for others, and initiate a failure point if the permanent cap is not promptly replaced and/or is handled improperly.

Therefore, a need exists for new injection components that avoid one or more of the shortcomings discussed above. The present application provides these and other advantages as will be apparent from the following detailed description and accompanying figures.

BRIEF DESCRIPTION OF THE SEVERAL VIEWS OF THE DRAWING(S)

FIG. 8 is a perspective view of the MIC conductor.

FIG. 9 is a perspective view of a VIA body of the optional VIA assembly.

DETAILED DESCRIPTION OF THE INVENTION

Figure 1A:
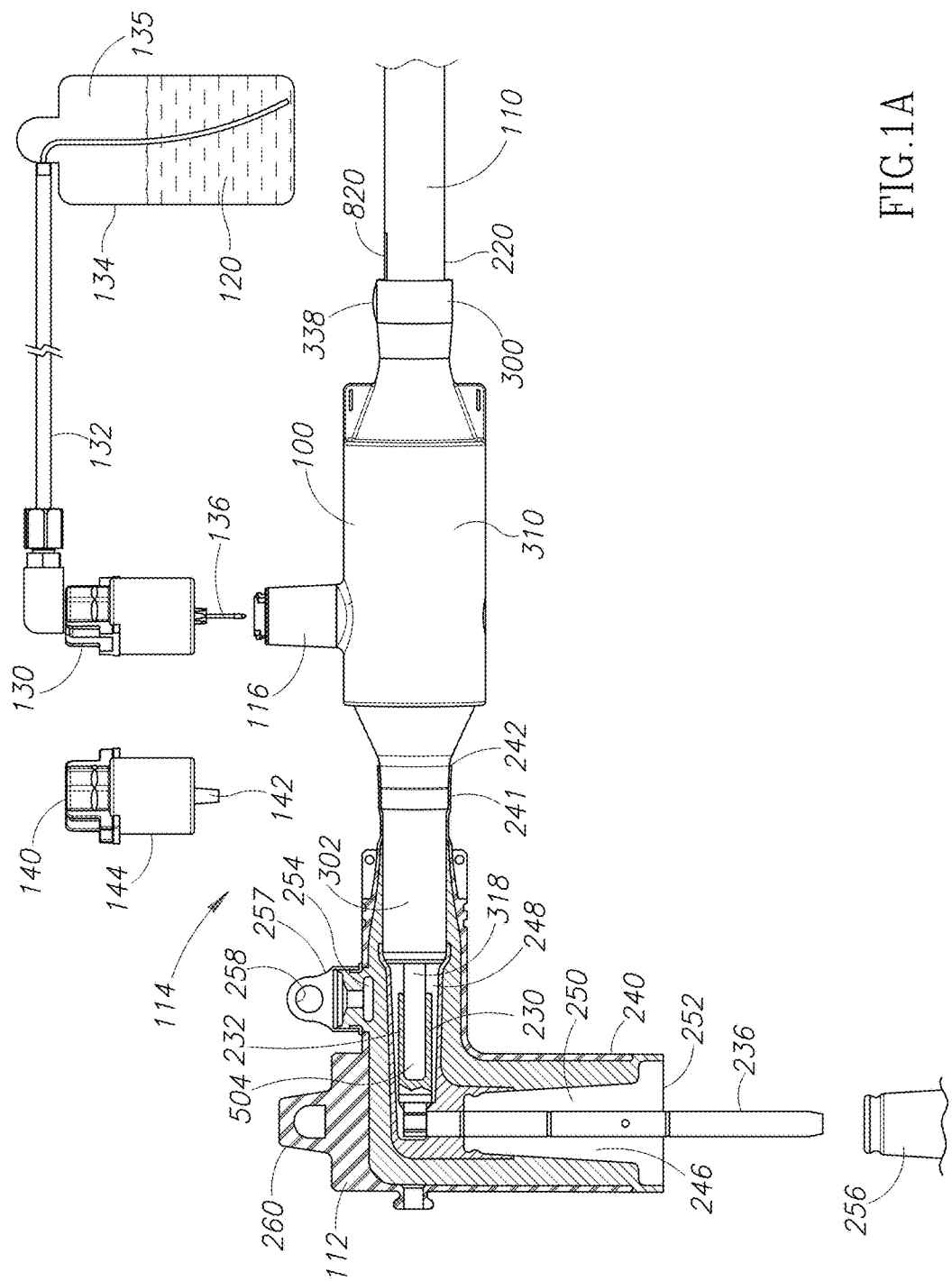
FIG. 1A is a perspective view of an embodiment of a modular injection component ("MIC") connected to both a cable and a cable accessory (illustrated in cross-section).

FIG. 1A is a perspective view of an embodiment of a modular injection component ("MIC") 100. The MIC 100 is used to connect a cable 110 to a cable accessory 112 to form an assembly 114. As is apparent to those of ordinary skill in the art, the cable accessory 112 may be connected to other electrical equipment (not shown), such as a transformer, switch, feed-through bushing, etc.

In alternate embodiments (not shown), the cable accessory 112 may be integrated into the MIC 100 or may be a subcomponent of the MIC 100. In such embodiments, the assembly 114 includes the MIC 100 and the cable 110.

The MIC 100 includes an access or injection port 116 through which treatment fluid 120 may be inserted into (or withdrawn from) an interior 122 (see FIG. 2) of the cable 110 by an injection probe assembly (e.g., an injection probe assembly 130) or other injection device. For ease of illustration, in FIG. 1A, the injection probe assembly has been implemented as the injection probe assembly 130. However, this is not a requirement and other types of injection probe assemblies or other types of injection devices may be used with the MIC 100. For example, a cap-like injection device configured to be removably coupled to the injection port 116 may be used to inject the treatment fluid 120 into the injection port 116. Such a device may include a friction fit plug or simple cap that attaches to the injection port 116 but does not extend inwardly into the injection port 116. Alternatively, the cap-like injection device may be held into place on the injection port 116 by a fastener (e.g., a hook or strap) that attaches to or wraps around the MIC 100. By way of another non-limiting example, the injection device may have a nozzle that is inserted into the injection port 116 and held in place by a human operator as the injection occurs.

One of ordinary skill in the art of cable rejuvenation readily recognizes that while nominally pure treatment fluids are introduced into a first cable end, what comes out the second end is not precisely the same as the introduced treatment fluid. The treatment fluid will pick up contaminants, including, but not limited to, carbon black, clay fillers, organic compounds, water, and ions. In fact, at the fluid outlet, water and ions may be pushed ahead of the injected treatment fluid. The effluent cannot be known a priori and must be assumed to be conductive for safety reasons. These contaminants disrupt the dielectric properties of the treatment fluid as introduced and create electrical containment issues when a cable is treated while energized. These issues are most severe at the fluid outlet, but even the inlet may be contaminated by Brownian diffusion where inlet flow rates are very low. Therefore, after introduction into the cable, treatment fluid is understood to include nominally pure treatment fluid, contaminated treatment fluid, and any fluid (e.g., water with ions) existing in the cable interior prior to injection that is pushed ahead of the treatment fluid.

In the embodiment illustrated, the injection probe assembly 130 is connected by a hose or tube 132 to a fluid source 134 (e.g., a tank), in which the treatment fluid 120 is stored. The injection probe assembly 130 has an injection probe pin 136 configured to extend into the injection port 116 when the injection probe assembly 130 is attached to the injection port 116.

Inside the fluid source 134, a pressurized gas 135 applies pressure to the treatment fluid 120. Thus, the treatment fluid 120 is under pressure inside the fluid source 134. The pressurized gas 135 may be supplied to the fluid source 134 by an external tank (not shown). The fluid source 134 may include a gauge (not shown) that may be used to display the pressure inside the fluid source 134. Alternate means, such as but not limited to a pump (not shown) may be used to supply the treatment fluid 120 under pressure. The treatment fluid 120 may be implemented using any cable treatment or rejuvenation fluid known in the art. Non-limiting examples of such fluids include phenylmethyldialkoxysilane, dimethyldialkoxysilane, tolylethylmethyldialkoxysilane, cyanobutylmethyldialkoxysilane and the like.

Alternatively, the injection probe assembly 130 (other injection device) could be used to pump dry air or gas into the interior 122 of the cable 110 through the injection port 116 of the MIC 100.

A cap 140 may be used to close the injection port 116 and seal it from the outside environment whenever the injection probe assembly 130 (or other injection device) is not connected to the injection port 116. The cap 140 has a stem portion 142 configured to extend into the injection port 116 when the cap 140 is attached to the injection port 116, which prevents fluid from exiting the MIC 100 through the injection port 116 and (as explained below) insulates the interior of the MIC 100 from the outside environment. The stem portion 142 is constructed from electrically insulating material. The cap 140 also has a skirt portion 144 that is spaced apart from and surrounds the stem portion 142. The skirt portion 144 is constructed from electrically semi-conductive material. The skirt portion 144 receives the injection port 116 and extends along its outer surface when the cap 140 is attached to the injection port 116 with the stem portion 142 inserted therein.

The cap 140 may be characterized as being permanent because the cap 140 closes the injection port 116 electrically. As explained below, the stem portion 142 extends into the injection port 116 to complete the insulation. At the same time, the skirt portion 144 extends along the outside of the injection port 116 and (as explained below) mates with a semi-conductive outer insulation shield 332 (see FIGS. 3 and 5) of an outer housing or MIC body 310 (which may be connected to ground by a ground wire) of the MIC 100. Thus, the cap 140 may be used to seal the MIC 100 in a manner that makes the sealed MIC 100 operate as a fully dead-front device.

Figure 2:
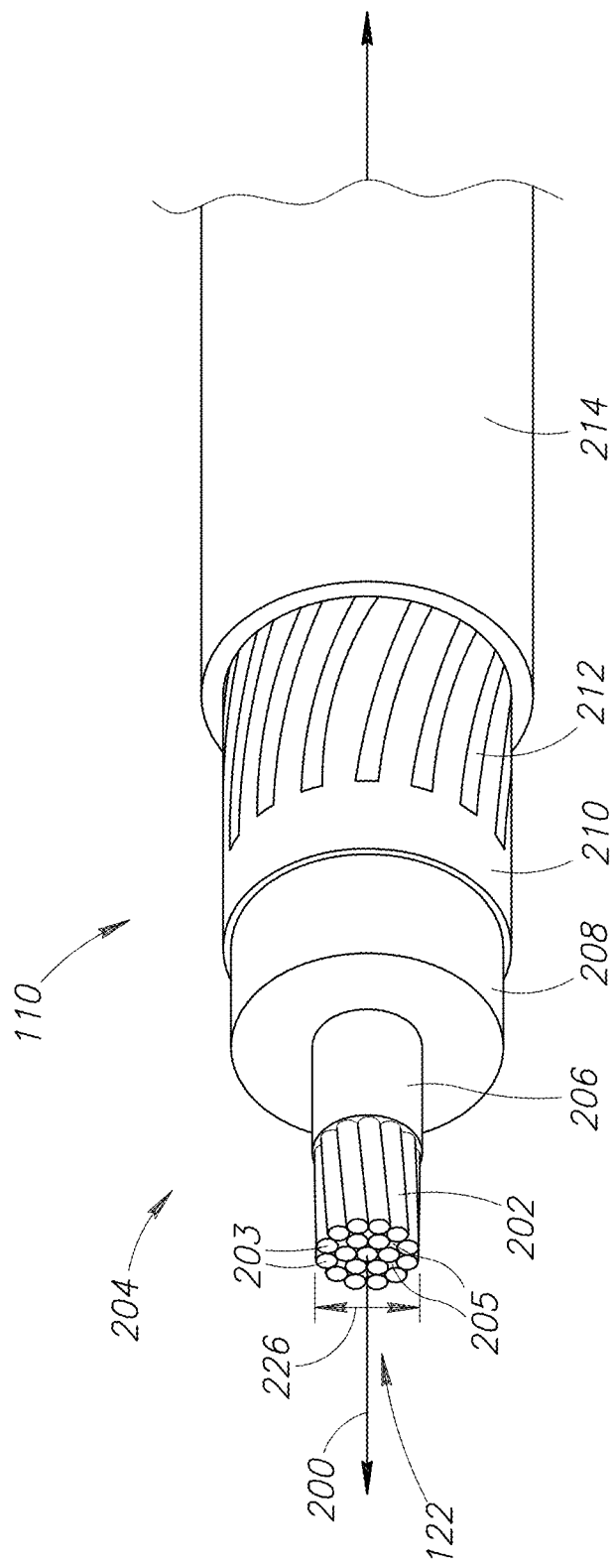
FIG. 2 is a perspective view of an end of the cable.

Referring to FIG. 2, the cable 110 extends longitudinally along a cable axis 200. For ease of illustration, in FIG. 2, the cable 110 is illustrated as a conventional jacketed concentric neutral Underground Residential Distribution ("URD") cable used for medium voltage applications. However, the cable 110 may be implemented using alternative cables such as a non-jacketed bare concentric neutral URD cable, a cable with one or more tape shields, a low voltage cable, and the like.

The cable 110 includes a longitudinally extending cable conductor 202 (e.g., including a plurality of longitudinally extending electrically conductive strands 203) surrounded lengthwise by a plurality of concentrically oriented layers 204. Interstitial spaces 205 between the conductive strands 203 provide one or more flow paths through the interior 122 of the cable 110. In the embodiment illustrated, the layers 204 include a conductor shield 206 immediately adjacent the cable conductor 202, a substantially non-conductive insulation layer 208 immediately adjacent the conductor shield 206, and a semi-conductive insulation shield 210 immediately adjacent the insulation layer 208. A plurality of concentric wires or neutrals 212 may be wound around the insulation shield 210. The outermost of the layers 204 is a cable jacket 214 that covers and protects the other layers of the cable 110.

Figure 3:
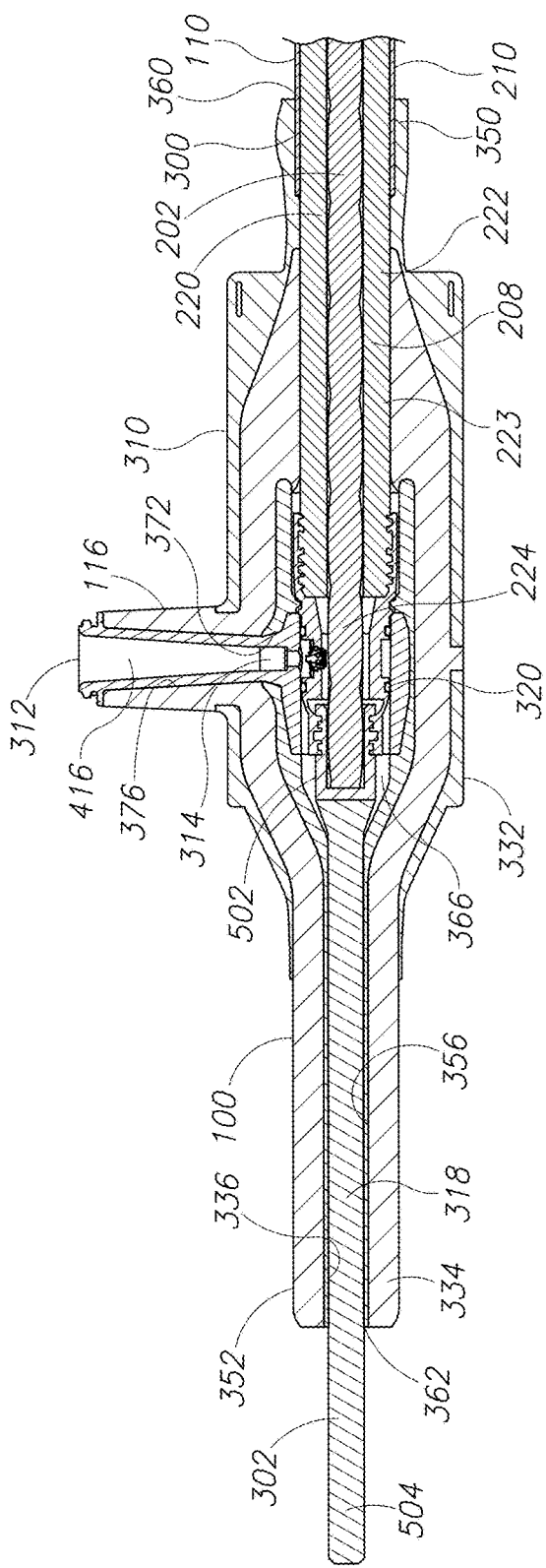
FIG. 3 is a longitudinal cross-sectional side view of the MIC of FIG. 1A, which includes an injection port, an optional reticulated flash prevention ("RFP") plug, an optional limited permeation insert ("LPI"), a MIC body, an optional valved injection adapter ("VIA") assembly, and a MIC conductor.

Referring to FIG. 3, the cable 110 is connected at its end 220 to the MIC 100. Before the cable 110 is connected to the MIC 100, at the end 220, portions of the cable jacket 214 (see FIG. 2) and the neutrals 212 (see FIG. 2) are removed to expose an end portion 222 of the insulation shield 210. Then, an end most portion of the exposed end portion 222 of the insulation shield 210 is removed to expose an end portion 223 of the insulation layer 208. Finally, a portion of the exposed end portion 223 of the insulation layer 208 and the conductor shield 206 (see FIG. 2) underneath the exposed end portion 223 are removed to expose an end portion 224 of the cable conductor 202. The cable conductor 202 has an outer diameter 226 (see FIG. 2).

Referring to FIG. 1A, the MIC 100 may be used to inject the treatment fluid 120 into the cable 110 when the cable is energized. In such implementations, the cable accessory 112 may be implemented as a standard dead-front cable accessory. For ease of illustration, in FIG. 1A, the cable accessory 112 is illustrated as a conventional dead-front load break elbow. However, the cable accessory 112 may be implemented using alternative cable accessories such as a splice, another MIC (like the MIC 100), a dead-break elbow, a non-load-break elbow, a separable connector, a stress-control termination, a live-front termination, and the like.

The cable accessory 112 includes a fitting 230 configured to be connected to the cable conductor 202 (see FIG. 2) and form an electrical connection therewith. By way of non-limiting examples, the fitting 230 may be a coppertop connector. In the embodiment illustrated, the fitting 230 has a compression connector 232 and a threaded hole 235 (see FIG. 1B). In the embodiment illustrated, the cable accessory 112 includes a contact probe 236 (also referred to as a probe pin) that is removably connectable to the fitting 230 via the threaded hole 235 (see FIG. 1B). The contact probe 236 has a threaded end 237 configured to be threaded into the threaded hole 235 (see FIG. 1B) of the fitting 230.

The cable accessory 112 has an outer housing 240 configured to house the fitting 230 therein. In the embodiment illustrated, the outer housing 240 includes a semi-conductive outer insulation shield 241. The housing 240 has an opening 242 formed in the semi-conductive outer insulation shield 241 into which the fitting 230 may be inserted during assembly of the cable accessory 112. When the cable accessory 112 is implemented as an elbow, the housing 240 has an internal L-shaped channel 246 with a first branch 248 that opens at the opening 242, and a second branch 250 that opens at an opening 252. The contact probe 236 may be inserted into the housing 240 through the opening 252 and connected to the fitting 230 at or near the intersection of the first and second branches 248 and 250. Then, an elbow bushing 256 may be inserted into the housing 240 through the opening 252 and connected to the contact probe 236. The elbow bushing 256 sealingly mates with the housing 240 within the second branch 250 and along the opening 252.

Optionally, the outer housing 240 may include a port 254 formed therein that is closed by a removable cap 257. The cap 257 includes an external ring-shaped attachment point or pulling eyelet 258. By way of a non-limiting example, the port 254 may be a capacitive test point and the cap 257 may be removed by a standard hot stick implement. Optionally, the outer housing 240 may include a pulling eyelet 260 that may be used to pull on the cable accessory 112 (e.g., using a standard hot stick implement).

The MIC 100 has a first end portion 300 opposite a second end portion 302. The first end portion 300 is connectable to the end 220 of the cable 110 and the second end portion 302 of the MIC 100 is connectable to the cable accessory 112. The first end portion 300 forms a mechanical connection with the cable 110 that helps prevent movement of the cable 110 relative to the MIC 100. As will be described in more detail below, the first end portion 300 also provides an electrical connection with the cable conductor 202 (see FIG. 2), and forms both an electrically insulated connection, and a fluid tight seal with the cable 110. Similarly, the second end portion 302 forms a mechanical connection with the fitting 230 of the cable accessory 112 that helps prevent movement of the MIC 100 (and the cable 110) relative to the cable accessory 112. As will be described in more detail below, the second end portion 302 also provides an electrical connection with the fitting 230 of the cable accessory 112, and forms both an electrically insulated connection, and a fluid tight seal with the cable accessory 112. The fluid tight seals formed by the first and second end portions 300 and 302 may be configured to withstand injection pressures of about 5 psi to about 30 psi. However, as described below, the MIC 100 may be configured for use with higher injection pressures.

The MIC 100 may be used to inject the treatment fluid 120 into a wide variety of cable types and sizes (e.g., different conductor diameters, different insulation thicknesses, and the like). For example, the MIC 100 may be configured for use with the following:
1. cables and/or cable accessories used for different voltage classes (e.g., secondary voltages below 600 v, medium voltage cables including 15 kV, 25 kV, and 35 kV, and transmission voltage above 35 kV);
2. cable accessories having small or large bushing interfaces used at 35 kV;
3. cable accessories that include dead-break and load-break components;
4. cable accessories with and without capacitive test points; and
5. cables and/or cable accessories having different lengths (e.g., standard, elongated, and repair lengths).

Figure 7:
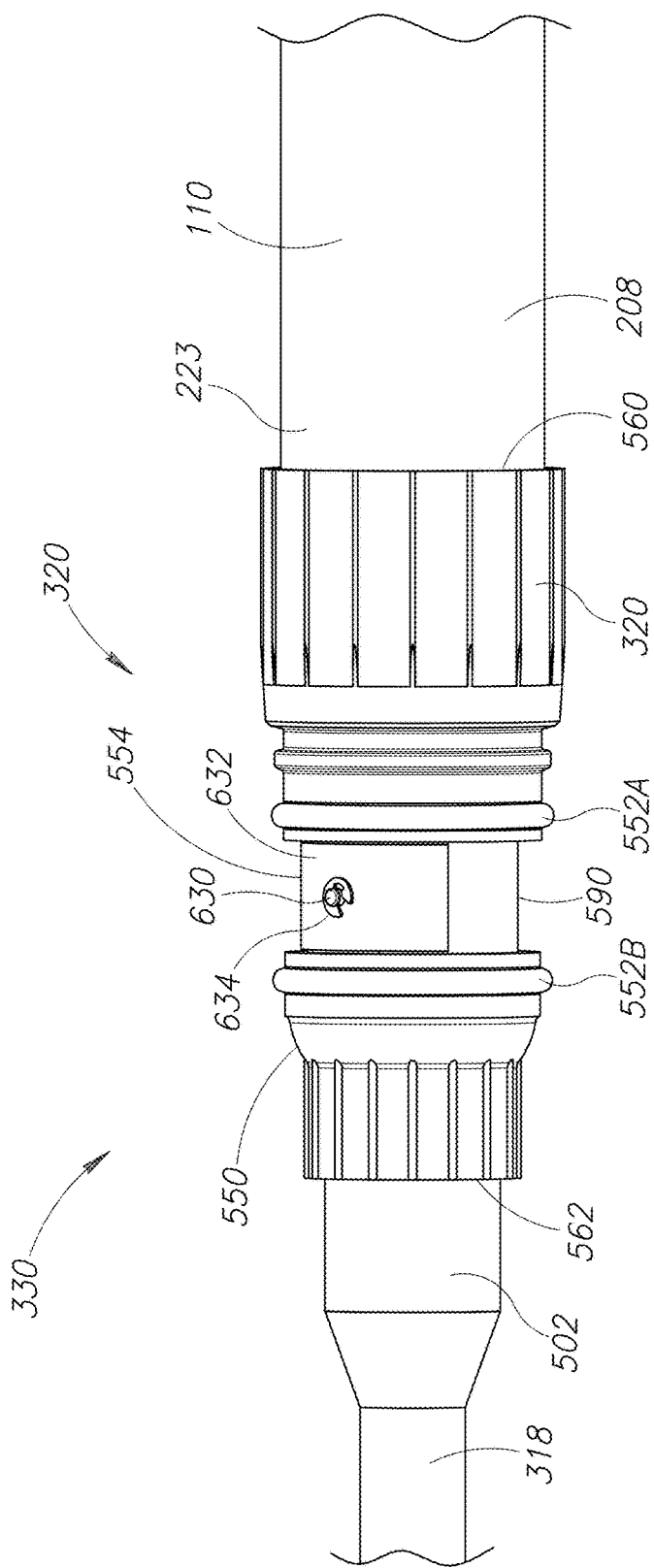
FIG. 7 is a perspective view of a subassembly including the cable, the optional VIA assembly, and the MIC conductor.

Referring to FIG. 3, the MIC 100 includes the MIC body 310, an optional limited permeation insert ("LPI") 312, an optional reticulated flash prevention ("RFP") plug 314, a MIC conductor 318, and an optional valved injection adapter ("VIA") assembly 320. Referring to FIG. 7, the MIC conductor 318, the VIA assembly 320, and the cable 110 may be assembled together into a subassembly 330 that is inserted into the MIC body 310 (see FIGS. 1A, 3, and 5) as described below.

MIC Body

Figure 18:
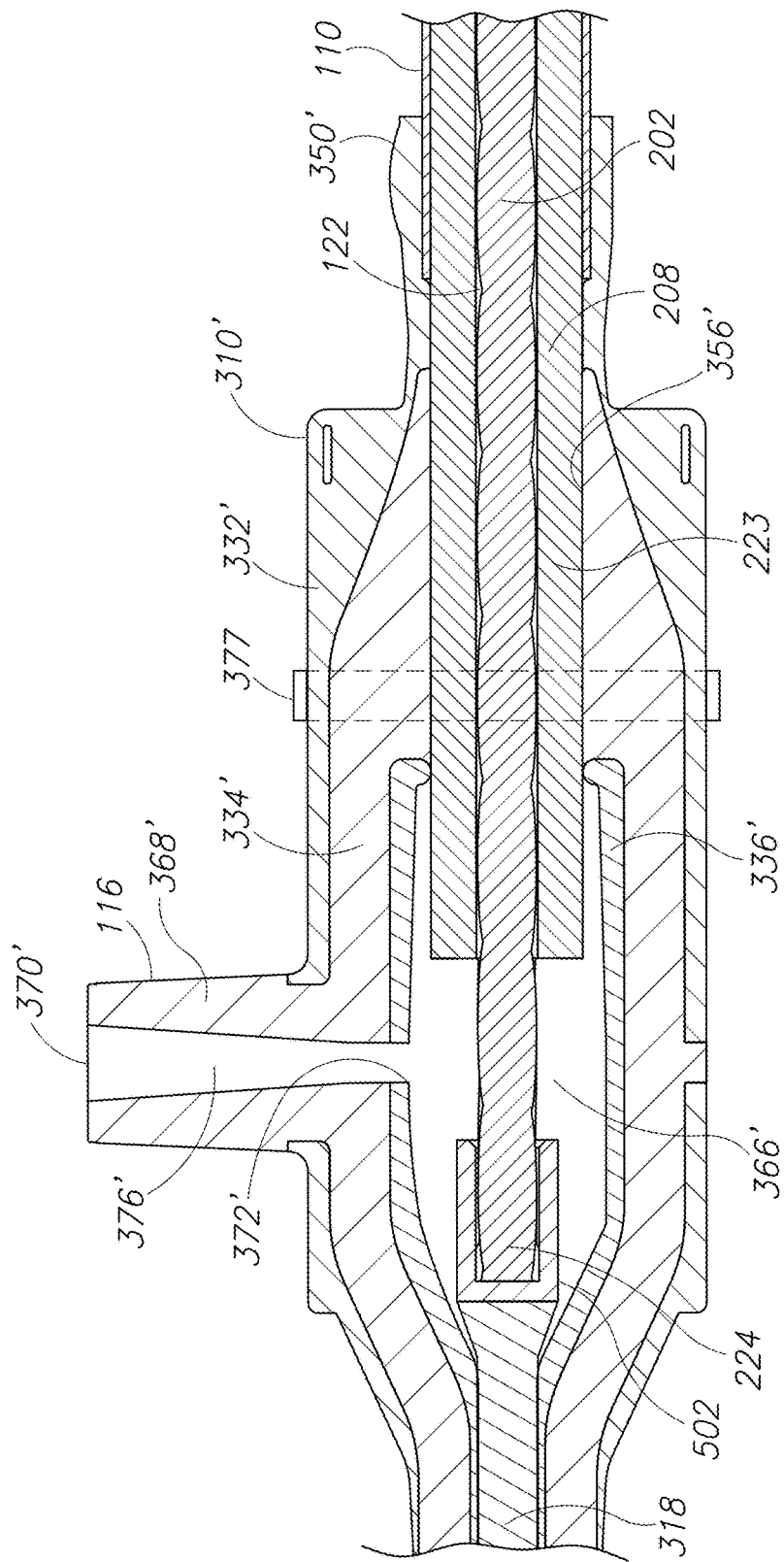
FIG. 18 is a longitudinal cross-sectional side view of an alternate embodiment of the MIC that omits both the optional VIA assembly and the optional LPI.

As mentioned above, the LPI 312 and the VIA assembly 320 are both optional. FIGS. 1A, 3, 5-6B, 13, 21, 23A, 24A, and 24B depict an embodiment of the MIC body 310 configured for use with the LPI 312 and the VIA assembly 320. FIG. 18 depicts an embodiment of a MIC body 310' that may be used to construct an embodiment of the MIC 100 that omits both the LPI 312 and the VIA assembly 320.

Figure 5:
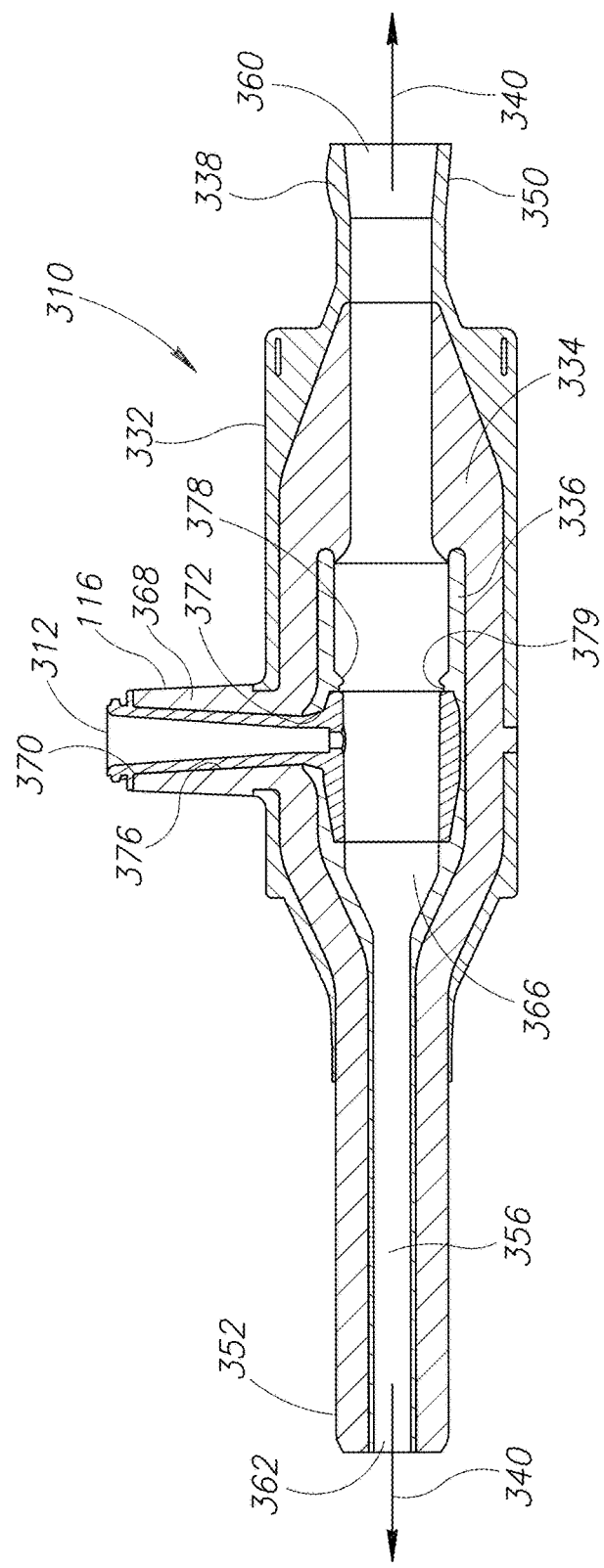
FIG. 5 is a longitudinal cross-sectional side view of the MIC body of the MIC of FIG. 1A.

Referring to FIG. 5, in the embodiment illustrated, the MIC body 310 is constructed (e.g., molded) as a single unit. However, in alternate embodiments (not shown), the MIC body 310 may be constructed from two or more body components assembled together. In the embodiment illustrated, the MIC body 310 includes the semi-conductive outer insulation shield 332, an insulation portion 334, and a semi-conductive layer or insert 336. The outer insulation shield 332 provides a semi-conductive exterior that may be connected to ground (e.g., by a ground wire) and act as a ground plane. The outer insulation shield 332 and the insert 336 may be formed first, placed in a mold, and the insulation portion 334 injected into the mold to connect the outer insulation shield 332 and the insert 336 together. The MIC body 310 may be molded around the LPI 312 or otherwise constructed therewith as a unit. For example, the optional LPI 312 may be placed in the mold with the outer insulation shield 332 and the insert 336 before the insulation portion 334 is injected into the mold. By way of a non-limiting example, the MIC body 310 may be constructed from EPDM rubber, EPR, silicone rubber, one or more other compliant insulating materials, and the like.

The MIC body 310 extends longitudinally along a MIC axis 340 and has a first end 350 opposite a second end 352. The first end 350 is formed in the outer insulation shield 332. The second end 352 is formed in both the insulation portion 334, and the insert 336. The first end 350 has an alignment feature 338 (e.g., a raised portion) that (as described below) may be used to align the subassembly 330 (see FIG. 7) with the injection port 116. Referring to FIG. 3, at the first end 350, the outer insulation shield 332 mates with the semi-conductive insulation shield 210 of the cable 110 to continue a dead-front ground plane across the connection therebetween. The dead-front ground plane is also continued across the connection formed between the second end 352 and the cable accessory 112 (see FIG. 1A). Referring to FIG. 1A, the opening 242 formed in the semi-conductive insulation shield 241 of the cable accessory 112 mates with the outer insulation shield 332 (see FIG. 3) of the MIC body 310.

Referring to FIG. 5, an open ended internal channel 356 extends through the MIC body 310 along the MIC axis 340 from the first end 350 to the second end 352. As shown in FIG. 3, the internal channel 356 is configured to house the subassembly 330 (see FIG. 7) with the cable 110 and the MIC conductor 318 extending outwardly from the MIC body 310. The cable 110 extends outwardly from the internal channel 356 through a first channel opening 360 formed in the first end 350 of the MIC body 310. The MIC conductor 318 exits from the internal channel 356 through a second channel opening 362 formed in the second end 352 of the MIC body 310.

Referring to FIG. 5, the internal channel 356 passes through an interior chamber 366 defined in the insert 336 of the MIC body 310. The injection port 116 has an outer sidewall 368 formed in the insulation portion 334 of the MIC body 310 at a location between the first and second ends 350 and 352. Along its base, the outer sidewall 368 is surrounded by the outer insulation shield 332. The injection port 116 is in fluid communication with the interior chamber 366. The injection port 116 has an outer opening 370 connected to an inner opening 372 by a tapered channel 376. An outer portion of the tapered channel 376 is defined by the outer sidewall 368, and an innermost portion of the tapered channel 376 is defined by the insert 336. The tapered channel 376 narrows toward the inner opening 372, which opens into the interior chamber 366. In the embodiment illustrated, the tapered channel 376 stops narrowing at or near the interface between the insulation portion 334 and the insert 336. Referring to FIG. 3, the interior chamber 366 is configured to house the VIA assembly 320 with the VIA assembly 320 positioned adjacent the inner opening 372 (see FIG. 5) of the injection port 116.

Referring to FIG. 5, optionally, at least one projection 378 may be positioned between the injection port 116 and the first end 350. The projection 378 extends inwardly into the interior chamber 366 and is configured to engage the VIA assembly 320 (see FIG. 3) and help maintain the VIA assembly 320 in a desired longitudinal position within the MIC body 310.

Optionally, at least one recess 379 may be positioned between the injection port 116 and the first end 350. The recess 379 extends outwardly away from the interior chamber 366. In the embodiment illustrated, the optional recess 379 is immediately adjacent the optional projection 378. The optional recess 379 is configured to engage the subassembly 330 (see FIG. 3) and help maintain the subassembly 330 in a desired longitudinal position within the MIC body 310.

In the embodiment illustrated, the tapered channel 376 is substantially orthogonal to the internal channel 356 (which extends along the MIC axis 340). The MIC body 310 may be rotated about the MIC axis 340 when the subassembly 330 (see FIG. 7) is positioned inside the internal channel 356 to position the injection port 116 for convenient access and avoid interference with other structures (e.g., a switching cabinet, a transformer, other devices in a switching cabinet, and the like). Thus, clearance problems experienced with prior art elbow injection adaptors may be avoided. Additionally, the stack height may be reduced by angling the injection port 116 away from the elbow bushing 256, which is perpendicular to the cabinet door. Referring to FIG. 1A, although the injection port 116 of the MIC 100 is illustrated as being oriented in the same plane as the second branch 250 (and the contact probe 236) of the cable accessory 112, the injection port 116 (and hence the MIC body 310) could be rotated (or radially displaced) about the MIC axis 340 (see FIG. 5) by up to 180 degrees to allow a better fit within a confined interior space (e.g., within a switching cabinet or other structure).

Referring to FIG. 18, the MIC body 310' may be constructed using any methods and materials suitable for constructing the MIC body 310 (see FIGS. 1A, 3, 5-6B, 13, 21, 23A, 24A, and 24B). Like the MIC body 310, the MIC body 310' includes a semi-conductive outer insulation shield 332', an insulation portion 334', and a semi-conductive layer or insert 336'. The outer insulation shield 332' may be connected to ground (e.g., by a ground wire) and act as a ground plane. The MIC body 310' has a first end 350' opposite a second end (not shown) that are substantially identical to the first and second ends 350 and 352, respectively, of the MIC body 310.

An open ended internal channel 356' extends through the MIC body 310' from the first end 350' to the second end (not shown). The internal channel 356' is configured to house portions of the cable 110 and the MIC conductor 318. The internal channel 356' passes through an interior chamber 366' defined in the insert 336' of the MIC body 310'. The exposed end portion 224 of the cable conductor 202 is coupled to the MIC conductor 318 inside the interior chamber 366'. The cable 110 extends outwardly from the interior chamber 366' through the internal channel 356' in a first direction and the MIC conductor 318 extends outwardly from the interior chamber 366' through the internal channel 356' in a second direction that is opposite the first direction.

The injection port 116 has an outer sidewall 368' formed in the insulation portion 334' of the MIC body 310'. Along its base, the outer sidewall 368' is surrounded by the outer insulation shield 332'. The injection port 116 is in fluid communication with the interior chamber 366'. The injection port 116 has an outer opening 370' connected to an inner opening 372' by a tapered channel 376'. An outer portion of the tapered channel 376' is defined by the outer sidewall 368', and an innermost portion of the tapered channel 376' is defined by the insert 336'. The tapered channel 376' narrows toward the inner opening 372', which opens into the interior chamber 366'.

In the embodiment illustrated, the tapered channel 376' is substantially orthogonal to the internal channel 356'. The MIC body 310' may be rotated about the cable axis 200 (see FIG. 2) to position the injection port 116 in a desired location with respect to other external structures (e.g., a switching cabinet, a transformer, other devices in a switching cabinet, and the like) when the cable 110 and the MIC conductor 318 are coupled together inside the internal channel 356'.

The insert 336' seals against the MIC conductor 318, and the insulation portion 334' seals against insulation layer 208 of the cable 110. These seals prevent the treatment fluid 120 (see FIG. 1A) leaking out of the open ends of the internal channel 356'. An optional exterior compression band or clamp 377 may be installed on the MIC body 310' between the injection port 116 and the first end 350' to compress the MIC body 310' against the cable 110 and help seal the insulation portion 334' against the insulation layer 208 of the cable 110.

Optional LPI

Figure 4:
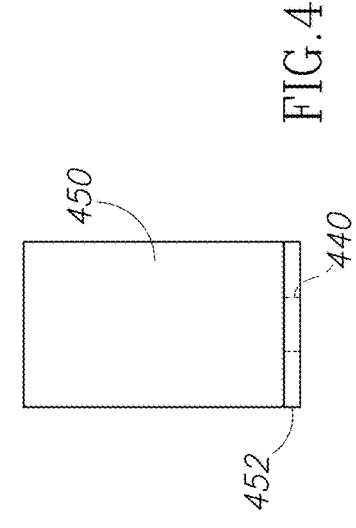
FIG. 4 is a side view of the optional RFP plug.
Figure 6A:
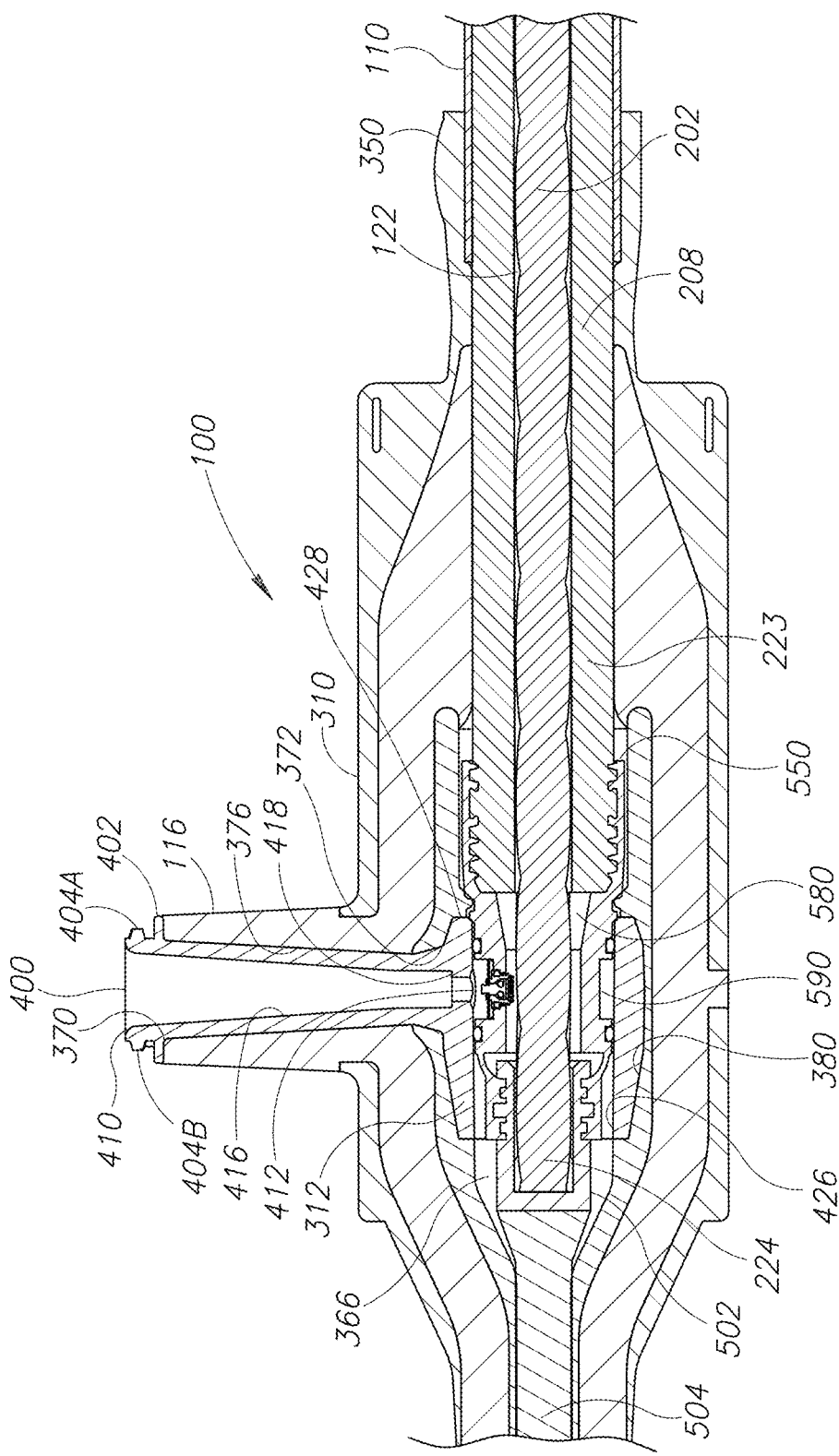
FIG. 6A is an enlargement of a portion of FIG. 3 omitting the optional RFP plug.
Figure 6B:
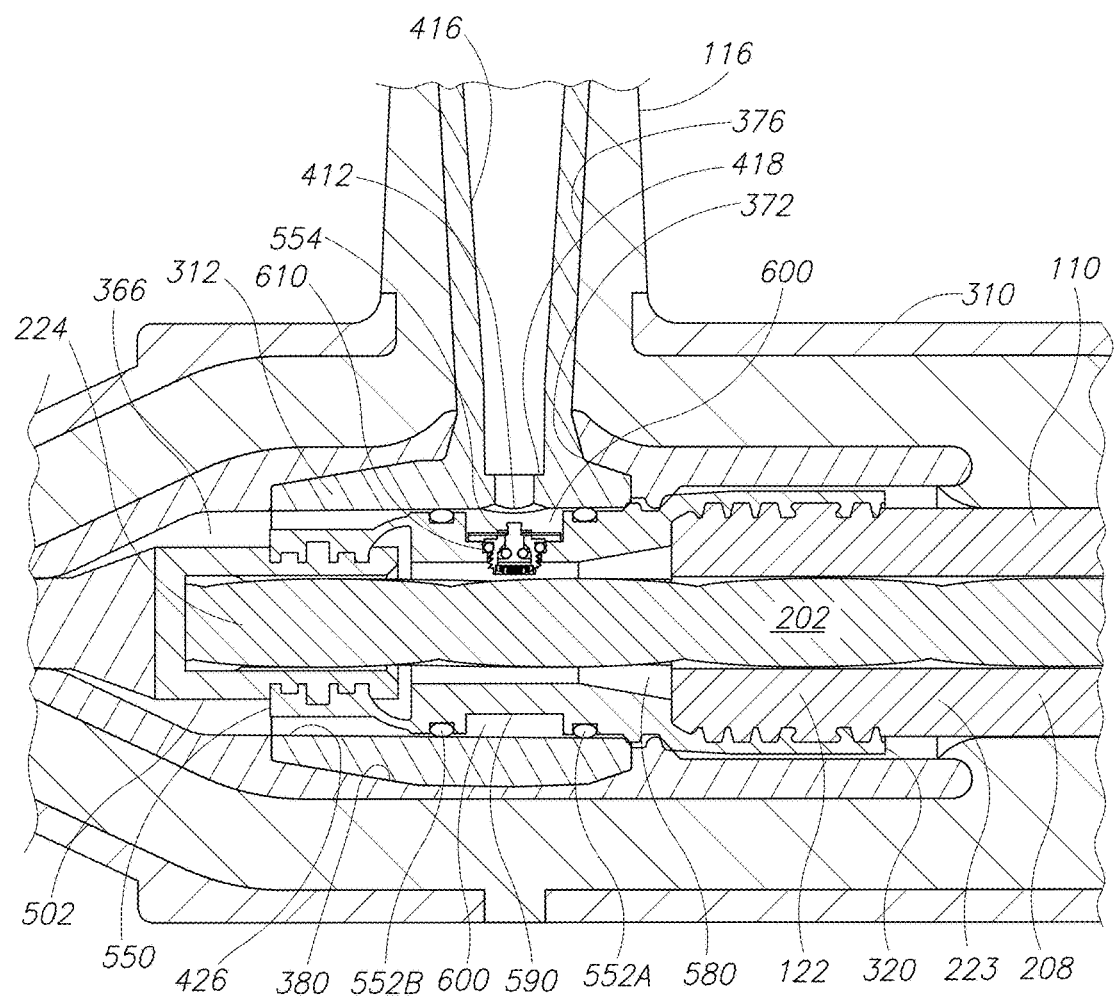
FIG. 6B is an enlargement of a portion of FIG. 6A.

FIGS. 6A and 6B are enlarged partial cross-sections of the MIC 100 and omit the optional RFP plug 314 (see FIGS. 3 and 4). Referring to FIG. 6A, the optional LPI 312 may be characterized as being an inner body or a liner that lines (and optionally reinforces) the tapered channel 376 of the injection port 116 and a portion 380 of the interior chamber 366 (defined in the insert 336 of the MIC body 310) adjacent the inner opening 372 of the tapered channel 376. In the embodiment illustrated, an exterior portion 400 of the LPI 312 extends outwardly beyond the tapered channel 376 through the outer opening 370. The exterior portion 400 may include a lip or flange 402 configured to be positioned against and cover the outermost portion of the injection port 116 adjacent the outer opening 370. The exterior portion 400 may include one or more connectors 404A and 404B spaced outwardly from the flange 402 and configured to be removably coupled to the injection probe assembly 130 (see FIG. 1A) or the cap 140 (see FIG. 1A). In the embodiment illustrated, the connectors 404A and 404B have been implemented as a pair of projections of a bayonet type connector.

The LPI 312 has an outer opening 410 formed in the exterior portion 400, and an inner opening 412 that opens into the interior chamber 366. A tapered first through channel 416 extends inwardly from the outer opening 410 to the inner opening 412 within the portion of the LPI 312 lining the injection port 116. By way of a non-limiting example, the tapered first through channel 416 may taper along its length at least 3 degrees or at least 15 degrees. By way of another non-limiting example, the tapered first through channel 416 may taper along its length by about 0.5 degrees to about 30 degrees. An internal shoulder 418 may be formed in the LPI 312 near the inner opening 412. Referring to FIG. 3, when present, the RFP plug 314 may be inserted into the first through channel 416 and may rest upon the shoulder 418 (see FIGS. 6A and 6B). Referring to FIG. 6B, a portion of the first through channel 416 between the shoulder 418 and the inner opening 412 may be too narrow to allow the RFP plug 314 (see FIGS. 3 and 4) to pass therethrough.

A second through channel 426 extends along the MIC axis 340 (see FIG. 5) through the LPI 312 within the lined portion 380 of the interior chamber 366. The second through channel 426 is configured to house at least a portion of the VIA assembly 320. The second through channel 426 may be substantially orthogonal to the first through channel 416.

The LPI 312 may be characterized as having the first portion that lines the injection port 116 and a second portion that lines the lined portion 380 of the interior chamber 366. The first portion includes the tapered first through channel 416 and the second portion includes the second through channel 426. While in the embodiment illustrated, the first and second portions are part of the unitary LPI 312, in alternate embodiments, the first and second portions may be separate components. Optionally, in such embodiments, the first and second portions may be coupled together to form a continuous LPI. Alternatively, the first and second portions may be spaced apart and define a discontinuous LPI.

In the embodiment illustrated, the optional recess 379 (see FIG. 5) formed in the MIC body 310 is positioned along an edge 428 of the LPI 312 that is positioned between the injection port 116 and the first end 350 of the MIC body 310. Alternatively, the optional recess 379 may be omitted and the edge 428 may function as lip or stop within the interior chamber 366 of the MIC body 310.

The LPI 312 is constructed from a material that limits or restricts permeation of the treatment fluid 120 (see FIG. 1A) therethrough. When present, the LPI 312 prevents the treatment fluid 120 (see FIG. 1A) from quickly permeating into and through the material used to construct the MIC body 310 or portions thereof. In other words, the LPI 312 limits unrestricted permeation of the treatment fluid 120 into the MIC body 310. Because the treatment fluid 120 may degrade the physical and/or electrical properties of the MIC body 310, the LPI 312 may help increase the useful life of the MIC 100 (or other cable accessory into which the LPI 312 has been incorporated). The LPI 312 also reduces the amount of the treatment fluid 120 that is lost or wasted by permeation of the treatment fluid 120 into structures (e.g., the MIC body 310) outside the cable 110, which assures that more of the treatment fluid 120 is available to treat the cable 110.

The LPI 312 may provide an inherently better seal with respect to the insulation layer 208 that helps keep the treatment fluid 120 confined so it cannot leak out between the MIC 100 and the cable 110. Similarly, the LPI 312 may help provide an inherently better seal with respect to the cable accessory 112 (see FIG. 1A) that helps keep the treatment fluid 120 confined so it cannot leak out between the MIC 100 and the cable accessory 112. These fluid tight seals allow the MIC 100 to be operated at higher pressures than conventional injection components. For example, the LPI 312 may be configured such that the MIC 100 is able to withstand injection pressures of about 30 psi to about 1000 psi. By way of another non-limiting example, the LPI 312 may be used to provide sustained pressure rejuvenation ("SPR") processes, such as those described in U.S. Pat. Nos. 7,611,748, 8,205,326, 8,656,586, and 7,976,747.

As mentioned above, the LPI 312 is constructed from a material that limits or restricts permeation of the treatment fluid 120 (see FIG. 1A) therethrough. For example, the material may have a low solubility (e.g., less than 5%, at 90° C., less than 1%$_w$, at 90° C., or less than 0.1%$_w$, at 90° C.) in the treatment fluid 120 and/or the material and the treatment fluid 120 may have a small diffusion coefficient (e.g., less than $10^{-7}$ cm$^2$/s at 90° C., less than $10^{-8}$ cm$^2$/s at 90° C., or less than $10^{-9}$ cm$^2$/s at 90° C.). Low solubility, small diffusion coefficient, and the product of the solubility and diffusion are determined relative to the same properties in the material used to construct the MIC body 310 (e.g., EPDM rubber). For example, the material used to construct the LPI 312 is less soluble (e.g., five times, 20 times, or 100 times less soluble) than the material used to construct the MIC body 310 (e.g., EPDM rubber) and the material may have a smaller diffusion coefficient with the treatment fluid 120 and therefore slower diffusion (ten times, 100 times, or 1000 times slower diffusion) than the material used to construct the MIC body 310 (e.g., EPDM rubber). For example, the treatment fluid 120 may diffuse through the LPI 312 at a first rate that is slower than a second rate at which the treatment fluid 120 diffuses through the MIC body 310. The first rate may be slower than the second rate by at least about 10 times, at least about 100 times, or at least about 1000 times. By way of another non-limiting example, the MIC body 310 may have a first solubility in the treatment fluid 120 and the LPI 312 may have a second solubility in the treatment fluid 120. The first solubility may be at least about five times, at least about 20 times, or at least about 100 times greater than the second solubility.

Non-limiting examples of low permeability materials that may be used to construct the LPI 312 include dense plastics such as nylon, polyethylene, polypropylene, polyoxymethylene (also known as acetal, polyacetal, and polyformaldehyde), polytetrafluoroethylene ("PTFE"), other fluoropolymers, and the like, which are chemically compatible with the treatment fluid 120. The low permeability material might also include an elastomer, such as Viton® or a similar fluorinated elastomer. The LPI 312 may also be made of an essentially non-permeable material, such as metal, glass, ceramic, and the like. By way of another non-limiting example, the LPI 312 may be constructed from fiber glass filled (or reinforced) nylon.

When the LPI 312 is constructed using one or more hard materials, such as plastic, metal, glass, and the like, the LPI 312 can withstand considerably greater hoop forces (e.g., than EPDM rubber) and can be employed to make seals capable of sealing against higher pressures (e.g., than EPDM rubber). By way of a non-limiting example, the portion of the LPI 312 that lines the portion 380 of the interior chamber 366 may be constructed from a first material (e.g., metal) and the portion of the LPI 312 that lines the tapered channel 376 of the injection port 116 may be constructed from a different material.

While described as being integrated into the MIC 100, the LPI 312 may be included in (e.g., molded or inserted into) other types of cable accessories with or without direct access ports or injection ports. By way of non-limiting examples, the LPI 312 may be included in a splice, a dead-break elbow, a load-break elbow, a non-load-break elbow, a separable connector, a stress-control termination, a live-front termination, and the like.

Figure 19:
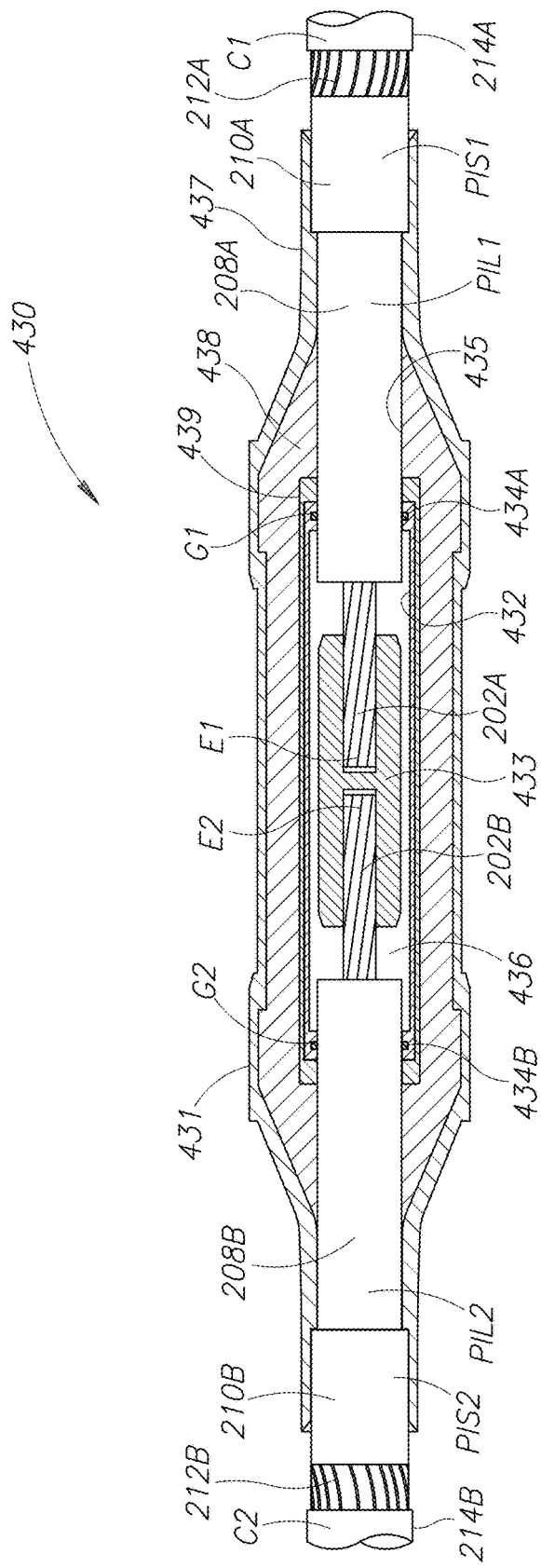
FIG. 19 is a longitudinal cross-sectional side view of a slice assembly including an alternate embodiment of the LPI.

FIG. 19 is a view of a longitudinal cross-section of a splice assembly 430 including an outer body 431, a LPI 432, an electrically conductive connector 433, and optional seals 434A and 434B. The outer body 431 may be constructed using any materials suitable for constructing the MIC body 310. By way of a non-limiting example, the outer body 431 may be implemented using a cold shrink sleeve (not shown). The outer body 431 has a through-channel 435 that passes through an interior chamber 436.

The LPI 432 may be constructed using any materials suitable for constructing the LPI 312. The LPI 432 lines the interior chamber 436. The optional seals 434A and 434B may be positioned inside optional circumferential grooves G1 and G2 formed on an inwardly facing wall of the LPI 432.

The splice assembly 430 is used to interconnect two cable sections C1 and C2. Each of the cable sections C1 and C2 may be substantially similar to the cable 110 (see FIG. 2) and may be implemented using any type of cable suitable for implementing the cable 110. The cable sections C1 and C2 include cable conductors 202A and 202B, respectively, each like the cable conductor 202 (see FIG. 2). The cable sections C1 and C2 may each include one or more layers, like the one or more of the layers 204 (see FIG. 2) of the cable 110, that surround the cable conductors 202A and 202B. For example, the cable conductors 202A and 202B may each be surrounded by a conductor shield (not shown) like the conductor shield 206 (see FIG. 2). The conductor shields (not shown) of the cable sections C1 and C2 may be surrounded by insulation layers 208A and 208B, respectively, each like the insulation layer 208 (see FIG. 2). The insulation layers 208A and 208B may be surrounded by insulation shields 210A and 210B, respectively, each like the insulation shield 210 (see FIG. 2). The insulation shields 210A and 210B may be surrounded by neutrals 212A and 212B, respectively, each like the neutrals 212 (see FIG. 2). The neutrals 212A and 212B may be surrounded by cable jackets 214A and 214B, respectively, each like the cable jacket 214 (see FIG. 2).

The splice assembly 430 is assembled by first exposing ends E1 and E2 of the cable conductors 202A and 202B, respectively. The neutrals 212A and the cable jacket 214A are also stripped back to expose an end portion PIS1 of the insulation shield 210A. Similarly, the neutrals 212B and the cable jacket 214B are stripped back to expose an end portion PIS2 of the insulation shield 210B. The insulation shields 210A and 210B are stripped back to expose portions PIL1 and PIL2, respectively, of the insulation layers 208A and 208B, respectively.

A selected one of the cable sections C1 and C2 is inserted into the through-channel 435 formed in the outer body 431. For ease of illustration, the cable section C1 will be described as being inserted into the through-channel 435. The outer body 431 is slid along the cable section C1 away from the end E1 and spaced longitudinally far enough away from the end E1 to allow the electrically conductive connector 433 to be attached to the end E1. Next, the exposed end E2 of the cable conductor 202B is also coupled to the electrically conductive connector 433. The connector 433 may be implemented using a conventional compression type connector or other connection means known in the art used to connect two cable conductors together to form an electrical connection therebetween.

After the exposed ends E1 and E2 have been coupled together by the connector 433, the outer body 431 is slid along the cable section C1 and over the connector 433, which is positioned inside the interior chamber 436. The cable section C1 extends outwardly from the interior chamber 436 through the through-channel 435 in a first direction, and the cable section C2 extends outwardly from the interior chamber 436 through the through-channel 435 in a second direction that is opposite the first direction.

In embodiments that include the optional seals 434A and 434B, the seals 434A and 434B are sandwiched between the LPI 432 and the exposed portions PIL1 and PIL2, respectively, of the insulation layers 208A and 208B, respectively. In this manner, the interior chamber 436 may be sealed off from the outside environment. In embodiments that omit the optional seals 434A and 434B, portions of the outer body 431 adjacent the LPI 432 may press against the exposed portions PIL1 and PIL2, respectively, of the insulation layers 208A and 208B, and form seals therewith.

In embodiments in which the outer body 431 is implemented using a shrink-to-fit sleeve (e.g. cold shrink sleeve or heat shrink sleeve; not shown), the LPI 432 and the cold shrink sleeve (not shown) are separate components. The cable section C1 is inserted through both the LPI 432 and the cold shrink sleeve (not shown) and the exposed end E1 of the cable section C1 is spaced longitudinally far enough away from the LPI 432 and the cold shrink sleeve (not shown) to allow the electrically conductive connector 433 to be attached thereto. After the exposed ends E1 and E2 have been coupled together by the connector 433, the LPI 432 is slid along the cable section C1 and over the connector 433, which is positioned inside the interior chamber 436. Then, the cold shrink sleeve (not shown) is slid over and shrunk onto the LPI 432. The cold shrink sleeve (not shown) extends outwardly from the LPI 432 and covers at least a portion of each of the exposed portions PIL1 and PIL2.

Like the MIC body 310 (see FIGS. 3 and 5), the outer body 431 has a semi-conductive or high dielectric constant outer insulation shield 437, an insulation portion 438, and a semi-conductive or high dielectric constant inner insulation shield 439. The outer insulation shield 437 contacts and presses against the exposed portions PIS1 and PIS2, respectively, of the insulation shields 210A and 210B. The inner insulation shield 439 lines the interior chamber 436. In the embodiment illustrated, the LPI 432 is adjacent and lines the inner insulation shield 439. The insulation portion 438 is between the outer and inner insulation shields 437 and 439.

When the treatment fluid 120 (see FIG. 1A) is injected into one of the cable sections C1 and C2 (e.g., via the MIC 100 illustrated in FIG. 1A), the treatment fluid 120 will flow into the interior chamber 436. The LPI 432 prevents the treatment fluid 120 (see FIG. 1A) from quickly diffusing into and through the material used to construct the outer body 431 or portions thereof. In other words, the LPI 432 limits unrestricted permeation of the treatment fluid 120 into the outer body 431. Thus, the LPI 432 may help increase the useful life of the splice assembly 430 and/or reduce the amount of the treatment fluid 120 that is lost or wasted by permeation of the treatment fluid 120 into structures outside the cable sections C1 and C2. Further, because the LPI 432 may provide a better seal with respect to the insulation layers 208A and 208B, higher pressures (than those used with conventional injection components) may be used to inject the treatment fluid 120 into the cable sections C1 and C2. For example, the LPI 432 may be configured to withstand injection pressures of about 30 psi to about 1000 psi. By way of another non-limiting example, the SPR processes (discussed above) may be applied to the splice assembly 430.

Optional RFP Plug

Referring to FIG. 1A, as mentioned above, an injection probe assembly (e.g., the injection probe assembly 130) or other injection device may be used to inject the treatment fluid 120 into the injection port 116. However, when the injection of the treatment fluid 120 is completed, the injection probe assembly or other injection device is removed from the injection port 116. When the cable 110 is energized, this exposes the energized cable conductor 202 to the outside environment (via the unobstructed injection port 116) during a time interval that extends from a time at which the injection probe assembly (or other injection device) is removed until a time at which an insulating permanent cap (e.g., the cap 140) is inserted into the injection port 116 to seal it. Unfortunately, during this time interval, the voltage of the cable conductor 202 may ionize air, water, or other materials in the injection port 116 and a flashover (or arc flash) may occur between the cable conductor 202 or the MIC conductor 318 and a ground plane (e.g., the nearby outer insulation shield 332 of the MIC body 310, the nearby outer insulation shield 332' of the MIC body 310', and the like). Such an arc flash can damage the MIC 100 and/or other components connected to or near the MIC 100 (e.g., a transformer or other equipment in the immediate area) and presents a thermal and electrical danger for a human operator.

Referring to FIG. 3, the optional RFP plug 314 may be used to at least partially dielectrically block the injection port 116 and prevent the cable conductor 202 from being exposed to the outside environment (e.g., via the tapered channel 376' of the MIC body 310' or the first through channel 416 of the MIC body 310). Referring to FIG. 3, in the embodiment illustrated, the RFP plug 314 has a generally cylindrical or frustoconical outer shape with circular cross-sectional shape that fits snuggly within the tapered channel 376' (see FIG. 18) in embodiments omitting the LPI 312 or within the first through channel 416 in embodiments that include the LPI 312.

Referring to FIG. 4, the RFP plug 314 includes a reticulated portion 450 that may be adjacent an optional non-reticulated rigid layer 452 (e.g., a washer or similar structure). The reticulated portion 450 is soft and compliant enough to allow an injection probe (e.g., the injection probe pin 136 illustrated in FIG. 1A) or a similar structure to pass therethrough when an injection probe assembly (e.g., the injection probe assembly 130) or other injection device is used to inject the treatment fluid 120 (see FIG. 1A) into the cable 110. The injection probe may form a through-hole in the reticulated portion 450 as it passes through. However, this through-hole is essentially self-sealing because the reticulated portion 450 will close up enough after the injection probe is withdrawn to create a fluid-dielectric seal within the injection port 116.

The optional rigid layer 452 fixes the position of the RFP plug 314 within the tapered channel 376' (see FIG. 18) in embodiments omitting the LPI 312 or within the first through channel 416 in embodiments that include the LPI 312. The rigid layer 452 includes a through-channel 440 that allows an injection probe (e.g., the injection probe pin 136 illustrated in FIG. 1A) or a similar structure to pass therethrough when an injection probe assembly (e.g., the injection probe assembly 130) or other injection device is used to inject the treatment fluid 120 (see FIG. 1A) into the cable 110.

Referring to FIG. 18, in embodiments of the MIC 100 that omit the LPI 312, the optional RFP plug 314 may be positioned inside the tapered channel 376' of the injection port 116. The RFP plug 314 has an outer shape configured to conform to the shape of a portion of the tapered channel 376' adjacent the inner opening 372'. The rigid layer 452 fits snuggly within that portion of the tapered channel 376' to anchor the RFP plug 314. This prevents the RFP plug 314 from passing into the interior chamber 366' of the MIC body 310' and from being pushed out of the tapered channel 376' by fluid exiting the cable 110.

By way of another example, referring to FIG. 3, in embodiments of the MIC 100 that include the LPI 312, the optional RFP plug 314 may be inserted into the first through channel 416 and may rest upon the shoulder 418 (see FIGS. 6A and 6B). The RFP plug 314 has an outer shape configured to conform to the shape of a portion of the first through channel 416 adjacent the shoulder 418 and fit snuggly within that portion of the first through channel 416. The narrower portion of the first through channel 416 between the shoulder 418 and the inner opening 412 prevents the RFP plug 314 from passing into the second through channel 426 formed in the LPI 312. The snug fit between the rigid layer 452 and the LPI 312 prevents the RFP plug 314 from being pushed out of the first through channel 416 by fluid exiting the cable 110.

Referring to FIG. 3, when inserted into the tapered channel 376' (see FIG. 18) or the first through channel 416, the optional rigid layer 452 (see FIG. 4) is oriented to face toward the cable conductor 202. In embodiments including the LPI 312, the optional rigid layer 452 (see FIG. 4) may rest upon the shoulder 418 (see FIGS. 6A and 6B).

Referring to FIG. 3, the reticulated portion 450 (see FIG. 4) of the RFP plug 314 may be configured to be compressed radially by the channel (the tapered channel 376' depicted in FIG. 18 or the first through channel 416) into which the RFP plug 314 is to be inserted. This radial compression helps assure that the treatment fluid 120 in the reticulated portion 450 of the RFP plug 314 is in full contact with the walls of the channel (the tapered channel 376' depicted in FIG. 18 or the first through channel 416) into which the RFP plug 314 is inserted to thereby dielectrically close the injection port 116.

Referring to FIG. 3, the RFP plug 314 is configured to allow insertion of the stem portion 142 (see FIG. 1A) of the cap 140 (or other permanent cap) into the tapered channel 376' (see FIG. 18) in embodiments omitting the LPI 312 or the first through channel 416 in embodiments that include the LPI 312 after the treatment fluid 120 has been introduced. The stem portion 142 may displace and/or compress the RFP plug 314 inside the channel (the tapered channel 376' depicted in FIG. 18 or the first through channel 416) into which the RFP plug 314 has been inserted. For example, referring to FIG. 30, in embodiments that include the LPI 312 and the rigid layer 452 (see FIG. 4), the reticulated portion 450 (see FIG. 4) may compress against the rigid layer 452 (which is pressed against the shoulder 418) to allow the stem portion 142 of the cap 140 (or other permanent cap) to be received fully into the first through channel 416.

The RFP plug 314 may be constructed in accordance with any of the methods described in U.S. Pat. No. 8,475,194, filed on Oct. 8, 2010, titled Reticulated Flash Prevention Plug, which is incorporated herein by reference in its entirety. For example, the reticulated portion 450 of the RFP plug 314 may be fabricated or punched from a reticulated material having good dielectric strength and resistivity. The term "reticulated" is defined as a grid-like, porous structure which blocks the passage of items larger than its characteristic pore size, while letting smaller items and fluids pass therethrough. Non-limiting examples of suitable reticulated materials include organic sponge materials, synthetic sponge materials, cotton, woven or non-woven textiles, plastic or elastomeric open-celled foams, felt, fiber glass, sintered glass, or sintered ceramic or a solid material modified to allow fluid passage. The reticulated portion 450 of the RFP plug 314 may be formed from a compressible material with a density of less than 2.5 pounds per cubic foot, a 50% compression set of less than 15%, and a 25% compression force deflection less than 0.5 psi, as would be typical of a polyurethane open-celled foam that has been processed to create a reticulated structure. The rigid layer 452 of the RFP plug 314 may be fabricated from a stiff insulating material, such as epoxy, vulcanized fiber, fiberglass, a phenolic resin, ceramic, an engineering plastic, or the like, or it may be metallic.

MIC Conductor

Referring to FIG. 3, the MIC conductor 318 has a compression connector 502 connected to an elongated portion 504. The second end portion 302 of the MIC 100 includes the elongated portion 504 of the MIC conductor 318 and the second end 352 of the MIC body 310. The second end portion 302 of the MIC 100 may simulate the cable conductor 202 and one or more of the layers 204 (see FIG. 2) of the cable 110 surrounding the cable conductor 202. The elongated portion 504 may be characterized as simulating the cable conductor 202. The insulation portion 334 at the second end 352 of the MIC body 310 may be characterized as simulating the insulation layer 208 of the cable 110. The insert 336 at the second end 352 of the MIC body 310 may be characterized as simulating the conductor shield 206 (see FIG. 2) of the cable 110.

Because the second end portion 302 of the MIC 100 may simulate the cable conductor 202 and one or more of the layers 204 (see FIG. 2) surrounding the cable conductor 202, the second end portion 302 of the MIC 100 may be connected to any cable accessories configured to be connected to the cable 110. The second end portion 302 of the MIC 100 may either be sized specifically for use with the cable accessory 112 (see FIG. 1A) or configurable for use with different cable accessories (e.g., by adjusting the length of the elongated portion 504 of the MIC conductor 318, the insulation portion 334 at the second end 352 of the MIC body 310, and/or the insert 336 at the second end 352 of the MIC body 310). Further, the size and shape of the outer insulation shield 332 adjacent the second end 352 of the MIC body 310 may be adjusted for use with other cable accessories. The MIC conductor 318 may be rigid or flexible and may help make up cable length lost during a retrofit.

Referring to FIG. 1A, the MIC conductor 318 may be characterized as providing an integral component interface with the cable accessory 112. Such an integral component interface may be more reliable than connecting the MIC 100 to the cable accessory 112 with a section of cable or cable stub (not shown). Further, the MIC conductor 318 does not require preparation. Thus, an amount of time required to prepare and assemble an interface with the cable accessory 112 is reduced or eliminated completely.

Additionally, the MIC conductor 318 reduces by several inches the total length of a subassembly that includes both the MIC 100 and the cable accessory 112 when compared to a subassembly that uses a stub (instead of the MIC conductor 318) to connect the MIC 100 and the cable accessory 112 together. This space savings may be significant because many transformers, junction boxes, splice boxes, and the like in which the MIC 100 might be installed have limited room for injection equipment (which was not contemplated when the enclosure was designed and installed). In other words, the MIC 100 may be installed and used (e.g., for injection or direct voltage measurements) in locations not designed to accommodate such operations.

Referring to FIG. 8, in the embodiment illustrated, the compression connector 502 is connected to the elongated portion 504 by a tapered portion 506. The compression connector 502 has an opening 510 into a longitudinally extending channel 512 configured to receive therein and house an end most portion of the exposed end portion 224 (see FIGS. 6A and 6B) of the cable conductor 202 (see FIGS. 6A and 6B). Referring to FIG. 6A, the compression connector 502 is configured to be placed over the exposed end portion 224 of the cable conductor 202 (when the cable conductor 202 is inside the VIA assembly 320) and compressed or swaged within the VIA assembly 320 to thereby connect the cable conductor 202 with both the VIA assembly 320 and the elongated portion 504. By way of a non-limiting example, the compression connector 502 may be implemented as an electrically conductive hollow cylinder, a bimetal copper extension, a conductive rod (e.g., constructed from aluminum, copper, another electrically conductive metal, and the like) configured to be connected (e.g., crimped, swaged, fused, welded, or attached using other methods known in the art) to the exposed end portion 224 (see FIGS. 6A and 6B) of the cable conductor 202 (see FIGS. 6A and 6B), and the like.

Referring to FIG. 8, the elongated portion 504 may be implemented as an elongated electrically conductive rod that has a generally circular cross-sectional shape with an outer diameter 514 that is substantially similar the outer diameter 226 (see FIG. 2) of the cable conductor 202. Referring to FIG. 1A, the elongated portion 504 has a free end 516 (see FIG. 8) configured to mate with the fitting 230 of the cable accessory 112 and form an electrical connection therewith.

Optional VIA Assembly

The optional VIA assembly 320 is configured for use with the LPI 312 and may be omitted from embodiments (such as the embodiment illustrated in FIG. 18) that do not include the LPI 312. Referring to FIG. 7, which depicts the subassembly 330 that includes the VIA assembly 320, the cable 110, and the MIC conductor 318. The VIA assembly 320 includes a VIA body 550, VIA seals 552A and 552B, and a valve assembly 554, but not the cable 110 and the MIC conductor 318.

Figure 10:
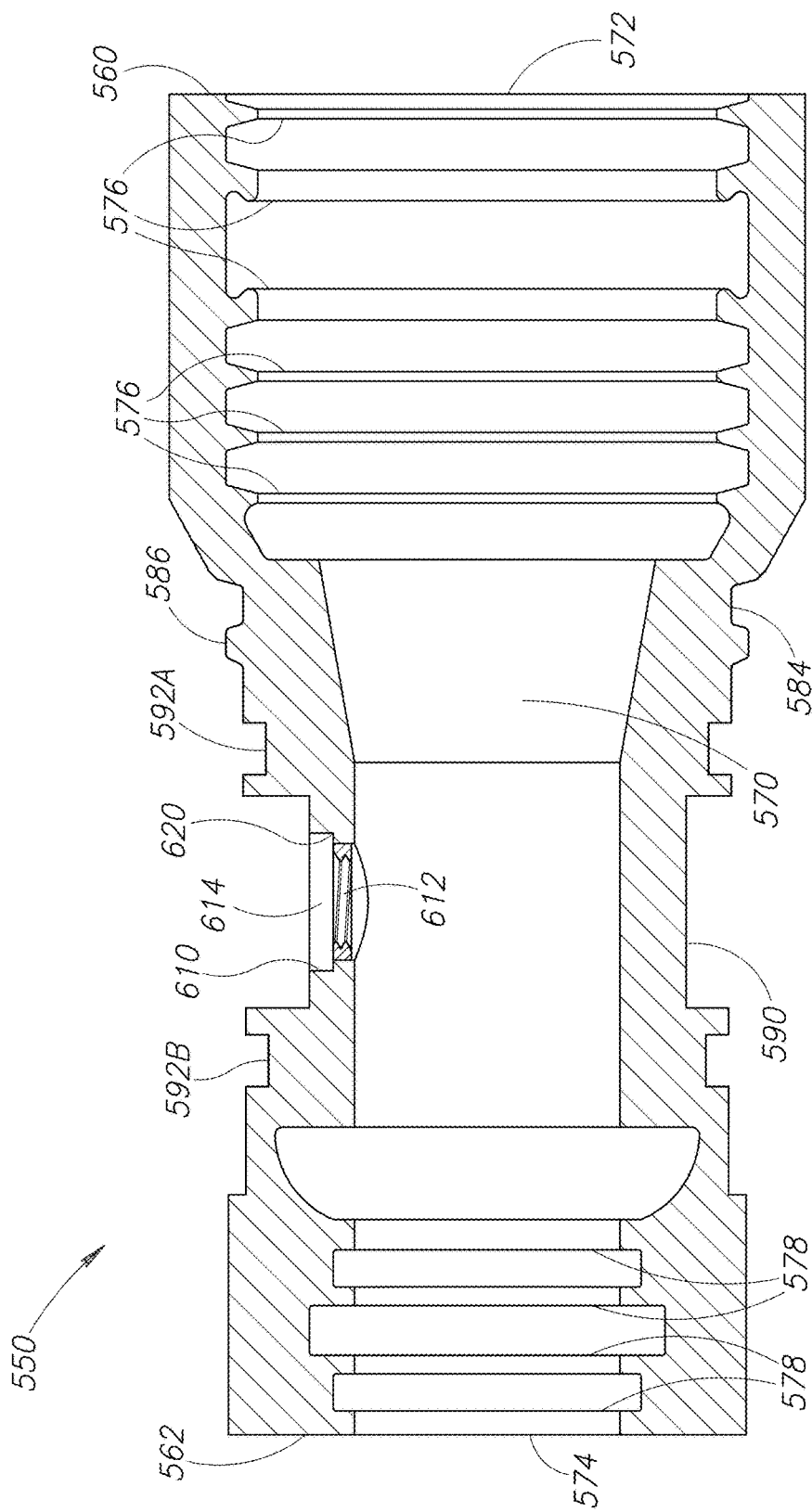
FIG. 10 is a longitudinal cross-sectional side view of the VIA body.

Referring to FIG. 9, the VIA body 550 may be fabricated from a malleable material, such as metal (e.g., aluminum or stainless steel). The VIA body 550 has a first end 560 opposite a second end 562. Each of the first and second ends 560 and 562 may be implemented as a hollow cylinder or compression connector. FIGS. 9 and 10 depict the first and second ends 560 and 562 before they have been swaged. In contrast, FIG. 7 depicts the first and second ends 560 and 562 after they have been swaged.

Referring to FIGS. 9 and 10, the VIA body 550 has an open ended internal channel 570 that extends from its first opening 572 at the first end 560 to its second opening 574 at the second end 562 of the VIA body 550. Referring to FIG. 10, at the first end 560, the VIA body 550 has one or more first gripping projections 576 that extend into the internal channel 570. Similarly, at the second end 562, the VIA body 550 has one or more second gripping projections 578 that extend into the internal channel 570. The first gripping projections 576 are configured to allow an end most portion of the exposed end portion 223 (see FIGS. 6A and 6B) of the insulation layer 208 (see FIGS. 6A and 6B) to be inserted through the first opening 572 and into the internal channel 570. The second gripping projections 578 are configured to allow the compression connector 502 (see FIGS. 6A and 6B) to be inserted through the second opening 574, into the internal channel 570, and onto the end most portion of the exposed end portion 224 (see FIGS. 6A and 6B) of the cable conductor 202 (see FIGS. 6A and 6B).

Referring to FIG. 7, the first end 560 may be swaged onto the exposed end portion 223 of the insulation layer 208 of the cable 110, which closes and seals the internal channel 570 (see FIGS. 9 and 10) at the first end 560 of the VIA body 550. Swaging presses the first gripping projections 576 (see FIG. 10) into the insulation layer 208 and forms a compression connection therebetween.

The second end 562 may be swaged onto the compression connector 502 of the MIC conductor 318, which closes and seals the internal channel 570 (see FIGS. 9 and 10) at the second end 562 of the VIA body 550. Swaging presses the second gripping projections 578 (see FIG. 10) into the compression connector 502 and forms a compression connection therebetween. As shown in FIGS. 6A and 6B, the swaging also presses the compression connector 502 into the exposed end portion 224 of the cable conductor 202.

Referring to FIG. 7, the swaging at the first and second ends 560 and 562 provides fluid-tight circumferential seals at opposite ends of the internal channel 570 (see FIGS. 9 and 10) and defines a sealed interior chamber 580 (see FIGS. 6A and 6B) therebetween within the internal channel 570. As shown in FIGS. 6A and 6B, within the subassembly 330 (see FIG. 7), the cable conductor 202 extends through the interior chamber 580. The swaging at the first and second ends 560 and 562 may be configured to withstand injection pressures of about 30 psi to about 1000 psi.

Referring to FIGS. 9 and 10, optionally, a first groove 584 is formed in the VIA body 550 near the first end 560. The optional first groove 584 is configured to receive the optional projection 378 (see FIG. 5) of the MIC body 310 (see FIG. 5). Referring to FIG. 6B, engagement between the optional projection 378 (see FIG. 5) and the optional first groove 584 (see FIG. 9) helps maintain the VIA assembly 320 in a desired longitudinal position within the MIC body 310.

Referring to FIGS. 9 and 10, optionally, the VIA body 550 may include at least one projection 586 configured to be received inside the optional recess(es) 379 (see FIG. 5) formed in the MIC body 310 (see FIG. 5) within the interior chamber 366 (see FIG. 5). In the embodiment illustrated, the optional projection 586 is positioned adjacent the optional first groove 584 with the first groove 584 being flanked by the projection 586 and the first end 560. Referring to FIG. 6B, engagement between the optional projection(s) 586 (see FIG. 9) and the optional recess(es) 379 (see FIG. 5) helps maintain the VIA assembly 320 in the desired longitudinal position within the MIC body 310. The VIA body 550 may stop sliding along the MIC axis 340 and with respect to the MIC body 310 when the optional projection(s) 586 of the VIA body 550 abuts the edge 428 of the LPI 312. This positively locates the VIA body 550 axially within the LPI 312.

Referring to FIG. 6B, a second groove 590 is formed in the VIA body 550 and positioned to be adjacent the injection port 116 when the VIA assembly 320 is in the desired longitudinal position within the MIC body 310. The second groove 590 may be generally cylindrically shaped and have a curved outer surface. Thus, along the second groove 590, the VIA body 550 may have a generally circular cross-sectional shape.

Referring to FIGS. 9 and 10, a first seal groove 592A is spaced longitudinally from the second groove 590 toward the first end 560, and a second seal groove 592B is spaced longitudinally from the second groove 590 toward the second end 562. The first and second seal grooves 592A and 592B are configured to receive the VIA seals 552A and 552B (see FIG. 7), respectively. In the embodiment illustrated in FIG. 7, the VIA seals 552A and 552B may be implemented as O-rings constructed from an elastomeric material.

Referring to FIG. 6B, the VIA seals 552A and 552B are compressed between the VIA body 550 and the LPI 312. In this manner, the VIA seals 552A and 552B seal off a fluid chamber 600 within the second through channel 426. The second groove 590 (which is positioned longitudinally between the first and second seal grooves 592A and 592B shown in FIGS. 9 and 10) is within the fluid chamber 600 and the inner opening 412 of the channel 416 (within the injection port 116) opens into the fluid chamber 600. Thus, the treatment fluid 120 (see FIG. 1A) injected through the injection port 116 may be confined within the fluid chamber 600 by the VIA seals 552A and 552B and the LPI 312.

When interfacing with the LPI 312, the VIA seals 552A and 552B may be configured to withstand injection pressures of about 30 psi to about 1000 psi. The VIA seals 552A and 552B may be implemented as O-ring seals, D-ring seals, and the like.

Referring to FIGS. 9 and 10, an aperture or a through-hole 610 is formed in the VIA body 550 within the second groove 590. Referring to FIG. 6B, the through-hole 610 interconnects the fluid chamber 600 with the sealed interior chamber 580 within the VIA body 550. The VIA seals 552A and 552B seal off or isolate the fluid chamber 600 by forming circumferential seals between the VIA assembly 320 and the LPI 312 or the MIC body 310. The injection port 116 is in fluid communication with the isolated fluid chamber 600. Thus, there is fluidic communication or a fluid pathway between the injection port 116, the fluid chamber 600, the sealed interior chamber 580 within the VIA body 550, and the interior 122 of the cable 110. The treatment fluid 120 (see FIG. 1A) can readily flow in either direction between the interior 122 of the cable 110 and the injection port 116.

Referring to FIG. 10, the through-hole 610 has an inner portion 612 adjacent an outer portion 614. Inside threads 616 (see FIG. 11A) are formed in the VIA body 550 along the inner portion 612 of the through-hole 610. The outer portion 614 is wider (e.g., has a larger diameter) than the inner portion 612. A stop wall or shelf 620 is defined at the border between the inner and outer portions 612 and 614.

Referring to FIG. 9, in the embodiment illustrated, a portion of the VIA body 550 surrounding the through-hole 610 has been removed to provide a substantially planar outer surface 624 surrounding the through-hole 610. However, this is not a requirement. In the embodiment illustrated, the substantially planar outer surface 624 extends the entire width of the second groove 590 (along the MIC axis 340 shown in FIG. 5).

Referring to FIG. 6B, the through-hole 610 is configured to receive at least a portion of the valve assembly 554, which restricts the flow of the treatment fluid 120 (see FIG. 1A) between the fluid chamber 600 and the sealed interior chamber 580 within the VIA body 550.

Valve Assembly

Figure 11A:
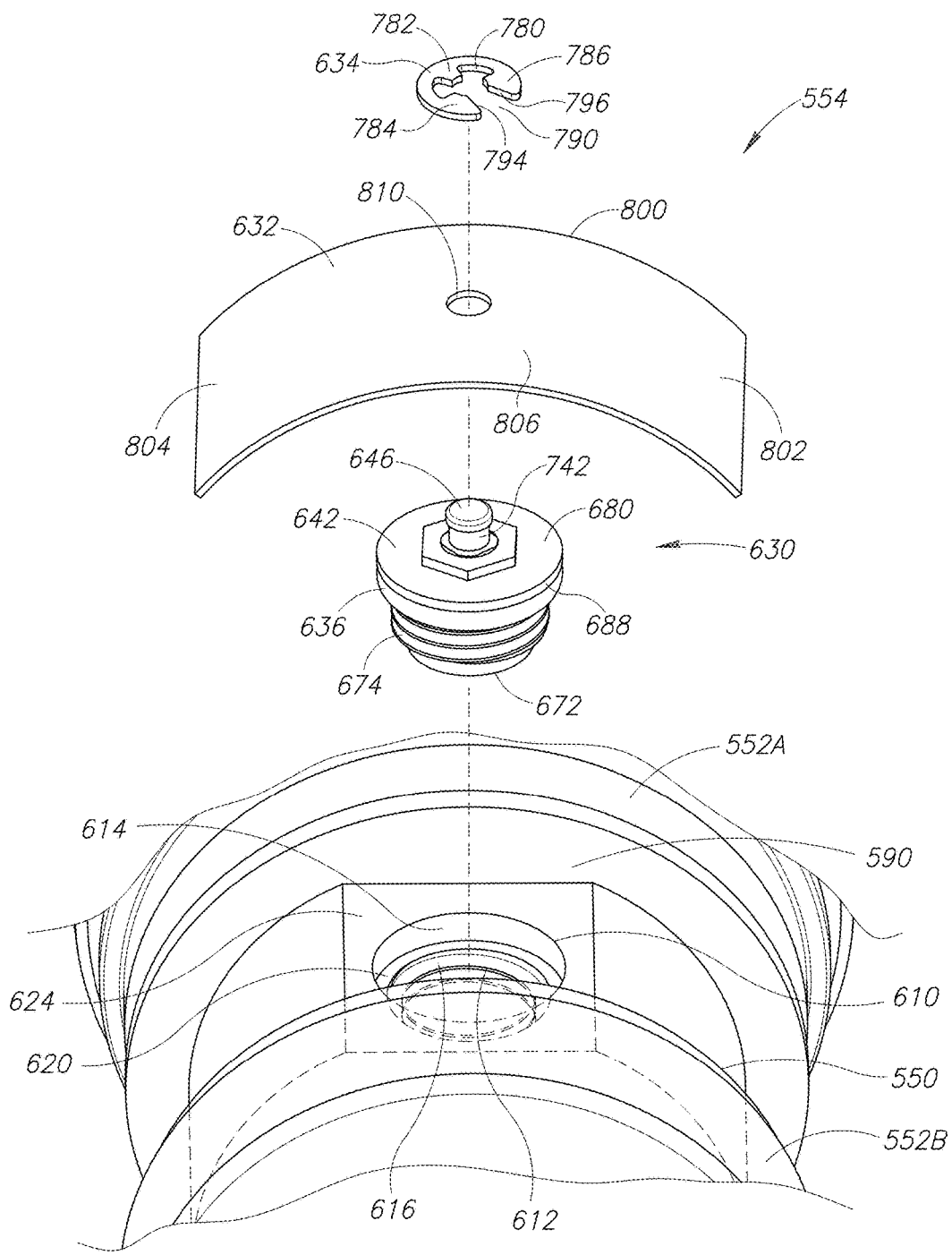
FIG. 11A is a partially exploded perspective view of the optional VIA assembly, which includes the VIA body, VIA seals, a first embodiment of a biasing member, an optional clip, and a valve cartridge.

Referring to FIG. 11A, the valve assembly 554 includes a valve cartridge 630, a biasing member 632 (e.g., a C-spring), and an optional clip 634. As will be explained below, after the valve cartridge 630 is installed in the through-hole 610 formed in the VIA body 550, the biasing member 632 is attached to the poppet member 646 (e.g., by the optional clip 634). Referring to FIG. 7, the biasing member 632 is positioned within the second groove 590 formed in the VIA body 550.

Figure 12A:
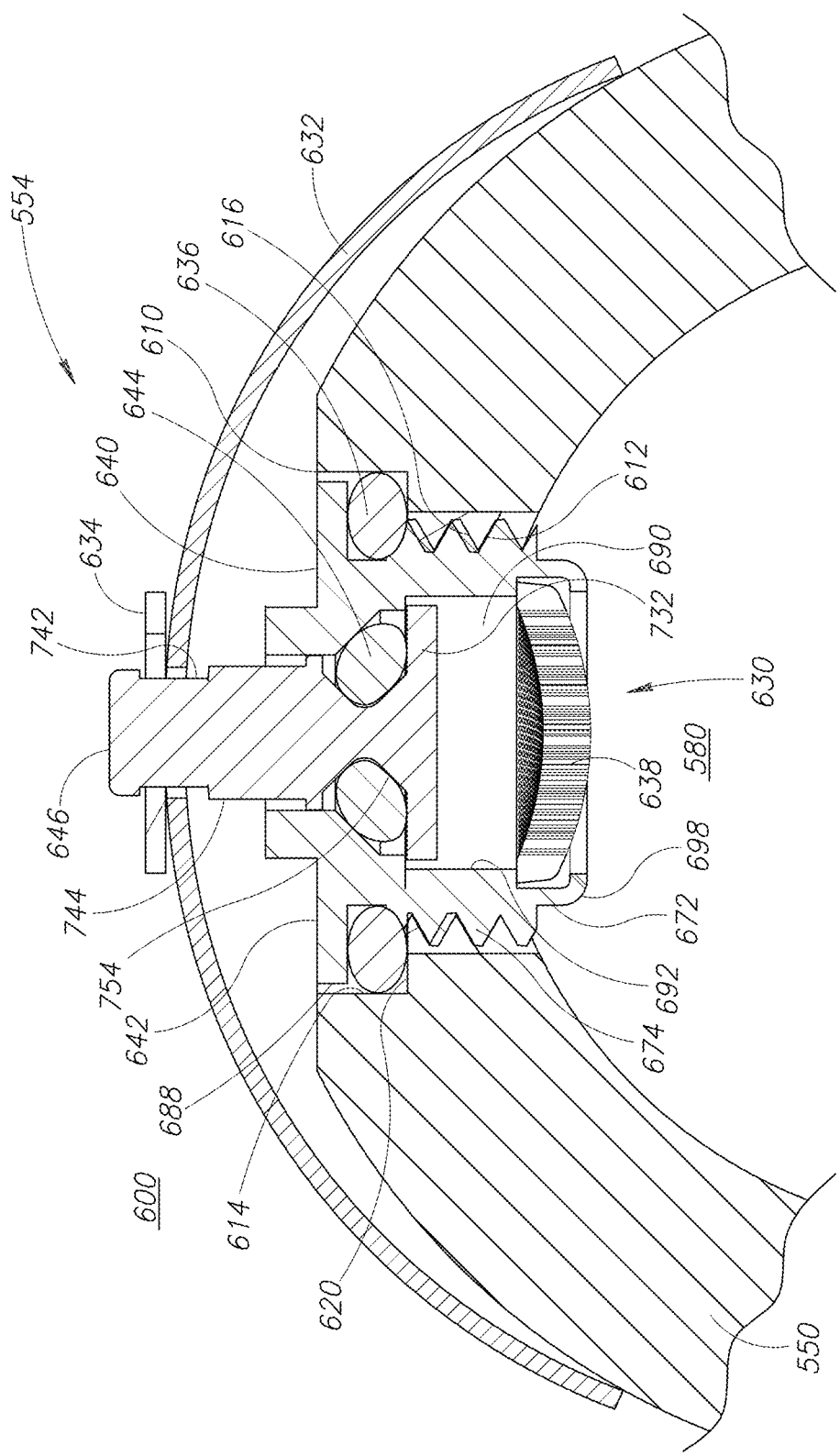
FIG. 12A is a lateral cross-sectional view of the optional VIA assembly in which a poppet member of the valve cartridge is depicted in a closed position.
Figure 12B:
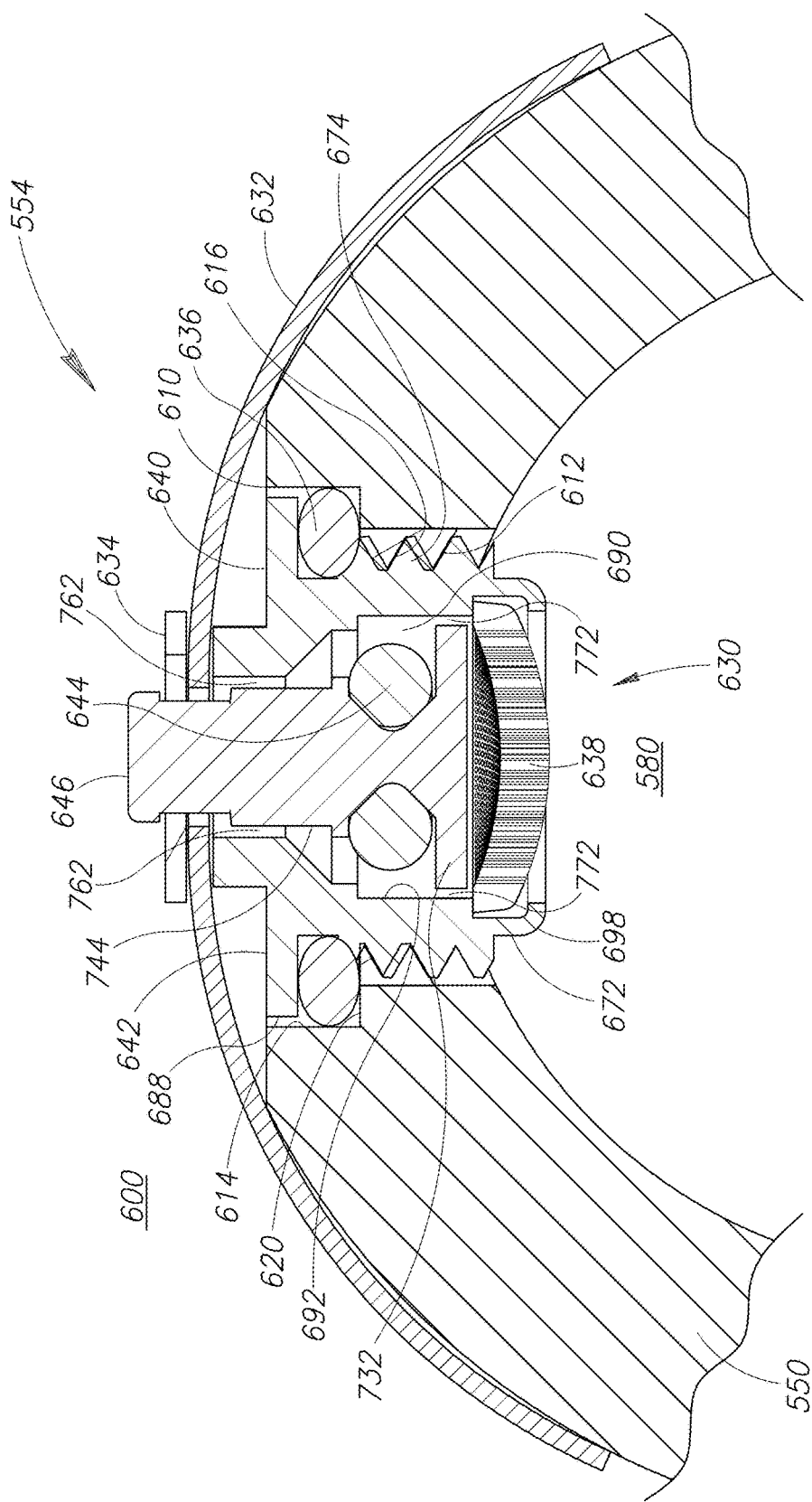
FIG. 12B is a lateral cross-sectional view of the optional VIA assembly in which the poppet member of the valve cartridge is depicted in an open position.
Figure 13:
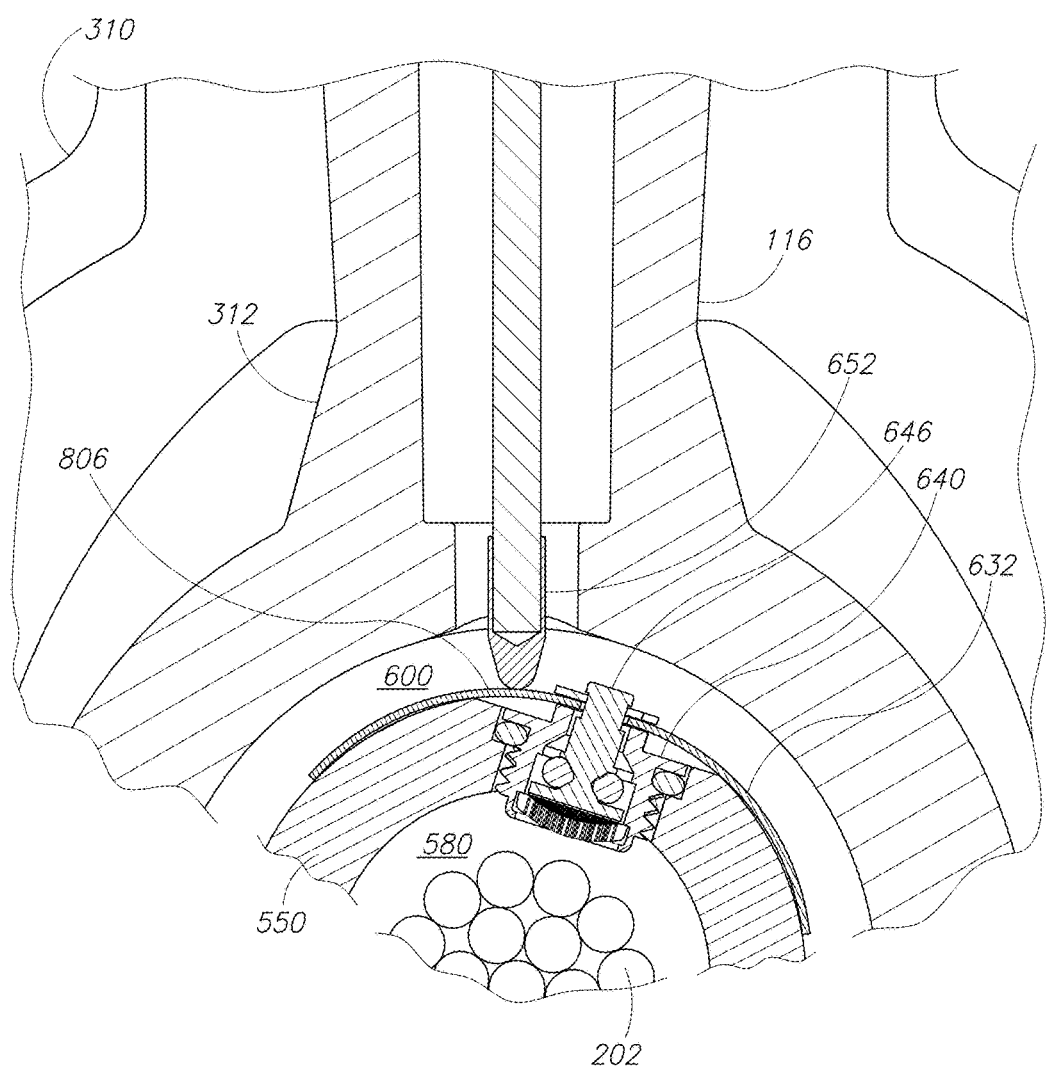
FIG. 13 is a lateral cross-sectional view of the MIC of FIG. 1A with an injection probe pin inserted into the injection port of the MIC and pressing upon the biasing member, which moves the poppet member to the position depicted in FIG. 12B.
Figure 14:
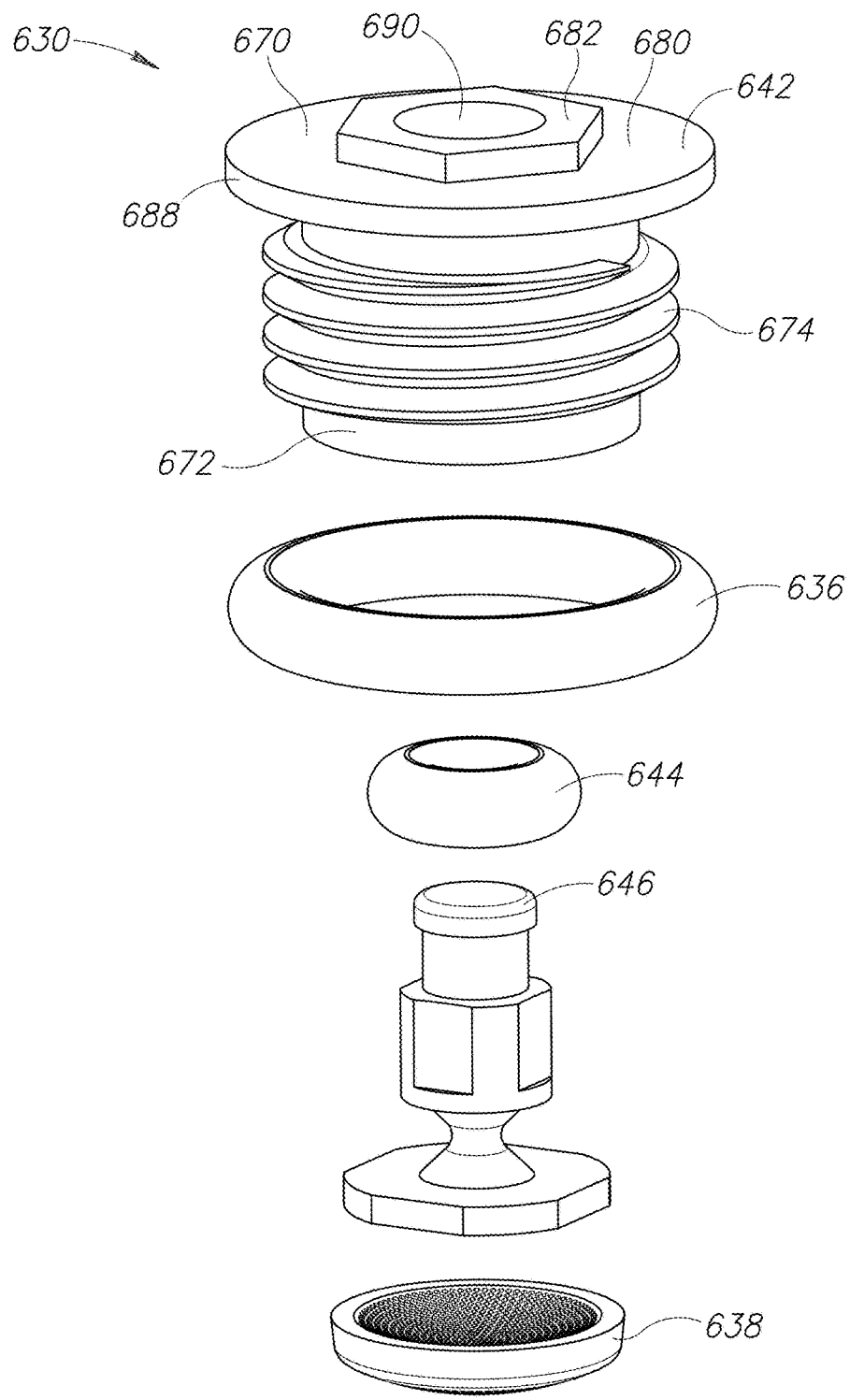
FIG. 14 is an exploded perspective view of the valve cartridge of the optional VIA assembly.

Referring to FIG. 14, the valve cartridge 630 includes an external valve seal 636, a filter 638, and a poppet valve 640 (see FIGS. 12A-13) formed by a valve body 642, an internal valve seal 644, and a movable poppet member 646. Referring to FIG. 12A, the poppet valve 640 is closed when the poppet member 646 is pushed outwardly (e.g., by the biasing member 632 and any outwardly directed force created by internal fluid pressure) and the internal valve seal 644 is captured between the poppet member 646 and the inside of the valve body 642. Referring to FIG. 12B, the poppet valve 640 is open when the poppet member 646 is pushed inwardly (e.g., by an injection probe pin 652 illustrated in FIG. 13) and the internal valve seal 644 is spaced apart from the inside of the valve body 642.

Referring to FIG. 13, the poppet valve 640 may be opened by inserting the injection probe pin 652 into and through the injection port 116 and pressing upon either the poppet member 646 or the biasing member 632. The poppet valve 640 may be closed by removing the injection probe pin 652 and allowing the biasing member 632 (and any outwardly directed force created by internal fluid pressure) to bias the poppet member 646 outwardly and into a closed position (shown in FIG. 12A). When the poppet valve 640 is closed, any of the treatment fluid 120 (see FIG. 1A) inside the sealed interior chamber 580 in the VIA body 550 is trapped therein.

The injection probe pin 652 may be implemented as any injection probe configured to inject the injection fluid 120 (see FIG. 1A) into the injection port 116. By way of a non-limiting example, the injection probe pin 652 may be implemented as the injection probe pin 136 illustrated in FIG. 1A.

Valve Body

Figure 15:
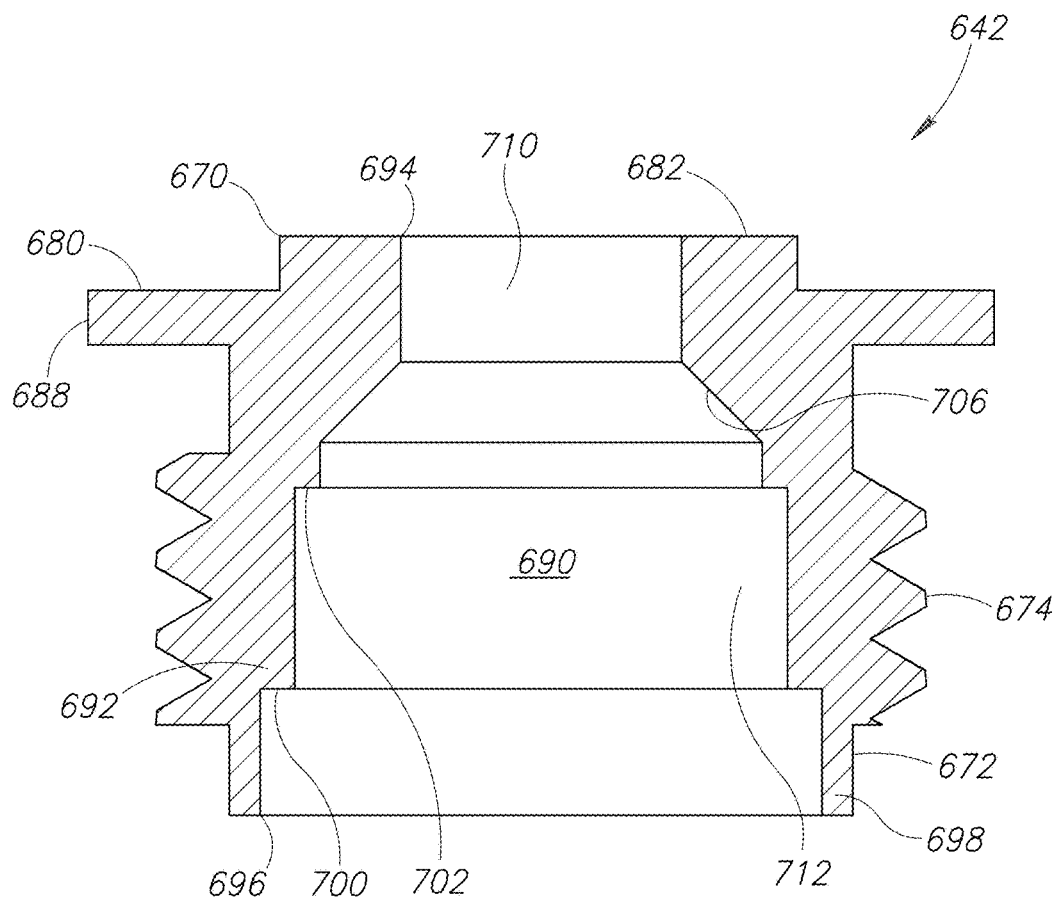
FIG. 15 is a cross-sectional side view of a valve body of the valve cartridge.

Referring to FIGS. 14 and 15, the valve body 642 has an outer portion 670 opposite an inner portion 672. Referring to FIGS. 12A and 12B, the inner portion 672 is configured to be positioned inside the inner portion 612 of the through-hole 610 formed in the VIA body 550. In the embodiment illustrated, the inner portion 672 has outside threads 674 configured to threadedly engage with the inside threads 616 of the through-hole 610.

Referring to FIGS. 14 and 15, the outer portion 670 has an outwardly facing surface 680. Optionally, an outwardly projecting hex-shaped protrusion 682 may extend outwardly from the surface 680. The protrusion 682 may be used to grip the valve body 642 and apply torque to the valve body 642 to thread the valve body 642 into the through-hole 610 (see FIGS. 9-12B) during installation and/or removal of the valve cartridge 630 (see FIGS. 11A, 12A, 12B and 14).

The surface 680 may extend along an overhang portion 688 configured to be at least partially received inside the outer portion 614 (see FIGS. 12A and 12B) of the through-hole 610. Referring to FIGS. 12A and 12B, the external valve seal 636 (e.g., an O-ring) is positioned on the valve body 642 between the overhang portion 688 and the outside threads 674. When the valve cartridge 630 is installed in the through-hole 610, the external valve seal 636 is positioned between the overhang portion 688 and the shelf 620 to form a fluid tight seal therebetween.

Referring to FIG. 15, the valve body 642 has an interior through channel 690 defined by an outer sidewall 692. The channel 690 has an outer opening 694 formed in the outer portion 670, and an inner opening 696 formed in the inner portion 672 of the valve body 642. In the embodiment illustrated, the channel 690, the outer opening 694, and the inner opening 696 each have a generally circular cross-sectional shape.

Optionally, the inner opening 696 may be defined by an inwardly extending deformable lip 698 that extends away from the outside threads 674 and into the sealed interior chamber 580 (see FIGS. 6A, 6B, and 12A-13) in the VIA body 550 when the valve cartridge 630 is installed in the through-hole 610. The lip 698 is illustrated in FIG. 15 before being deformed. In contrast, FIGS. 12A and 12B depict the lip 698 after it has been deformed. As shown in FIGS. 12A and 12B, the lip 698 may be deformed into the channel 690 to trap the filter 638 therein.

Referring to FIG. 15, a filter stop 700 is formed in the sidewall 692 inside the channel 690. The filter stop 700 is spaced outwardly from the inner opening 696. The filter 638 (see FIGS. 12A, 12B, and 14) may be inserted into the channel 690 through the inner opening 696 and pressed against the filter stop 700 by deforming the lip 698 (As shown in FIGS. 12A and 12B) into the channel 690 to thereby trap the filter 638 between the inwardly bent lip 698 and the filter stop 700.

A valve stop 702 is formed in the sidewall 692 inside the channel 690. The valve stop 702 is spaced outwardly from the filter stop 700. A tapered portion 706 is formed in the sidewall 692 between the valve stop 702 and the outer opening 694. In the embodiment illustrated, the tapered portion 706 is spaced outwardly from the valve stop 702. The tapered portion 706 is adjacent to an outer channel portion 710 that extends between the tapered portion 706 and the outer opening 694. In the embodiment illustrated, the outer channel portion 710 is narrower than an inner channel portion 712 that extends from the valve stop 702 to the filter stop 700.

Poppet Member

Figure 16:
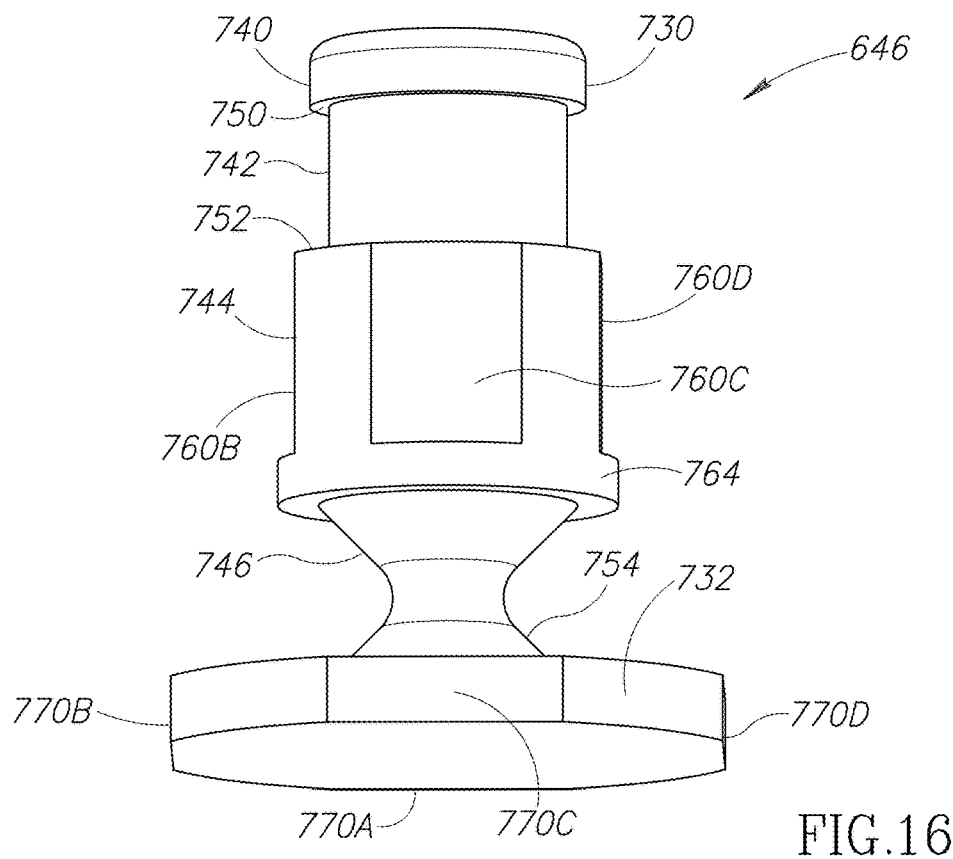
FIG. 16 is a side perspective view of a poppet member of the valve cartridge.

Referring to FIG. 16, the poppet member 646 has a stem portion 730 that extends outwardly from an inner stop portion 732. The stem portion 730 includes an outer overhanging stop portion 740, an outer recessed portion 742, an intermediate portion 744, and an inner recessed portion 746. The outer recessed portion 742 is flanked by the outer overhanging stop portion 740 and the intermediate portion 744. Referring to FIG. 11A, the optional clip 634 is configured to be clipped onto the outer recessed portion 742. Returning to FIG. 16, the outer overhanging stop portion 740 includes an inwardly facing stop wall 750 that is adjacent the outer recessed portion 742. The inwardly facing stop wall 750 retains the optional clip 634 (see FIGS. 7, 11A, 12A, and 12B) within the outer recessed portion 742. The intermediate portion 744 includes an outwardly facing stop wall 752 that is adjacent the outer recessed portion 742 and faces the inwardly facing stop wall 750 across the outer recessed portion 742.

The inner recessed portion 746 is configured to receive at least a portion of the internal valve seal 644 (see FIGS. 12A, 12B, and 14) and retain the internal valve seal 644 between the intermediate portion 744 and the inner stop portion 732. The inner recessed portion 746 has an outwardly facing tapered portion 754 positioned alongside and inwardly of the internal valve seal 644. As may be viewed in FIGS. 12A and 12B, the internal valve seal 644 extends laterally outwardly beyond the intermediate portion 744 (see FIG. 16). In the embodiment illustrated, the inner stop portion 732 extends laterally outwardly beyond the internal valve seal 644.

The inner stop portion 732 and at least a portion of the stem portion 730 (see FIG. 16) are positioned inside the channel 690 of the valve body 642. In the embodiment illustrated, the inner stop portion 732, the inner recessed portion 746 (with the internal valve seal 644 received therein), and the intermediate portion 744 are positioned inside the channel 690 of valve body 642. The intermediate portion 744 is positioned inside the outer channel portion 710 (see FIG. 15) of the channel 690 and moves therein. Returning to FIG. 15, the inner stop portion 732 (see FIGS. 12A and 12B) is positioned inside the inner channel portion 712 of the channel 690 and moves therein between the valve stop 702 and the filter 638 (see FIGS. 12A and 12B).

The poppet member 646 moves within the channel 690 between a closed position (see FIG. 12A) and an open position (see FIGS. 12B and 13). The poppet valve 640 is closed (see FIG. 12A) when the poppet member 646 is in the closed position. On the other hand, the poppet valve 640 is open (see FIGS. 12B and 13) when the poppet member 646 is moved inwardly from the closed position allowing the treatment fluid 120 (see FIG. 1A) to flow through the poppet valve 640.

Referring to FIG. 12A, when the poppet member 646 is in the closed position, the inner stop portion 732 abuts the valve stop 702 (see FIG. 15). This causes the outwardly facing tapered portion 754 to press the internal valve seal 644 (e.g., an O-ring) against the tapered portion 706 (see FIG. 15) of the sidewall 692 (see FIG. 15) and form a fluid tight seal therewith, which prevents the flow of the treatment fluid 120 (see FIG. 1A) through the channel 690 of the valve body 642. The arrangement of the tapered portions 754 and 706 prevents normally occurring flash (which is material left on a part from a molding process) on the internal valve seal 644 from interfering with the sealing action occurring within the poppet valve 640. Furthermore by utilizing a tapered interface, the internal valve seal 644 is captured and is not displaced by fluid flow (characteristic of a radial seal) through the poppet valve 640. Additionally, the poppet member 646 need only travel a short distance with respect to the valve body 642 to separate the internal valve seal 644 from the sealing surface (characteristic of a face seal) of the tapered portion 706 (see FIG. 15). Any gap defined between the outer channel portion 710 (see FIG. 15) and the poppet member 646 is too small for the internal valve seal 644 to pass through. Similarly, any gap defined between the inner stop portion 732 and the valve stop 702 (see FIG. 15) is also too small for the internal valve seal 644 to pass through. Thus, the internal valve seal 644 is trapped between the tapered portion 706 (see FIG. 15) and the tapered portion 754 (see FIG. 16) of the poppet member 646 and forms a fluid tight seal therebetween.

On the other hand, referring to FIG. 12B, the poppet valve 640 is open when the inner stop portion 732 is spaced inwardly from the valve stop 702 (see FIG. 15), which spaces the internal valve seal 644 inwardly apart from the tapered portion 706 of the sidewall 692. This allows the treatment fluid 120 to flow through the channel 690 of valve body 642. Further inward movement of the poppet member 646 may terminate when the inner stop portion 732 contacts the filter 638 or the biasing member 632 contacts the outer portion 670 of valve body 642.

The channel 690 of the valve body 642 allows the treatment fluid 120 to flow therethrough (and into the interior chamber 580 of the VIA body 550) at between about 30 psi and about 1000 psi when the poppet valve 640 is open (or the poppet member 646 is in the open position). Similarly, the poppet valve 640 is configured to hold an internal pressure (e.g., between about 30 psi and about 1000 psi) inside the interior chamber 580 of the VIA body 550 when the poppet valve 640 is closed (or the poppet member 646 is in the closed position).

In some embodiments, the poppet member 646 may self-align within the valve body 642 as the poppet member 646 moves from the open position to the closed position. In other words, the poppet valve 640 may be self-aligning with self-centering seals.

Figure 17:
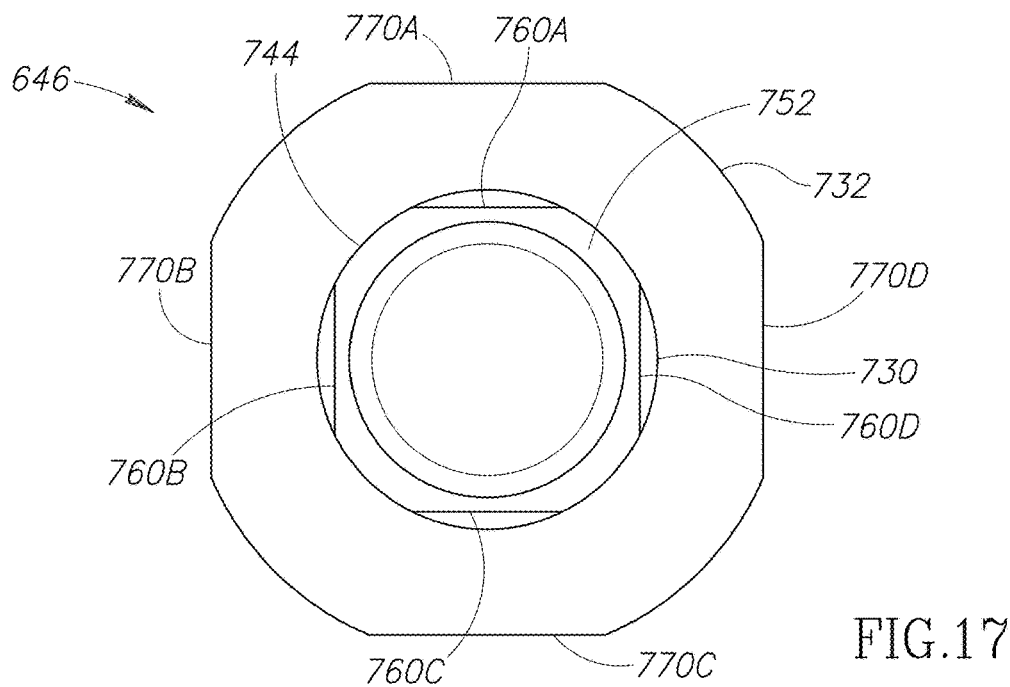
FIG. 17 is a top view of the poppet member of FIG. 16.

Referring to FIGS. 16 and 17, at least an outer-most portion of the intermediate portion 744 has a cross-sectional shape that differs from the cross-sectional shape of the outer channel portion 710 (see FIG. 15) of the channel 690 and allows the treatment fluid 120 (see FIG. 1A) to flow through the channel 690 between the intermediate portion 744 and the valve body 642 (see FIG. 15). As mentioned above, in the embodiment illustrated, the channel 690 (see FIG. 15) has a generally circular cross-sectional shape. In the embodiment illustrated, the intermediate portion 744 also has a generally circular cross-sectional shape but the intermediate portion 744 includes one or more longitudinally extending flat portions 760A-760D that each create a fluid passage 762 (see FIG. 12B) between the intermediate portion 744 and the valve body 642 when in the poppet valve 640 is open (as shown in FIG. 12B).

In the embodiment illustrated, the flat portions 760A-760D do not extend the full length of the intermediate portion 744. Thus, the intermediate portion 744 includes a stop portion 764 positioned between the flat portions 760A-760D and the inner recessed portion 746. When the poppet valve 640 is closed (as shown in FIG. 12A), the stop portion 764 is positioned inside the outer channel portion 710 (see FIG. 15) and at least partially blocks access to the fluid passages 762 (see FIG. 12B). This prevents the internal valve seal 644 from traveling (or extruding) outwardly through the outer channel portion 710 (between the intermediate portion 744 and the valve body 642), which allows the poppet valve 640 to operate at higher pressures. The stop portion 764 may be configured (e.g., have a sufficient width or diameter) such that as the poppet member 646 travels toward the closed position (see FIG. 12A) pressures above and below the internal valve seal 644 are approximately equal (that is—the seal is not yet acting to stop flow) before the flat portions 760A-760D enter the outer channel portion 710.

At least an outer-most portion of the inner stop portion 732 has a cross-sectional shape that differs from the cross-sectional shape of the inner channel portion 712 (see FIG. 15) of the channel 690 and allows the treatment fluid 120 (see FIG. 1A) to flow through the channel 690 between the inner stop portion 732 and the valve body 642. As mentioned above, in the embodiment illustrated, the channel 690 has a generally circular cross-sectional shape. In the embodiment illustrated, the inner stop portion 732 also has a generally circular cross-sectional shape but the inner stop portion 732 includes one or more longitudinally extending flat portions 770A-770D that each create a fluid passage 772 (see FIG. 12B) between the inner stop portion 732 and the valve body 642 when in the poppet valve 640 is open (as shown in FIG. 12B).

The generally circular cross-sectional shapes of the intermediate portion 744 and the inner stop portion 732 act within the inner diameters of the outer channel portion 710 and the inner channel portion 712 to guide the poppet member 646 within the valve body 642.

Filter

Referring to FIG. 14, the filter 638 has an outer cross-sectional shape that corresponds to the cross-sectional shape of an innermost portion of the channel 690 (see FIG. 15) defined by the lip 698 (see FIG. 15). As mentioned above, in the embodiment illustrated, the channel 690 has a generally circular cross-sectional shape. Thus, in the embodiment illustrated, the filter 638 has a generally circular cross-sectional shape. For example, the filter 638 may be generally cylindrically shaped or disk shaped. By way of non-limiting examples, the filter 638 may be a screen, a sintered metal disk, or the like. The filter 638 may be constructed from any suitable filtering medium known in the art.

Referring to FIGS. 12A and 12B, the filter 638 is positioned in the end of the valve body 642 and retains the poppet member 646 within the channel 690 during handling. Referring to FIG. 7, the filter 638 (see FIGS. 12A, 12B, and 14) may also help protect the valve assembly 554 from contaminants that may flow out of the cable 110 (e.g., during the injection process). Referring to FIGS. 12A and 12B and as described above, the filter 638 may be held in place by deforming the lip 698 (e.g., in one or more places, or continuously) inwardly into the channel 690. Alternatively, the filter 638 may be held in place by a retaining clip, interference fit, welding, brazing, soldering, or other means known in the art.

Optional Clip

Referring to FIG. 11A, the optional clip 634 is clipped to the outer recessed portion 742 of the poppet member 646 after the valve body 642 has been screwed into the through-hole 610 of the VIA body 550 and secures the poppet member 646 to the biasing member 632. In the embodiment illustrated, the clip 634 is generally disk-shaped and includes a cutout 780 that defines a generally E-shaped or C-shaped body portion 782. The body portion 782 has a first curved arm 784 that extends around the cutout 780 toward a second curved arm 786. An opening 790 into the cutout 780 is formed between free ends 794 and 796 of the arms 784 and 786, respectively. The opening 790 is configured to receive the outer recessed portion 742 of the poppet member 646 laterally into the cutout 780. The arms 784 and 786 are sufficiently rigid to clip onto and grip the outer recessed portion 742 when the outer recessed portion 742 is received fully inside the cutout 780. By way of non-limiting examples, the clip 634 may be constructed from metal, plastic, ceramic, and the like. Further, other shapes may be used to construct the clip 634.

Biasing Member

Figure 11B:
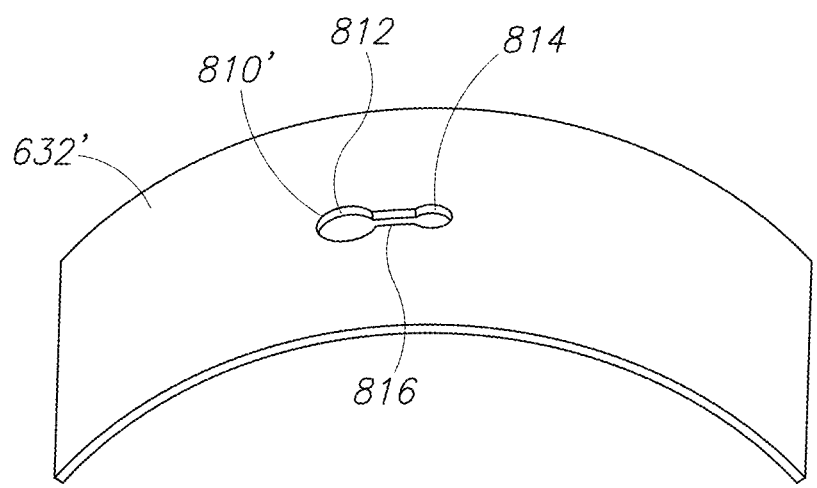
FIG. 11B is a perspective view of a second embodiment of the biasing member of the optional VIA assembly.

FIGS. 7, 11A, 12A-13, and 23A depict an embodiment of the biasing member 632 configured for use with the optional clip 634. FIG. 11B depicts an alternative biasing member 632' for use in embodiments of the MIC 100 that omit the optional clip 634.

Referring to FIG. 11A, in the embodiment illustrated, the biasing member 632 is implemented as a C-spring with a curved body 800. In such embodiments, the C-spring creates a strong sealing force without significantly increasing the size (e.g., outer diameter) of the VIA assembly 320 laterally compared to other types of springs (e.g., coil springs). Also, the C-spring provides a large target area for the injection probe pin 652 (see FIG. 13), and remains nearly perpendicular to the poppet member 646 when compressed by the injection probe pin 652. Alternatively, the biasing member 632 may be implemented as a leaf spring (not shown).

By way of a non-limiting example, the body 800 may be implemented as a curved metal band. The body 800 has a first end portion 802 opposite a second end portion 804 and an intermediate portion 806 between the first and second end portions 802 and 804. A through-hole 810 is formed in the intermediate portion 806. The through-hole 810 may be positioned about midway between the first and second end portions 802 and 804. The intermediate portion 806 may include about two thirds of the length of the body 800, and radially may include a portion within about 25 degrees to either side of the center of the through-hole 810.

Referring to FIG. 7, when the VIA assembly 320 is fully assembled, the biasing member 632 is positioned within the second groove 590 formed in the VIA body 550. At least a portion of the intermediate portion 806 surrounding the through-hole 810 is spaced outwardly from the VIA body 550. The first and second end portions 802 and 804 (see FIG. 11A) abut the VIA body 550 and slide therealong circumferentially within the second groove 590. The second groove 590 shields the biasing member 632 when the VIA assembly 320 is handled by the operator (e.g., when the operator inserts the subassembly 330 into the MIC body 310).

The through-hole 810 is configured to allow the outer overhanging stop portion 740 (see FIG. 16) of the poppet member 646 to pass therethrough. In the embodiment illustrated, the through-hole 810 has an inner diameter that is larger than an outer diameter of the outer overhanging stop portion 740 (see FIG. 16) of the poppet member 646.

Referring to FIG. 11A, when the VIA assembly 320 (see FIGS. 3, and 7) is fully assembled, the stem portion 730 (see FIGS. 16 and 17) of the poppet member 646 extends outwardly from the valve cartridge 630 and the outer recessed portion 742 is positioned within the through-hole 810. The clip 634 is clipped to the outer recessed portion 742 of the poppet member 646 between the outer overhanging stop portion 740 (see FIG. 16) and the intermediate portion 806 of the biasing member 632. The clip 634 is too large to pass through the through-hole 810 and prevents the intermediate portion 806 of the biasing member 632 from moving outwardly beyond the inwardly facing stop wall 750 (see FIG. 16) to thereby removably tether the biasing member 632 to the outer recessed portion 742 of the poppet member 646. The intermediate portion 744 (see FIGS. 12A, 12B, 16, and 17) of the poppet member 646 is too wide to pass through the through-hole 810 and traps the intermediate portion 806 between the outwardly facing stop wall 752 (see FIGS. 16 and 17) and the clip 634. Referring to FIG. 12A, the biasing member 632 bears against the clip 634 and presses the clip 634 against the inwardly facing stop wall 750 (see FIG. 16) to thereby bias the poppet member 646 outwardly and toward the closed position. In other words, the biasing member 632 applies an outwardly directed biasing force to the poppet member 646 that biases the poppet valve 640 closed.

In alternate embodiments (not shown), other retaining means may be used to attach the poppet member 646 to the biasing member 632 (e.g., the biasing member 632) instead of the optional clip 634. For example, the outer recessed portion 742 (see FIGS. 16 and 17) of the poppet member 646 may be omitted and a through-hole (not shown) formed in the stem portion 730 of the poppet member 646. Then, after the stem portion 730 is positioned within the through-hole 810 with the through-hole (not shown) spaced outwardly from the biasing member 632, a pin (not shown) may be inserted into the through-hole (not shown). The pin prevents the stem portion 730 of the poppet member 646 from traveling inwardly through the through-hole 810. By way of another non-limiting example, the outermost portion of the stem portion 730 could be deformed (e.g., flatten into a larger diameter) after passing through the through-hole 810 such that the deformed portion can no longer pass through the through-hole 810. By way of yet another non-limiting example, a fastener (e.g., a large headed screw or nut) that will not pass through the through-hole 810 could be fastened to (e.g., threaded onto) the outermost portion of the stem portion 730 after the stem portion 730 is positioned within the through-hole 810.

As mentioned above, FIG. 11B depicts the biasing member 632' for use in embodiments of the MIC 100 that omit the optional clip 634. Referring to FIG. 11B, the biasing member 632' differs from the biasing member 632 in only one respect, namely, the biasing member 632' includes a through-hole 810' instead of the through-hole 810. Otherwise, the biasing member 632' is substantially identical to and provides the same functionality as the biasing member 632. Like the biasing member 632, the biasing member 632' bears against the inwardly facing stop wall 750 (see FIG. 16) of the poppet member 646 to thereby bias the poppet member 646 outwardly and toward the closed position. In other words, the biasing member 632' applies the outwardly directed biasing force to the poppet member 646 that biases the poppet valve 640 closed.

The through-hole 810' has a first hole portion 812 configured to allow the outer overhanging stop portion 740 (see FIG. 16) of the poppet member 646 to pass therethrough. The through-hole 810' has a second hole portion 814 configured to prevent the outer overhanging stop portion 740 (see FIG. 16) of the poppet member 646 from passing therethrough. The first and second hole portions 812 and 814 are interconnected by a channel portion 816. The channel portion 816 is configured to allow the outer recessed portion 742 (see FIGS. 16 and 17) of the poppet member 646 to travel between the first and second hole portions 812 and 814. Referring to FIG. 11A, the VIA assembly 320 (see FIGS. 3, and 7) is assembled by inserting the outer overhanging stop portion 740 (see FIG. 16) of the poppet member 646 through the first hole portion 812 (see FIG. 11B) and positioning the outer recessed portion 742 (see FIGS. 16 and 17) of the poppet member 646 in the first hole portion 812. Then, the outer recessed portion 742 (see FIGS. 16 and 17) of the poppet member 646 is slid through the channel portion 816 (see FIG. 11B) from the first hole portion 812 (see FIG. 11B) to the second hole portion 814 (see FIG. 11B). Because the outer overhanging stop portion 740 (see FIG. 16) of the poppet member 646 cannot pass through the second hole portion 814, the biasing member 632' is trapped between the inwardly facing stop wall 750 (see FIG. 16) and the outwardly facing stop wall 752 (see FIGS. 16 and 17).

Because the biasing member 632' is substantially identical to and provides the same functionality as the biasing member 632, for the sake of brevity, the operation of the VIA assembly 320 has been described below with respect to the biasing member 632. However, this description also applies to the biasing member 632'.

Referring to FIG. 12B, when the biasing member 632 is pressed inwardly, the intermediate portion 806 (see FIG. 11A) of the biasing member 632 presses on the outwardly facing stop wall 752 (see FIGS. 16 and 17) of the poppet member 646. When the biasing member 632 and/or the poppet member 646 is pressed upon with sufficient inwardly directed activation force to overcome both the outwardly directed biasing force of the biasing member 632 and any outwardly directed force created by internal fluid pressure, the poppet member 646 will move inwardly and open the poppet valve 640. By way of a non-limiting example, the activation force may be at least 0.5 pound-force. By way of another non-limiting example, the activation force may be between 1.3 pound-force and 1.8 pound-force.

Referring to FIG. 13, the poppet valve 640 may be opened by pressing only on the intermediate portion 806 (see FIG. 11A) of the biasing member 632 and not on the poppet member 646 directly. This allows the poppet valve 640 to be opened even when the poppet valve 640 is not precisely aligned with the injection port 116. Thus, the injection probe pin 652 may open the poppet valve 640 by pressing on the biasing member 632 at a first location that is up to 25 degrees away from a second location at which the biasing member 632 is connected to the poppet member 646.

Thus, so long as the intermediate portion 806 is adjacent the injection port 116, the poppet valve 640 may be opened. In other words, a technician (or operator) in the field need not precisely align the poppet valve 640 with the injection port 116. Instead, the operator may align the poppet valve 640 with the injection port 116 rotationally by eye by aligning the alignment feature 338 on the first end 350 of the MIC body 310 with a reference mark 820 (see FIGS. 1A and 1B) on the insulation shield 210 of the cable 110 outside the MIC body 310. Requiring less than a precise alignment is useful because it can be difficult to achieve a precise alignment in the field. For example, referring to FIG. 7, crimping and/or swaging can lengthen and/or deform the cable conductor 202 (see FIGS. 3, 6A, and 6B), the first and second ends 560 and 562, and/or the compression connector 502. Further, such lengthening and/or deformation will vary in magnitude as crimping dies wear and depends upon the precise location (e.g., longitudinally and circumferentially) of each crimp or swage. The stochastic nature of this process confounds precise alignment.

Referring to FIG. 13, as explained above, each of the biasing members 632 and 632' may be characterized as serving dual purposes:

1) biasing the poppet member 646 toward a closed position (see FIG. 12A); and 2) opening the poppet valve 640 when pressed inwardly (e.g., by the injection probe pin 652) with sufficient inwardly directed force to overcome the outwardly directed biasing force of the biasing member 632 (or alternatively, the biasing member 632') and any outwardly directed force created by internal fluid pressure.

Referring to FIG. 3, while the VIA assembly 320 is illustrated as being a subcomponent of the MIC 100, the VIA assembly 320 may also be used in other injection components, such as injection elbows and injection splices. In such embodiments (not shown), the valve assembly 554 (see FIGS. 6B, 7, and 11A) is positioned inside the injection component adjacent its injection port, and the VIA seals 552A and 552B (see FIGS. 6B, 7, and 11A) seal the valve assembly 554 within a fluid chamber substantially similar to the fluid chamber 600 (see FIGS. 6B and 12A-13).

Installation

Figure 20:
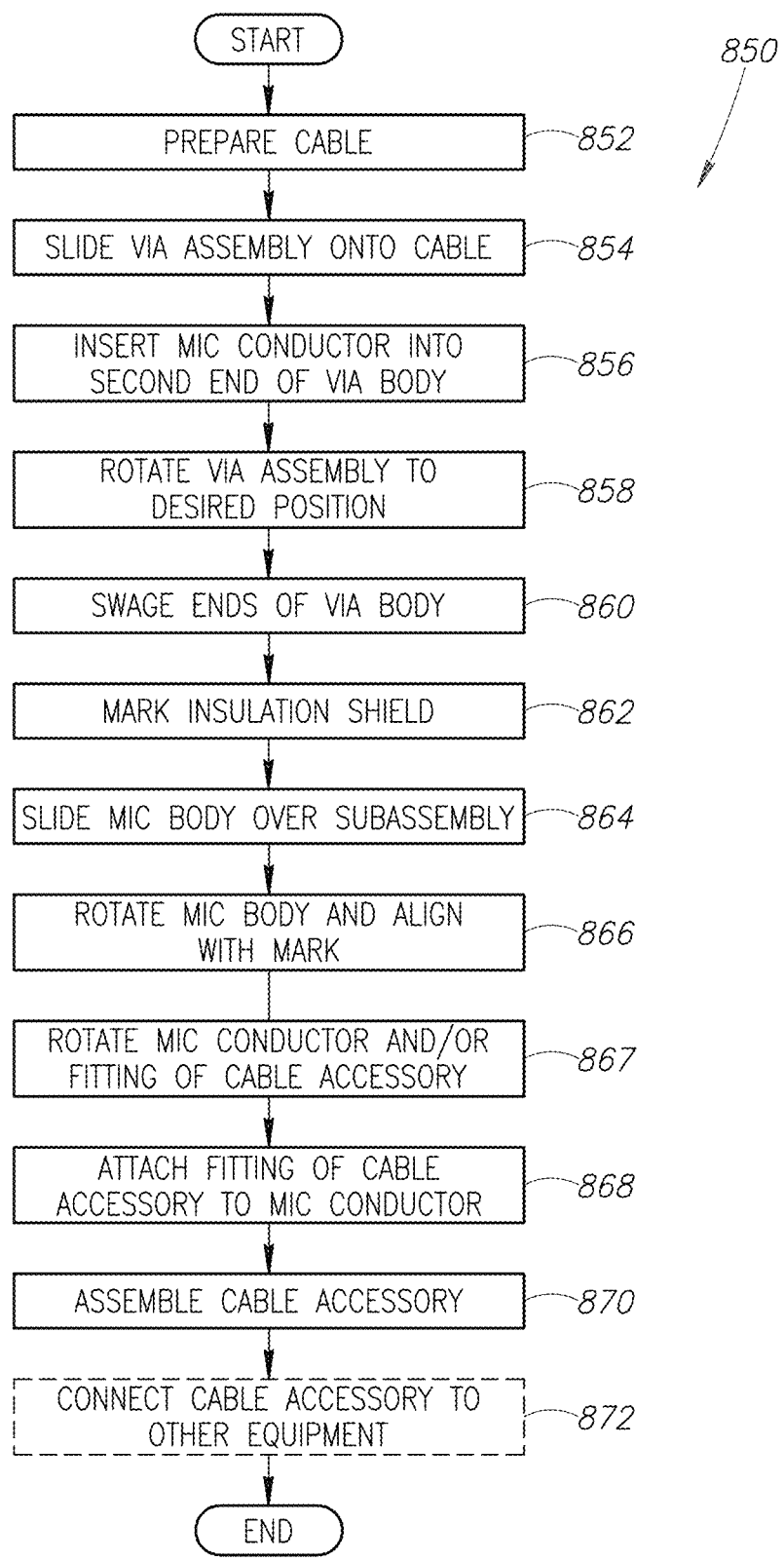
FIG. 20 is a flow diagram of a method of installing the MIC of FIG. 1A between the cable and the cable accessory.

FIG. 20 is a flow diagram of a method 850 of installing the MIC 100 between the cable 110 and the cable accessory 112. The method 850 is performed by a human operator. The method 850 will be described with respect to an embodiment of the MIC 100 that includes the optional LPI 312 and the optional VIA assembly 320.

In first block 852, the operator prepares the cable 110 to be connected to both the VIA assembly 320 and the MIC conductor 318 to form the subassembly 330. For example, referring to FIG. 3, the operator removes end portions of the cable jacket 214 (see FIG. 2) and the neutrals 212 (see FIG. 2) from the end 220 of the cable 110 to expose the end portion 222 of the insulation shield 210. Then, an end portion of the exposed end portion 222 of the insulation shield 210 is removed to expose the end portion 223 of the insulation layer 208. Finally, end portions of the exposed end portion 223 of the insulation layer 208 and the conductor shield 206 (see FIG. 2) underneath the exposed end portion 223 are removed to expose the end portion 224 of the cable conductor 202.

In next block 854, the operator slides the VIA assembly 320 onto the end 220 of the cable 110. The exposed end portion 224 of the cable conductor 202 is positioned inside the second end 562 of the VIA body 550, and the exposed end portion 223 of the insulation layer 208 is positioned inside the first end 560 of the VIA body 550.

Next, in block 856, the operator inserts the compression connector 502 of the MIC conductor 318 into the second end 562 of the VIA body 550 with the exposed end portion 224 of the cable conductor 202 positioned inside the longitudinally extending channel 512.

Then, in block 858, the operator rotates the VIA assembly 320 to place the poppet valve 640 of the valve assembly 554 in a desired position. This allows the operator to control in which direction the injection port 116 extends outwardly away from the VIA assembly 320.

In block 860, the operator performs swaging operations on the first and second ends 560 and 562 of the VIA body 550 to complete the subassembly 330. In block 862, the compression connector 502 and the second end 562 of the VIA body 550 may be swaged together onto the cable conductor 202 before the first end 560 of the VIA body 550 is swaged onto the exposed end portion 223 of the insulation layer 208.

In block 862, the operator places the reference mark 820 (see FIG. 1A) on the exposed end portion 222 of the insulation shield 210. The reference mark 820 is aligned longitudinally with the poppet valve 640 of the valve assembly 554. The reference mark 820 indicates the desired rotational orientation of the injection port 116.

In block 864, the operator slides the MIC body 310 over the subassembly 330 by inserting the free end 516 of the elongated portion 504 of the MIC conductor 318 into the first channel opening 360 of the MIC body 310 with the injection port 116 aligned with the reference mark 820 (see FIG. 7) on the insulation shield 210. Then, the operator slides the MIC body 310 along the subassembly 330 until movement along the MIC axis 340 is halted by interference between the VIA body 550 and at least one of the MIC body 310 and the LPI 312. For example, the MIC body 310 may stop sliding with respect to the subassembly 330 when the optional projection 378 of the MIC body 310 is received by the optional first groove 584 of the VIA body 550 and/or the optional projection(s) 586 of the VIA body 550 is received inside the optional recess(es) 379 formed in the MIC body 310. By way of another non-limiting example, the MIC body 310 may stop sliding with respect to the subassembly 330 when a tapered face of the projection 586 mates with (or abuts) a tapered face of the edge 428 of the LPI 312, which positively axially locates the VIA body 550 within the LPI 312 and positions the poppet valve 640 adjacent the inner opening 412 (see FIGS. 6A and 6B). At this point, referring to FIG. 3, the cable 110 extends outwardly from the internal channel 356 through the first channel opening 360 and the MIC conductor 318 extends outwardly from the internal channel 356 through the second channel opening 362.

Returning to FIG. 20, in block 866, the operator rotates the MIC body 310 to align the alignment feature 338 with the reference mark 820 (see FIG. 1A) on the exposed end portion 222 of the insulation shield 210. This aligns the injection port 116 with the poppet valve 640 of the valve assembly 554.

Referring to FIG. 1A, in optional block 867 (see FIG. 20), the operator may rotate the fitting 230 and/or the MIC conductor 318 such that when the cable accessory 112 is assembled, the cable accessory 112 will be in the correct orientation to be coupled to the elbow bushing 256.

Figure 1B:
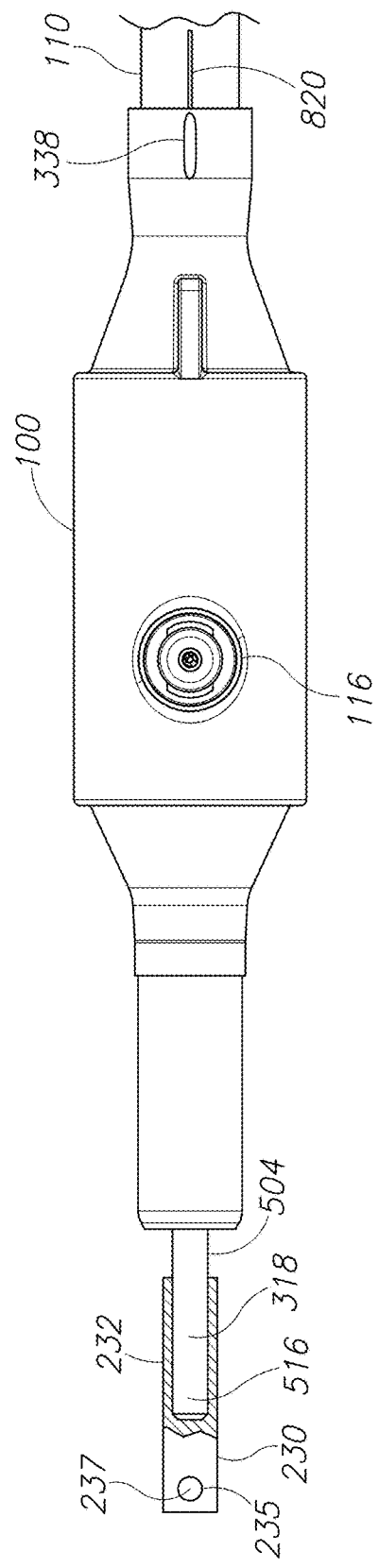
FIG. 1B is a top view of the MIC of FIG. 1A connected to the cable and a fitting of the cable accessory.

Then, in block 868 (see FIG. 20), the operator attaches the fitting 230 to the free end 516 of the elongated portion 504 of the MIC conductor 318 to obtain the assembly shown in FIG. 1B. For example, the operator may crimp the compression connector 232 of the fitting 230 onto the free end 516.

Returning to FIG. 20, in block 870, the operator assembles the cable accessory 112 (see FIG. 1A). For example, referring to FIG. 1A, the operator may insert the second end 352 (see FIG. 3) of the MIC body 310 and the elongated portion 504 (with the fitting 230 connected to the free end 516) into the housing 240 through the opening 242. The second end 352 of the MIC body 310 and the elongated portion 504 extend through the first branch 248 of the internal L-shaped channel 246 and position the threaded hole 234 of the fitting 230 at or near the intersection of the first and second branches 248 and 250. The operator may insert the contact probe 236 into the second branch 250 through the opening 252 and attach the contact probe 236 to the fitting 230 by screwing the threaded end 238 of the contact probe 236 into the threaded hole 234 of the fitting 230. Next, the operator may place the housing 240 over the elbow bushing 256 to thereby insert the elbow bushing 256 into the housing 240 (via the opening 252) and connect the elbow bushing 256 to the contact probe 236.

In optional block 872, the operator connects the cable accessory 112 to other electrical equipment (not shown).

Then, the method 850 terminates.

Referring to FIG. 1A, after the method 850 (see FIG. 20) has been performed, the MIC 100 is ready for the injection of the treatment fluid 120. As mentioned above, the MIC 100 may be configured to withstand injection pressures of about 30 psi to about 1000 psi. Using higher injection pressures may accelerate the treatment of the cable 110.

Injection Probe Assembly

Referring to FIG. 1A, as mentioned above, the MIC 100 is connected between the cable 110 and the cable accessory 112. The injection probe assembly 130 may be used to inject the treatment fluid 120 into the injection port 116 of the MIC 100. The injection probe assembly 130 may be configured to inject the treatment fluid 120 at injection pressures of about 30 psi to about 1000 psi. The injected treatment fluid flows into the interior 122 (see FIG. 2) of the cable 110. The assembly 114 may be characterized as being an entry site. The treatment fluid 120 injected into the cable 110 may flow therethrough to an exit site (not shown) whereat at least a portion of the injected fluid exits the interior 122 (see FIG. 2) of the cable 110. Fluid exiting the cable 110 at the exit site (not shown) indicates that the interior 122 has been filled with the treatment fluid 120.

Cable accessories (e.g., the cable accessory 112) may, at times, operate partially or fully submerged under water. For example, a transformer (not shown) to which the cable accessory 112 is connected may be housed in an underground vault (not shown) subjected to flooding. Injection equipment (e.g., the injection probe assembly 130) may be connected to a cable (e.g., the cable 110) within the flooded underground vault.

Unfortunately, currently available technology used to inject the treatment fluid 120 into the interior of an energized cable presents a safety risk when used in locations that may be subject to flooding. The treatment fluid 120 within the tube 132, the fluid source 134 (e.g., a tank), and any connections therebetween may come into fluidic contact with an energized cable conductor (like cable conductor 202). While the treatment fluid 120 is non-conductive and normally flowing into the cable at the entry site, sometimes a portion of the treatment fluid 120 injected into the cable may flow backwardly and out of the cable at the entry site. This backward flow may be caused by thermal expansion in the cable or pressure loss in the fluid source 134 (e.g., a tank). The back flowing fluid exiting the cable may be contaminated with conductive particles, which transform the electrically non-conductive treatment fluid 120 into an electrically semi-conductive fluid. At the exit site, the portion of the treatment fluid 120 exiting the cable may be contaminated with water loaded with ions that make the exiting fluid electrically semi-conductive or conductive. When the cable is energized, the contaminated (now electrically semi-conductive or conductive) treatment fluid can transmit potential from the cable conductor. Therefore, if the contaminated treatment fluid is not isolated from the flood water, the operator may be injured by current flowing from the cable through the contaminated treatment fluid and into the flood water. This condition presents a significant safety risk to the human operator. Any current flowing to ground from the cable conductor can quickly escalate into a full discharge resulting in loss of power and damage to the cable and equipment.

In a prior art injection component (e.g., an injection cap illustrated in U.S. Pat. No. 4,946,393), the energized treatment fluid is often separated from the flood water by only one or more threads of a threaded connection between the injection component and a tubing connector (not shown) coupled to the tube 132. For example, the distance between the energized treatment fluid and the flood water may be as little as the width (e.g., about 0.06 inch) of a single thread of the tubing connector. This distance is along the interface of two electrically insulating materials.

As mentioned above, the treatment fluid 120 may be made electrically semi-conductive or conductive by external contamination. As will be explained below, the injection probe assembly 130 includes seals positioned to provide separation between the energized and potentially contaminated treatment fluid and the outside environment (which may include flood water) to prevent the flow of current from the cable conductor 202 (see FIG. 2) through energized and contaminated treatment fluid and into the outside environment (e.g., into the flood water). By way of a non-limiting example, the injection probe assembly 130 and the manner in which the injection probe assembly 130 connects to the LPI 312 of the MIC 100 may provide a minimum distance of about 0.30 inches between the treatment fluid 120 and the outside environment along any interfaces between insulating materials positioned along the flow of the treatment fluid 120 into the MIC body 310 or the MIC body 310' (see FIG. 18). By way of another non-limiting example, the injection probe assembly 130 and the MIC 100 may provide a minimum distance of about 0.10 inches between the treatment fluid 120 and the outside environment through any solid insulating materials positioned along the flow of the treatment fluid 120 into the MIC body 310 or the MIC body 310' (see FIG. 18).

Figure 21:
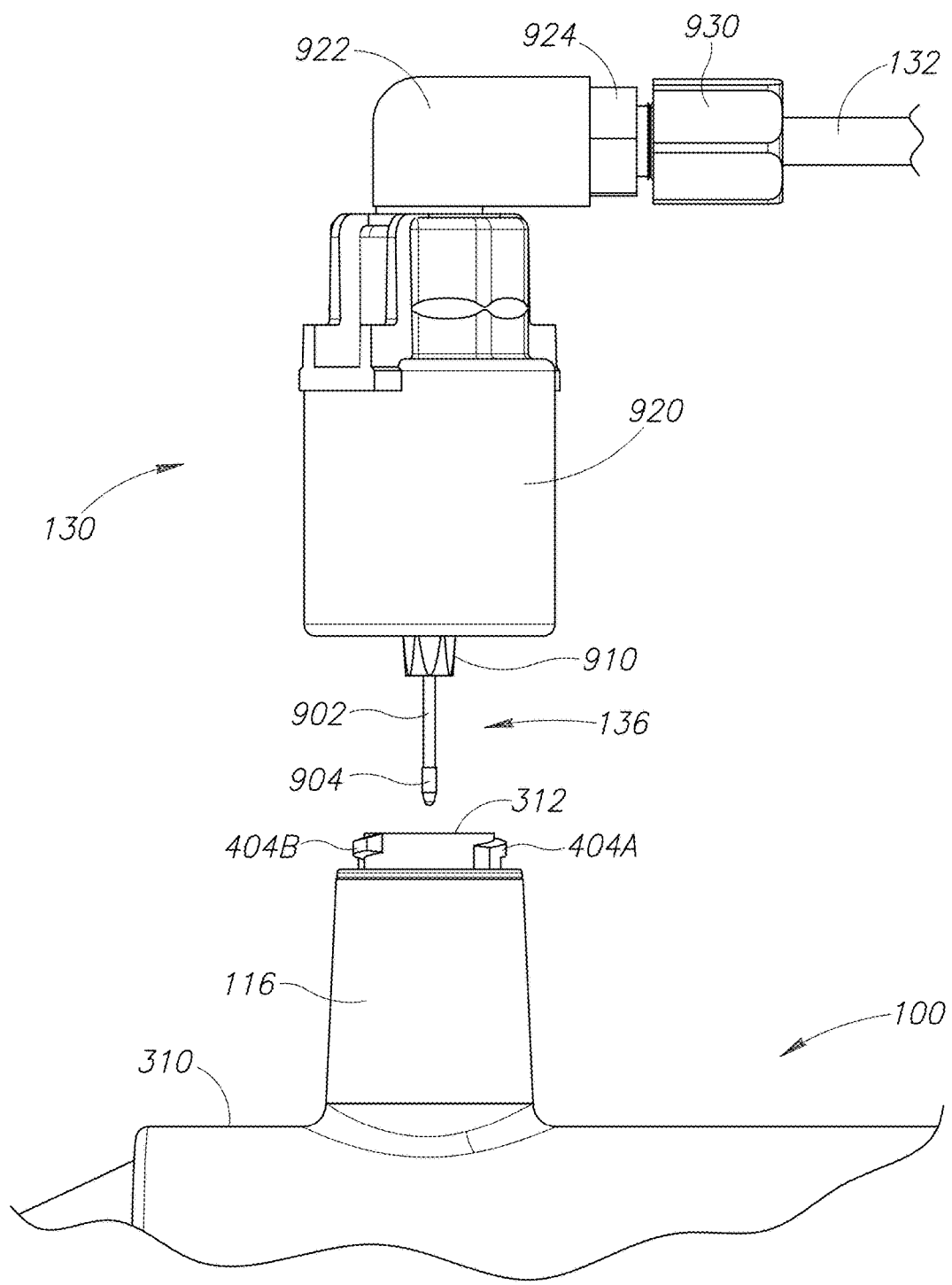
FIG. 21 is a side view of an injection probe assembly being inserted into the injection port of the MIC of FIG. 1A.

FIG. 21 is an enlarged portion of FIG. 1A showing the injection probe assembly 130 and the injection port 116 of the MIC 100. The injection probe assembly 130 may be used with any injection component (e.g., the MIC 100, an injection elbow, an injection splice, and the like) that includes an injection port like the injection port 116. Referring to FIG. 21, the injection probe assembly 130 includes the injection probe pin 136, which includes an elongated pin 902 connected to a probe tip 904. Referring to FIG. 23A, the elongated pin 902 and the probe tip 904 (see FIGS. 21 and 22) are used to open the poppet valve 640 by pressing inwardly on the poppet member 646 (see FIGS. 11A, 12A-14, 16, and 17), the biasing member 632, or the biasing member 632' (see FIG. 11B).

Figure 22:
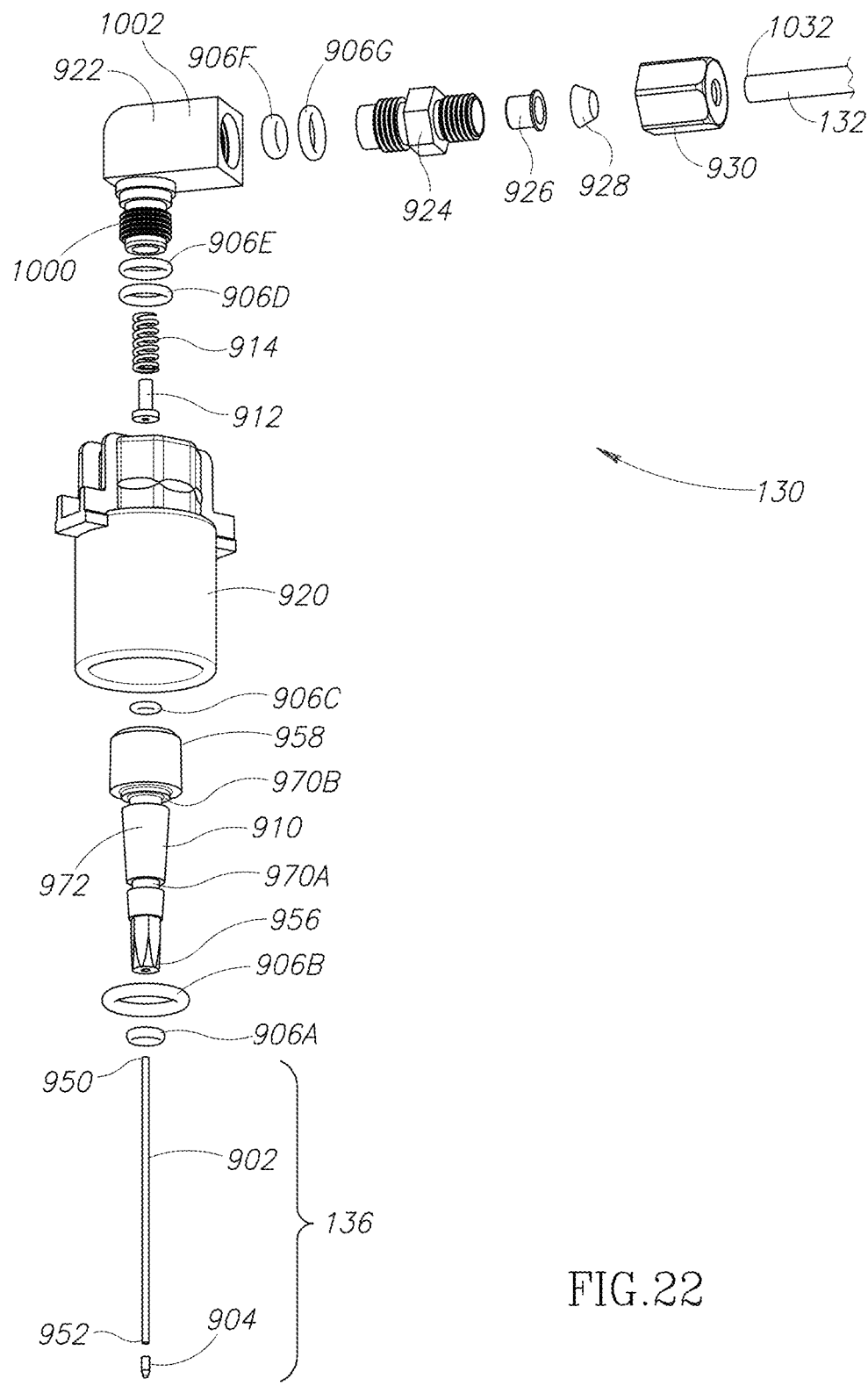
FIG. 22 is an exploded perspective view of the injection probe assembly.
Figure 23A:
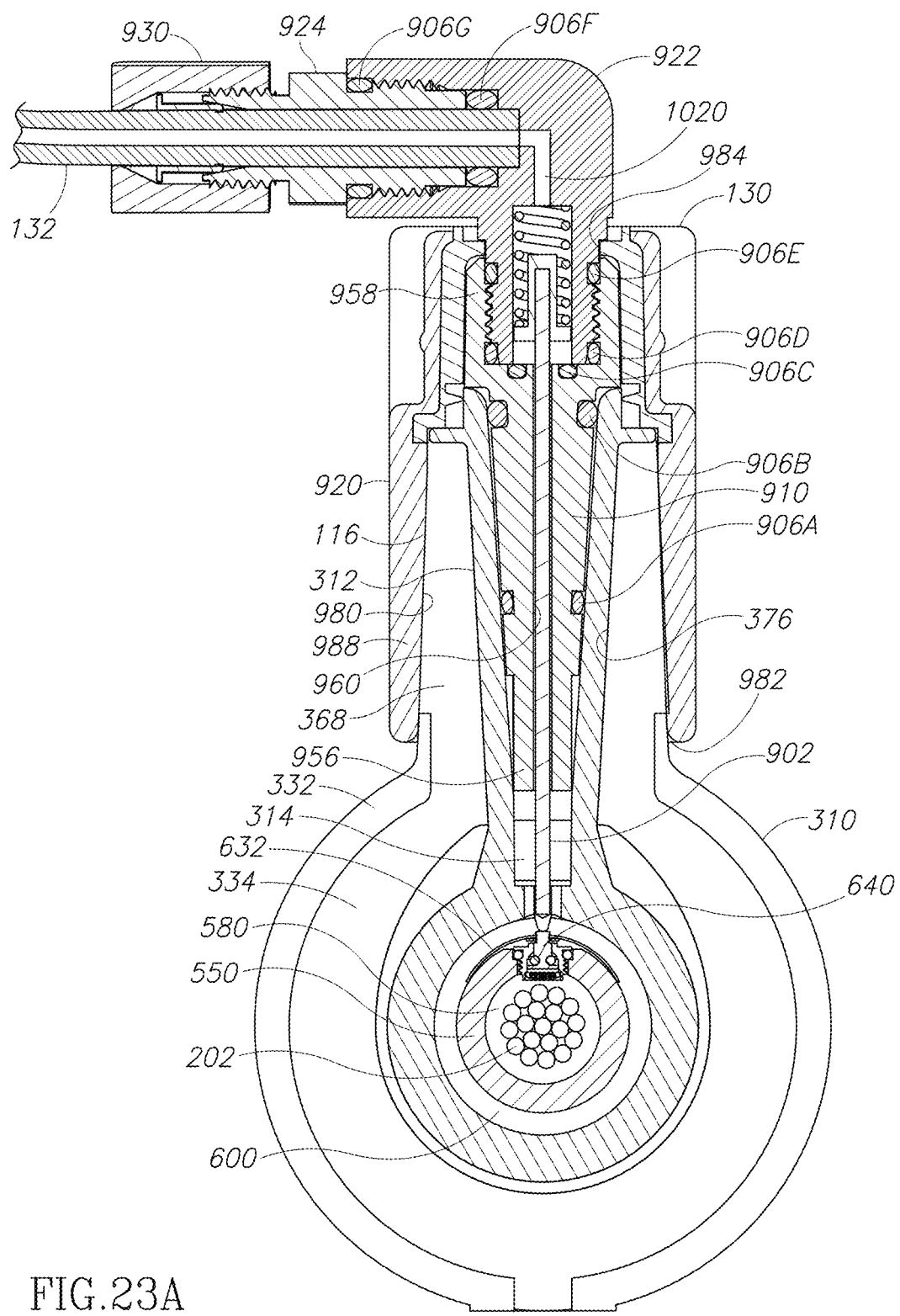
FIG. 23A is a lateral cross-sectional view of the injection probe assembly coupled to the injection port of the MIC of FIG. 1A.

FIG. 22 is an exploded perspective view of the injection probe assembly 130. Referring to FIG. 22, in addition to the injection probe pin 136 (see FIGS. 1A, 21, and 22), the injection probe assembly 130 includes seals 906A-906G, a tapered injection nozzle 910, a poppet member or an inner cap 912, a biasing member 914 (e.g., a coil spring), an outer cap 920, an elbow shaped connector 922, a fitting 924, a ferrule sleeve 926, a ferrule cone 928, and a connector 930 (e.g., a nut). By way of non-limiting examples, the ferrule sleeve 926, the ferrule cone 928, and the connector 930 may be purchased from JACO Manufacturing Company of Berea, Ohio. However, other components may be used.

Figure 24A:
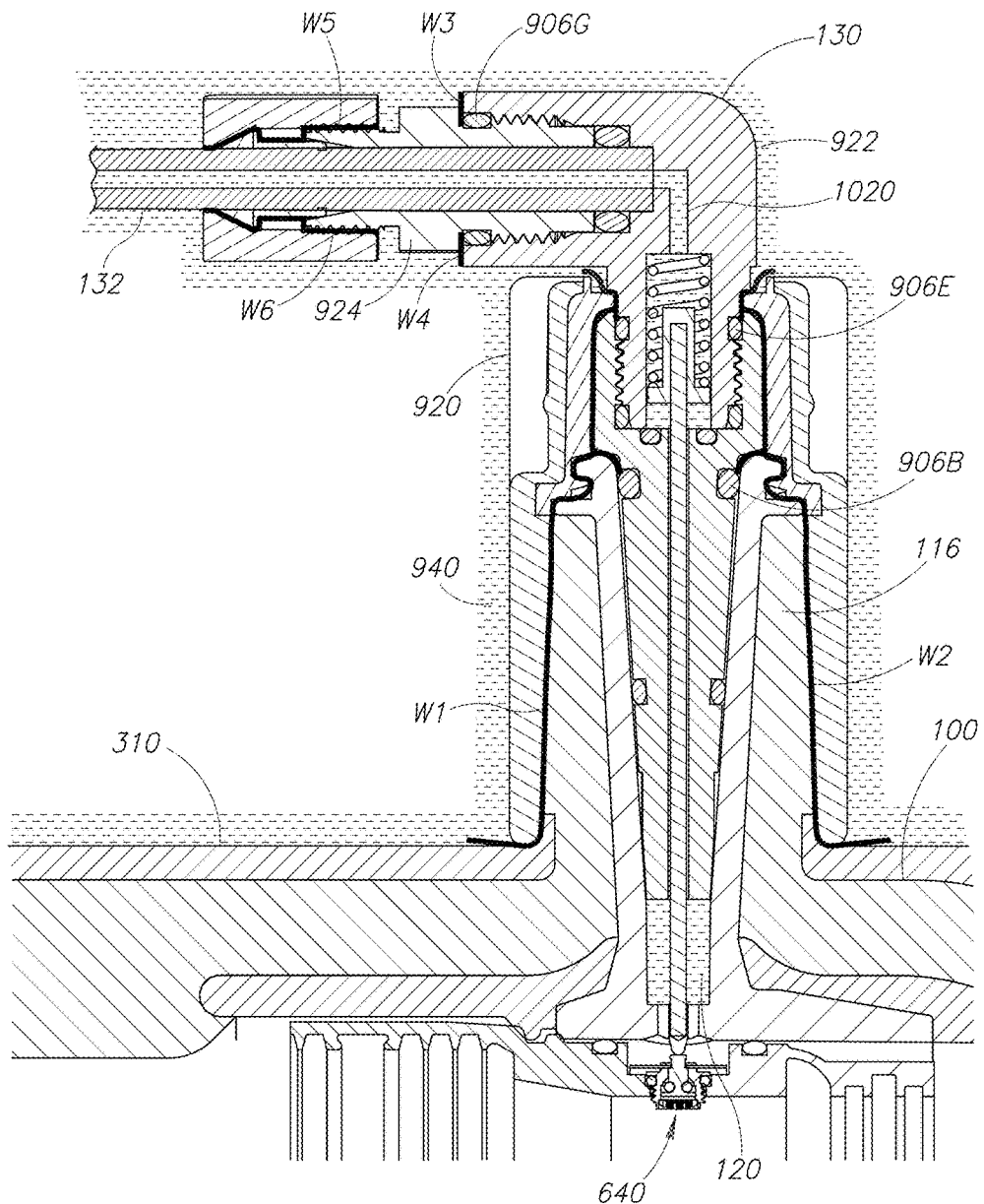
FIG. 24A is a longitudinal cross-sectional side view of the injection probe assembly injecting a treatment fluid into the injection port of the MIC of FIG. 1A while both components are submerged in water with bold lines illustrating locations at which the water tries to infiltrate the injection probe assembly and the MIC.

As will be described below, the seals 906B, 906E, and 906G and the ferrule sleeve 926 help prevent water 940 (see FIGS. 24A and 24B) from entering the injection probe assembly 130 and the MIC 100 (see FIG. 21). For ease of illustration, both the cable 110 (see FIG. 6A) and the MIC conductor 318 (see FIG. 6A) have been omitted from FIGS. 24A and 24B. In FIG. 24A, the water 940 trying to infiltrate the injection probe assembly 130 and the MIC 100 has been illustrated using bold lines W1-W6 extending between adjacent components. As may be viewed in FIG. 24A, the seals 906B, 906E, and 906G and the ferrule sleeve 926 stop this water infiltration.

Figure 24B:
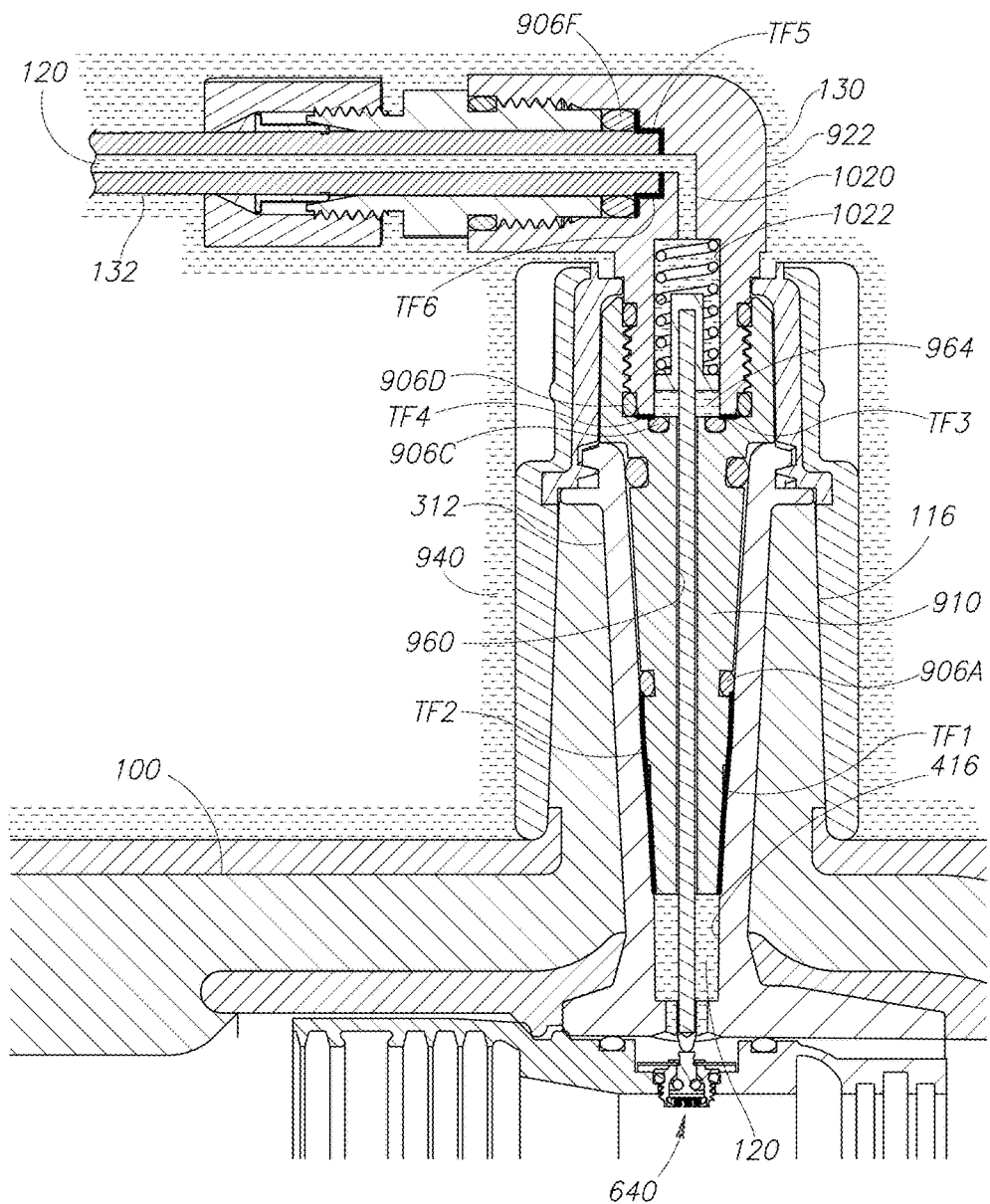
FIG. 24B is a longitudinal cross-sectional side view of the injection probe assembly injecting the treatment fluid into the injection port of the MIC of FIG. 1A while both components are submerged in water with bold lines illustrating locations at which the treatment fluid tries to escape from the injection probe assembly and the MIC.

Referring to FIG. 24B, the seals 906A, 906D and 906F help prevent the treatment fluid 120 from exiting the injection probe assembly 130 and/or the injection port 116. In FIG. 24B, the treatment fluid 120 trying to escape from the injection probe assembly 130 and the injection port 116 has been illustrated using bold lines TF1-TF6 extending between adjacent components. As may be viewed in FIG. 24B, the seals 906A, 906D and 906F retain the treatment fluid 120 inside the injection probe assembly 130 and the injection port 116 and prevent the treatment fluid 120 from escaping.

Further, as shown in FIGS. 24A and 24B, the bold lines W1-W6 illustrating the potentially infiltrating water 940 and the bold lines TF1-TF6 illustrating the potentially escaping treatment fluid 120 are spaced apart from one another by at least a minimum distance (e.g., about 0.30 inches). In other words, the potentially infiltrating water 940 is kept apart from the potentially escaping treatment fluid 120 by at least the minimum distance (e.g., about 0.30 inches).

Referring to FIG. 22, the elongated pin 902 has a tethered end 950 opposite a free end 952. The probe tip 904 is attached to the free end 952. Referring to FIG. 23A, the elongated pin 902 spaces the probe tip 904 (see FIGS. 21 and 22) away from the tapered injection nozzle 910 and further into the injection port 116 when the injection probe assembly 130 is used to inject the treatment fluid 120 into the injection port 116 of the MIC 100. The elongated pin 902 may be constructed from pultruded fiberglass, which is electrically non-conductive. While pultruded fiberglass will fracture when bent too far, the elongated pin 902 will not break into two pieces and leave a portion including the probe tip 904 inside the energized MIC 100.

Referring to FIG. 22, the tapered injection nozzle 910 has free first end portion 956 opposite a second end portion 958. In the embodiment illustrated, the free first end portion 956 has a generally hexagonal cross-sectional shape that may be gripped so that torque may be applied to the second end portion 958. The torque applied rotates the tapered injection nozzle 910 for the purposes of coupling the tapered injection nozzle 910 to the elbow shaped connector 922 and uncoupling the tapered injection nozzle 910 from the elbow shaped connector 922. The tapered injection nozzle 910 narrows toward its free first end portion 956. The second end portion 958 is configured to be removably coupled to the elbow shaped connector 922 inside the outer cap 920. Referring to FIG. 23A, an open-ended internal through-channel 960 extends between the first and second end portions 956 and 958. The elongated pin 902 extends through the internal through-channel 960 and outwardly therefrom beyond the first end portion 956. The internal through-channel 960 has a larger cross section than the elongated pin 902 which allows the treatment fluid 120 (see FIGS. 24A and 24B) to flow through the internal through-channel 960 alongside the elongated pin 902.

Figure 23B:
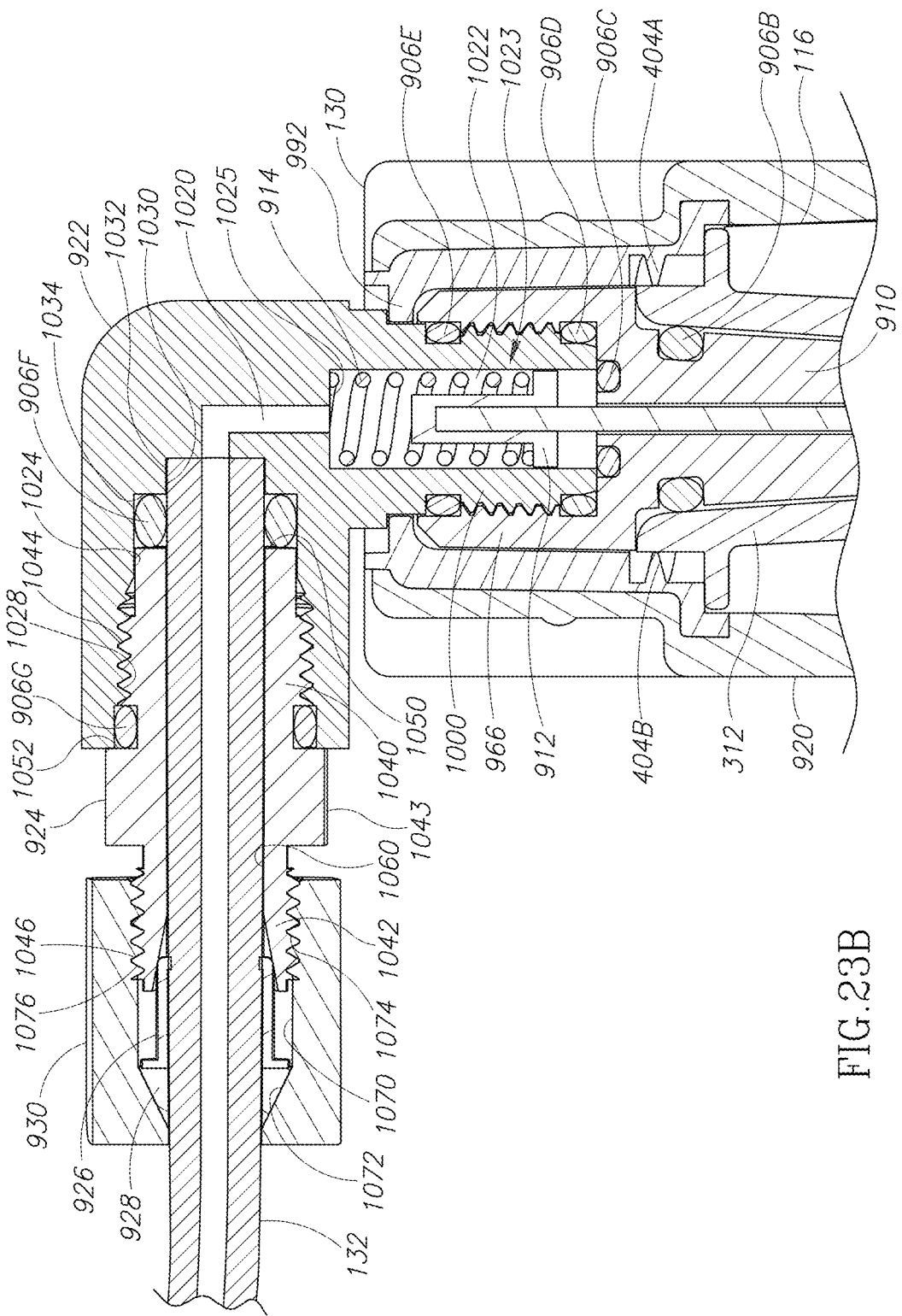
FIG. 23B is an enlargement of a portion of FIG. 23A.
Figure 25:
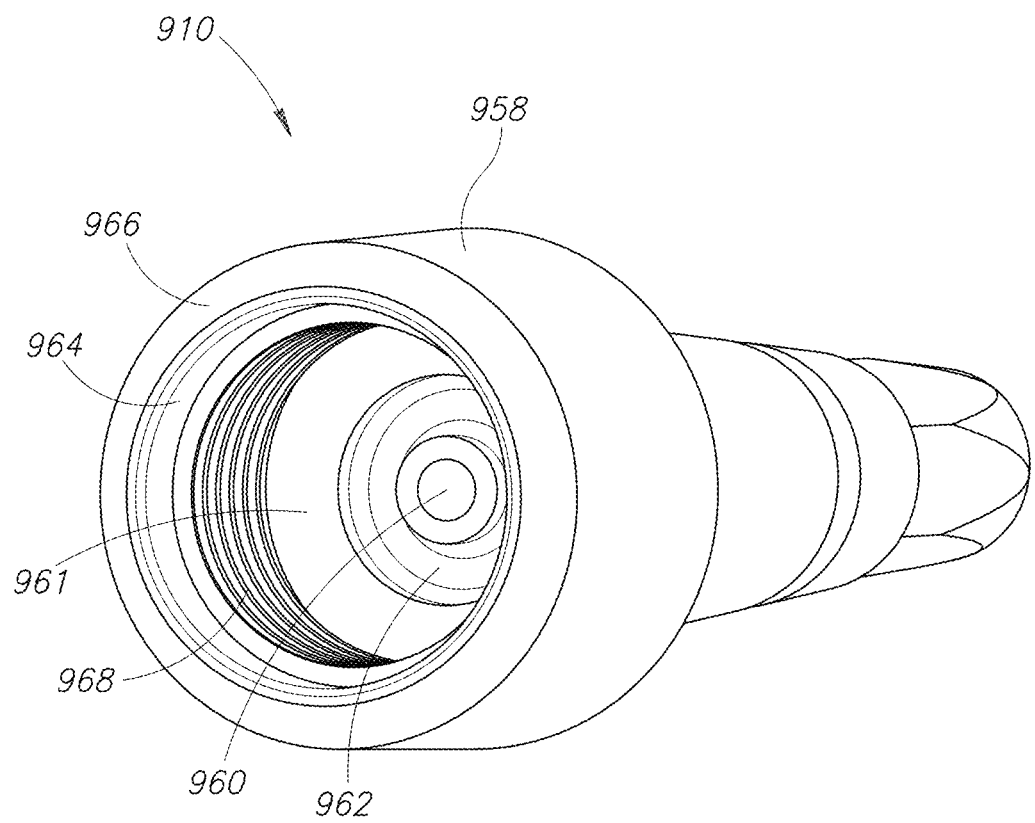
FIG. 25 is a perspective top view of a tapered injection nozzle of the injection probe assembly.

Referring to FIG. 25, the tapered injection nozzle 910 has a chamber 964 formed in the second end portion 958. The tapered injection nozzle 910 has a surface 961 that faces upwardly into the chamber 964. An annular shaped groove 962 is formed in the upwardly facing surface 961. The groove 962 is concentric with and spaced apart from the internal through-channel 960. Referring to FIG. 23B, as will be described below, the chamber 964 (see FIG. 25) is configured to house the inner cap 912, the biasing member 914, a portion of the elbow shaped connector 922, and the seals 906C-906E. Referring to FIG. 23A, the internal through-channel 960 opens into the chamber 964 (see FIG. 25) and the elongated pin 902 extends outwardly from the internal through-channel 960 into the chamber 964. Referring to FIG. 25, the chamber 964 is defined by a sidewall 966 with inside threads 968 formed therein.

Referring to FIG. 22, in the embodiment illustrated, the tapered injection nozzle 910 is generally cone shaped and has a generally circular cross sectional shape. Between its first and second end portions 956 and 958, the tapered injection nozzle 910 has first and second spaced apart grooves 970A and 970B that each extend circumferentially along its outer surface 972. The first groove 970A is nearer the free first end portion 956 than the second groove 970B. The first and second grooves 970A and 970B are configured to at least partially receive the seals 906A and 906B, respectively. In the embodiment illustrated, the seals 906A and 906B have been implemented as O-rings.

Referring to FIG. 23A, in embodiments that include the LPI 312, the seals 906A and 906B form fluid tight seals between the tapered injection nozzle 910 and the portion of the LPI 312 lining the tapered channel 376 when the injection probe assembly 130 is inserted into the injection port 116. Similarly, in embodiments that omit the LPI 312, the seals 906A and 906B form fluid tight seals between the tapered injection nozzle 910 and the MIC body 310' (see FIG. 18) along the tapered channel 376' (see FIG. 18) when the injection probe assembly 130 is inserted into the injection port 116. Thus, as illustrated by the bold lines TF1 and TF2 in FIG. 24B, the seal 906A prevents the treatment fluid 120 from flowing backwardly and into the outside environment through the injection port 116. At the same time, referring to FIG. 24A, as illustrated by the bold lines W1 and W2, the seal 906B prevents the water 940 from flowing into the MIC 100 from the outside environment via the injection port 116.

Referring to FIG. 22, the tapered injection nozzle 910 passes partially through the outer cap 920 and is coupled at its second end portion 958 to the elbow shaped connector 922 inside the outer cap 920. As may be seen in FIG. 23B, the elongated pin 902 is coupled to the inner cap 912 inside the chamber 964 (see FIG. 25). The inner cap 912 anchors the elongated pin 902 inside the chamber 964 and prevents the tethered end 950 (see FIG. 22) of the elongated pin 902 from exiting the chamber 964 through the internal through-channel 960 (see FIGS. 23A and 25). The biasing member 914 abuts the inner cap 912 and applies a biasing force thereto that biases the inner cap 912 (and the elongated pin 902) toward the free first end portion 956 (see FIG. 22) of the tapered injection nozzle 910.

In the embodiment illustrated, the seals 906C-906E have been implemented as O-rings. The seal 906C is positioned inside the groove 962 (see FIG. 25) within the chamber 964 (see FIG. 25). The seals 906D and 906E are positioned between the elbow shaped connector 922 and the tapered injection nozzle 910 within the chamber 964 (see FIG. 25). Referring to FIG. 24B, as illustrated by the bold lines TF3 and TF4, the seal 906D helps prevent the treatment fluid 120 from exiting the injection probe assembly 130 through any gaps that may exist between the tapered injection nozzle 910 and the elbow shaped connector 922. Referring to FIG. 24A, as illustrated by the bold lines W1 and W2, the seal 906E helps prevent the water 940 from infiltrating into the injection probe assembly 130 through any gaps that may exist between the tapered injection nozzle 910 and the elbow shaped connector 922.

Referring to FIG. 23A, the outer cap 920 has an open-ended through-channel 980 formed therein that extends between first and second openings 982 and 984. The injection port 116 may be inserted into the through-channel 980 through the first opening 982. The elbow shaped connector 922 extends into the through-channel 980 through the second opening 984. The tapered injection nozzle 910 is connected to the elbow shaped connector 922 inside the through-channel 980 and extends outwardly from the through-channel 980 through the first opening 982.

Figure 26:
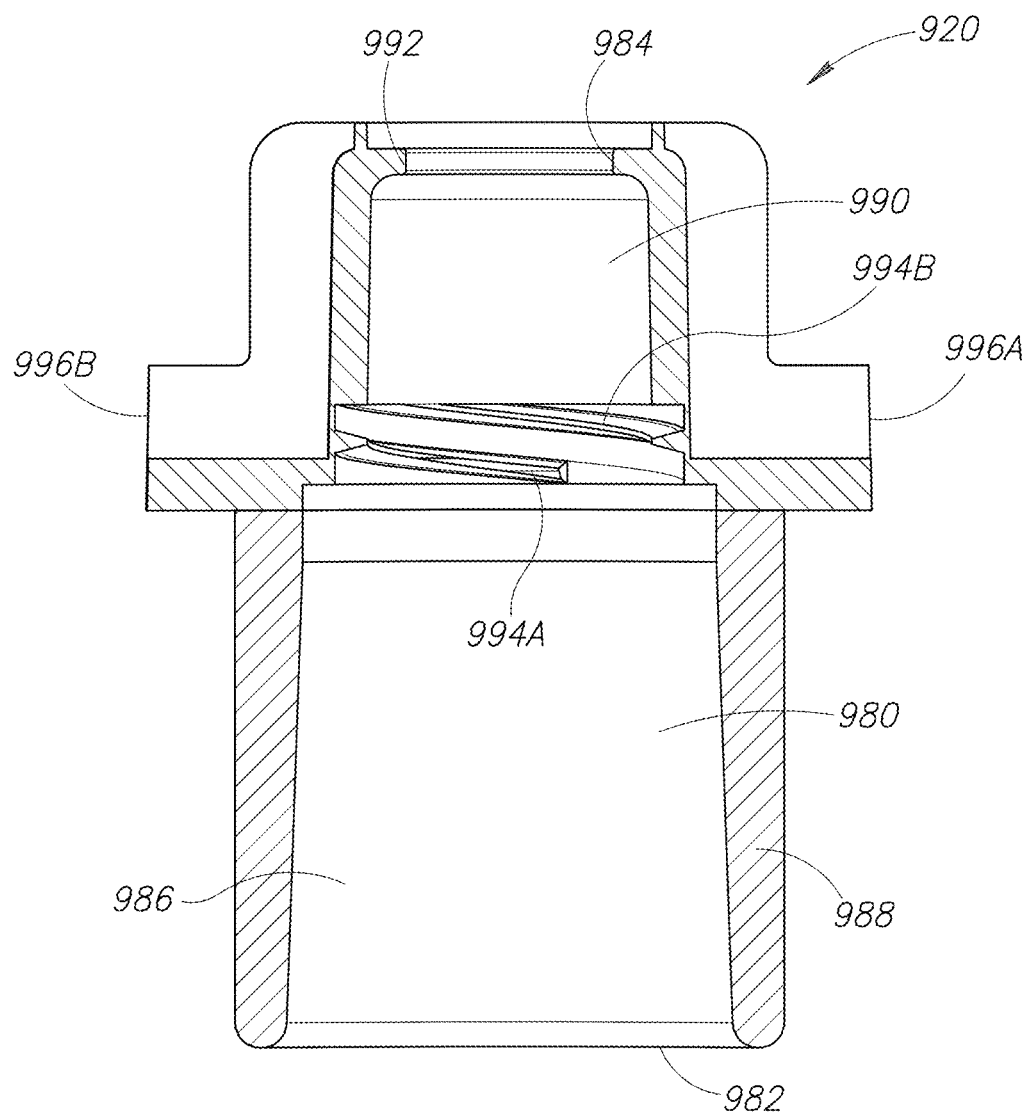
FIG. 26 is a cross-sectional side view of an outer cap of the injection probe assembly.

Referring to FIG. 26, a first channel portion 986 adjacent the first opening 982 is defined by a skirt portion 988. The first channel portion 986 is configured to receive the outer sidewall 368 of the injection port 116 formed in the insulation portion 334 of the MIC body 310. The skirt portion 988 is semi-conductive and covers the outer sidewall 368. Referring to FIG. 23A, in embodiments including the LPI 312, the skirt portion 988 contacts the semi-conductive outer insulation shield 332 of the MIC body 310 surrounding the base of the outer sidewall 368. Referring to FIG. 18, in embodiments that omit the LPI 312, the skirt portion 988 contacts the semi-conductive outer insulation shield 332' of the MIC body 310' surrounding the base of the outer sidewall 368'.

The outer cap 920 differs from outer insulated coverings included on conventional injection probes (not shown), which are typically constructed from only electrically insulating material(s). Because conventional insulated coverings are constructed from only electrically insulating material(s), they suffer from at least two significant limitations. First, outer insulated coverings prevent the connection formed between the conventional cap and the injection component from being approved or rated for submersible applications in which a voltage differential between the voltage in the cable conductor and ground voltage is 8.8 kilovolts (kV) to 20.5 kV (which is commonly found in medium voltage systems). Second, outer insulated coverings allow a capacitive charge to be created at and around the injection port of the injection component. This capacitive charge could injure a human operator or lineman.

Referring to FIG. 26, the through-channel 980 has a second channel portion 990 opposite the first channel portion 986. Referring to FIG. 23A, the second channel portion 990 (see FIG. 26) is configured to house the second end portion 958 of the tapered injection nozzle 910. The second end portion 958 is too large to pass through the second opening 984 (see FIG. 26) of the outer cap 920. Thus, when the second end portion 958 of the tapered injection nozzle 910 is coupled to the elbow shaped connector 922, a portion 992 (see FIGS. 23B and 26) of the outer cap 920 adjacent the second opening 984 is sandwiched between the second end portion 958 and the elbow shaped connector 922.

Referring to FIG. 21, as mentioned above, the LPI 312 includes the connectors 404A and 404B (e.g., a pair of projections of a bayonet type connector). Referring to FIG. 26, the outer cap 920 includes connectors 994A and 994B configured to mate with the connectors 404A and 404B (see FIG. 21), respectively. In the embodiment illustrated, the connectors 994A and 994B are implemented as grooves configured to receive the connectors 404A and 404B. The connectors 994A and 994B are positioned inside the through-channel 980 between its first and second channel portions 986 and 990.

Optionally, one or more gripping projections 996A and 996B extend outwardly away from the through-channel 980. In the embodiment illustrated, the gripping projections 996A and 996B are substantially collinear and orthogonal to the through-channel 980. The outer cap 920 may be gripped by the gripping projections 996A and 996B and twisted. The gripping projections 996A and 996B may be used to rotate the outer cap 920 such that the connectors 994A and 994B receive and mate with the connectors 404A and 404B (see FIG. 21), respectively, when twisted in a first direction, and disengage with the connectors 404A and 404B, respectively, when twisted in a second direction opposite the first direction. In other words, one of the gripping projections 996A and 996B is pushed upon at the same time the other of the gripping projections 996A and 996B is pulled upon. This configuration helps overcome adhesion between the outer cap 920 and the MIC 100.

In the embodiment illustrated, the gripping projections 996A and 996B are positioned with respect to the connectors 994A and 994B to provide a visual indication of whether the outer cap 920 is coupled to or uncoupled from the MIC 100. In the embodiment illustrated, when the substantially collinear gripping projections 996A and 996B are substantially aligned with the MIC axis 340 (see FIG. 5), the outer cap 920 is uncoupled from the MIC 100. On the other hand, the outer cap 920 is coupled to the MIC 100 when the substantially collinear gripping projections 996A and 996B are substantially orthogonal to the MIC axis 340 (see FIG. 5).

Referring to FIG. 22, the elbow shaped connector 922 has a first leg 1000 and a second leg 1002. In the embodiment illustrated, the first leg 1000 is approximately orthogonal to the second leg 1002. The first leg 1000 is connected to the tapered injection nozzle 910 (and the outer cap 920) and the second leg 1002 is connected to both the fitting 924 and the tube 132.

Figure 27:
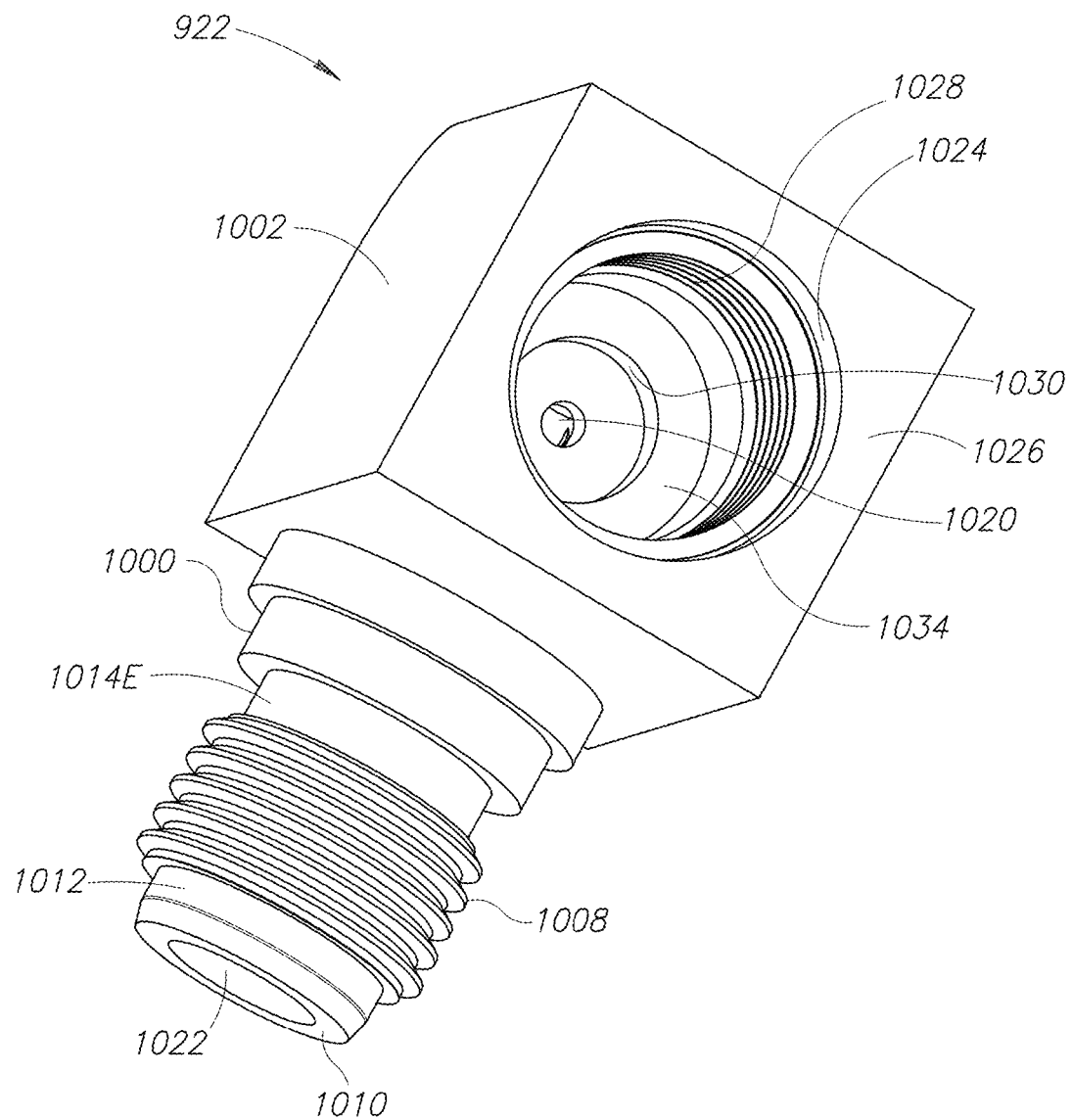
FIG. 27 is a perspective view of an elbow shaped connector of the injection probe assembly.

Referring to FIG. 27, the first leg 1000 is configured to be at least partially received inside the chamber 964 (see FIG. 25). The first leg 1000 has outside threads 1008 configured to threadedly engage the inside threads 968 (see FIG. 25) of the chamber 964 (see FIG. 25). The first leg 1000 has a lower edge 1010 configured to capture or trap the seal 906C (see FIG. 23B) within the groove 962 (see FIG. 25) when the first leg 1000 is fully threaded into the chamber 964 (see FIG. 25). The first leg 1000 has a recessed portion 1012 configured to fit inside the seal 906D (see FIG. 23B). Referring to FIG. 23B, when the first leg 1000 is fully threaded into the chamber 964 (see FIG. 25), the recessed portion 1012 (see FIG. 27) presses the seal 906D against the sidewall 966 (see FIG. 25) and forms a fluid tight seal between the first leg 1000 and the sidewall 966 of the chamber 964. Returning to FIG. 27, the first leg 1000 has a groove 1014E formed therein configured to at least partially receive the seal 906E (see FIG. 22). Referring to FIG. 23B, when the first leg 1000 is fully threaded into the chamber 964 (see FIG. 25), the seal 906E is pressed against the sidewall 966.

As shown in FIG. 23B, an L-shaped internal through-channel 1020 extends through the elbow shaped connector 922. Referring to FIG. 27, the through-channel 1020 opens into an open valve chamber 1022 in the first leg 1000 and an open chamber 1024 in the second leg 1002. Referring to FIG. 23B, the valve chamber 1022 is configured to house the inner cap 912 (with the tethered end 950 of the elongated pin 902 attached thereto) and the biasing member 914. The biasing member 914 is positioned between the inner cap 912 and an interior surface 1025 of the valve chamber 1022.

Together the first leg 1000 and the second end portion 958 of the tapered injection nozzle 910 functions as a valve housing for a poppet valve 1023 that is opened by the elongated pin 902. The inner cap 912, which is attached to the elongated pin 902, functions as a moveable poppet member of the poppet valve 1023. The biasing member 914 biases the inner cap 912 toward a closed position. Thus, when the injection probe pin 136 (see FIGS. 1A, 21, and 22) is not pressing against the biasing member 632 (see FIGS. 7, 11A-13 and 23A), the clip 634 (see FIGS. 7, 11A, 12A, and 12B), or the poppet member 646 (see FIGS. 11A, 12A-14, 16, and 17) of the VIA assembly 320, the biasing member 914 may bias the poppet valve 1023 closed. The biasing member 914 also allows the injection probe pin 136 (see FIGS. 1A, 21, and 22) to open the poppet valve 1023 when the injection probe pin 136 is pressed against different surfaces located at different distances from the free first end portion 956 of the tapered injection nozzle 910. For example, the injection probe pin 136 is operable to open the poppet valve 1023 when pressed against the biasing member 632, the clip 634, or the poppet member 646. Similarly, the injection probe pin 136 is operable to open the poppet valve 1023 even if the size and/or position of the components varies due to manufacturing inconsistencies.

In the closed position, the inner cap 912 compresses the seal 906C, which forms a fluid tight seal between the inner cap 912 and the second end portion 958 of the tapered injection nozzle 910. When the elongated pin 902 is pressed outwardly with sufficient force to overcome an inwardly directed biasing force of the biasing member 914, the inner cap 912 moves outwardly away from the seal 906C and the poppet valve 1023 opens. The inner cap 912 is small enough to allow the treatment fluid 120 to flow around the inner cap 912, through the valve chamber 1022, and into the internal through-channel 960 when the poppet valve 1023 is open.

The open chamber 1024 is configured to receive a portion of the fitting 924, the tube 132, and the seals 906F and 906G. In the embodiment illustrated, the seals 906F and 906G have been implemented as O-rings. The seal 906F is positioned inside the open chamber 1024 between the tube 132, and the fitting 924. Referring to FIG. 24B, as illustrated by the bold lines TF5 and TF6, the seal 906F helps prevent the treatment fluid 120 from exiting the injection probe assembly 130 through any gaps that may exist between the tube 132, the elbow shaped connector 922, and the fitting 924. The seal 906F is configured to withstand higher pressures (e.g., about 600 psi) than the ferrule sleeve 926. This configuration protects the ferrule sleeve 926 (which, depending upon the implementation details, may withstand about 220 psi) when operating at higher pressures (e.g., about 600 psi) and takes advantage of the ferrule sleeve's ability to mechanically hold the tube 132.

Referring to FIG. 24A, the seal 906G is positioned between the elbow shaped connector 922 and the fitting 924 within the open chamber 1024 (see FIG. 27). As illustrated by the bold lines W3 and W4, the seal 906G helps prevent the water 940 from entering the injection probe assembly 130 through any gaps that may exist between the elbow shaped connector 922 and the fitting 924.

Returning to FIG. 27, the open chamber 1024 is defined by a sidewall 1026 with inside threads 1028 formed therein. Referring to FIG. 23B, the open chamber 1024 has a narrower portion 1030 configured to receive an end 1032 (see FIG. 22) of the tube 132 (see FIG. 22). A shoulder 1034 is formed in the open chamber 1024 between the inside threads 1028 and the narrower portion 1030. The seal 906F is positioned against the shoulder 1034. The end 1032 of the tube 132 passes through the seal 906F and terminates inside the narrower portion 1030. The seal 906F is pressed against the shoulder 1034 by the fitting 924.

The fitting 924 has a first threaded end 1040 opposite a second threaded end 1042. The fitting 924 also has an intermediate portion 1043 positioned between the first and second threaded ends 1040 and 1042. The intermediate portion 1043 has a generally hexagonal cross-sectional shape that may be gripped so that torque may be applied to the fitting 924 to rotate the fitting 924 or hold the fitting 924 in place.

The first and second threaded ends 1040 and 1042 have outside threads 1044 and 1046, respectively. The outside threads 1044 of the first threaded end 1040 are configured to mate with the inside threads 1028 of the elbow shaped connector 922. The first threaded end 1040 has an edge surface 1050 that abuts and presses on the seal 906F when the first threaded end 1040 is fully threaded into the open chamber 1024. The fitting 924 has a stop portion 1052 spaced apart from the outside threads 1044. The seal 906G is positioned between the outside threads 1044 and the stop portion 1052. The stop portion 1052 traps the seal 906G inside the open chamber 1024 when the first threaded end 1040 is fully threaded into the open chamber 1024. The second threaded end 1042 is configured to mate with the connector 930. The fitting 924 has a through-channel 1060 configured to allow the tube 132 to pass therethrough.

The connector 930 has an open-ended through-channel 1070 with a tapered end 1072 opposite a threaded end 1074. The ferrule cone 928 is positioned inside the tapered end 1072. The ferrule sleeve 926 extends from the ferrule cone 928 toward the threaded end 1074. The tube 132 passes through the ferrule cone 928 and the ferrule sleeve 926 inside the through-channel 1070. Together, the ferrule cone 928 and the ferrule sleeve 926 line part of the through-channel 1070 and help grip the tube 132. The threaded end 1074 has inside threads 1076 configured to mate with the outside threads 1046 of the second threaded end 1042 of the fitting 924. The ferrule sleeve 926 forms a fluid tight seal between the fitting 924 and the tube 132. Thus, the ferrule sleeve 926 helps prevent the water 940 (see FIGS. 24A and 24B) from entering the injection probe assembly 130 and the MIC 100 (see FIG. 21). The ferrule cone 928 and ferrule sleeve 926 also helps hold the tube 132 in place but, depending upon the implementation details, may withstand pressures up to only about 220 psi.

Referring to FIG. 24B, when the treatment fluid 120 is injected using the injection probe assembly 130, the pressurized treatment fluid 120 travels through the tube 132 and enters the L-shaped internal through-channel 1020 formed in the elbow shaped connector 922. The treatment fluid 120 next enters the chamber 964 of the tapered injection nozzle 910 and flows into the internal through-channel 960 alongside the elongated pin 902. Then, the treatment fluid 120 exits the internal through-channel 960 and enters the first through channel 416 in embodiments that include the LPI 312 or the tapered channel 376' (see FIG. 18) in embodiments that omit the LPI 312. Optionally, the treatment fluid 120 may pass through the RFP plug 314 (see FIGS. 3, 4, and 23A), which may be positioned within the first through channel 416 or the tapered channel 376'. Then, the treatment fluid 120 enters into the fluid chamber 600 (see FIGS. 6B and 12A-13) in embodiments that include the LPI 312 (and the VIA assembly 320) or the interior chamber 366' (see FIG. 18) in embodiments that omit the LPI 312.

Referring to FIG. 26, by coupling the injection probe assembly 130 to the injection port 116 using the connectors 994A and 994B and the connectors 404A and 404B, the connection formed between the injection probe assembly 130 and the injection port 116 may withstand higher injection pressures (e.g., greater than about 30 psi) than connections formed between conventional injection assemblies and an injection port, which are typically interference fits. For example, the connection between the injection probe assembly 130 and the injection port 116 may remained sealed and not leak when the treatment fluid 120 is injected at a pressure within a range of about 30 psi to about 1000 psi. Further, this connection will remained sealed and not leak at pressures below 30 psi.

The connectors 994A and 994B are configured to break before the connectors 404A and 404B. In this manner, the outer cap 920 will not damage the LPI 312. Further, the outer cap 920 may absorb external forces and help shield the LPI 312 from damage.

The injection probe assembly 130 may be characterized as including double fluid seals at all points of separation between the voltage of the cable conductor 202 and ground voltage to prevent potentially conductive fluids (the treatment fluid 120 and the water 940) from coming into close contact with one another when at least a portion of the MIC 100, the cable 110, the cable accessory 112, and/or injection probe assembly 130 is submerged in the water 940. For example, the seals 906A and 906B may be characterized as being a first pair of seals that separate the treatment fluid 120 from the water 940. Similarly, the seals 906D and 906E may be characterized as being a second pair of seals that separate the treatment fluid 120 from the water 940. Finally, the seals 906F and 906G may be characterized as being a third pair of seals that separate the treatment fluid 120 from the water 940.

Also, referring to FIG. 1A, the injection probe assembly 130 does not have a pulling eyelet (like either of the pulling eyelets 258 and 260) that can be mistaken for the pulling eyelet 258 of the cap 257 or the pulling eyelet 260 of the cable accessory 112. Thus, the injection probe assembly 130 will not be mistakenly removed by a lineman who is unfamiliar with injection components. This improves safety because removing a conventional injection assembly that is covering an injection port alongside an energized cable has been known to cause dangerous flashovers. Further, because the injection probe assembly 130 does not have a pulling eyelet, the injection probe assembly 130 has a lower profile than injection assemblies or devices that include such eyelets, which is advantageous in a space constricted installation where the pulling eyelet may interfere.

Cap

Referring to FIG. 1A, as mentioned above, the skirt portion 144 of the cap 140 is constructed from an electrically semi-conductive material. A conventional cap is typically coupled to an injection component by a detent ring (not shown) that has been known to separate from the injection component during normal injection operations performed at pressures not greater than 30 psi. Due to elevation changes and thermal expansion, pressures within the cable and at its terminations can exceed the injection pressure.

As mentioned above, the cap 140 may be used to close the injection port 116 and seal it from the outside environment whenever the injection probe assembly 130 (or other injection device) is not connected to the injection port 116. When the cap 140 is attached to the injection port 116, the stem portion 142 extends into the injection port 116 and prevents fluid from exiting the MIC 100 through the injection port 116 thereby isolating and insulating the interior of the MIC 100 from the outside environment. The cap 140 may remain in place on the injection port 116 until the completion of a soak period (e.g., about 60 days to about 90 days), if required. By way of another non-limiting example, the cap 140 may remain in place on the injection port 116 during the electrical service life of the MIC 100.

Figure 31:
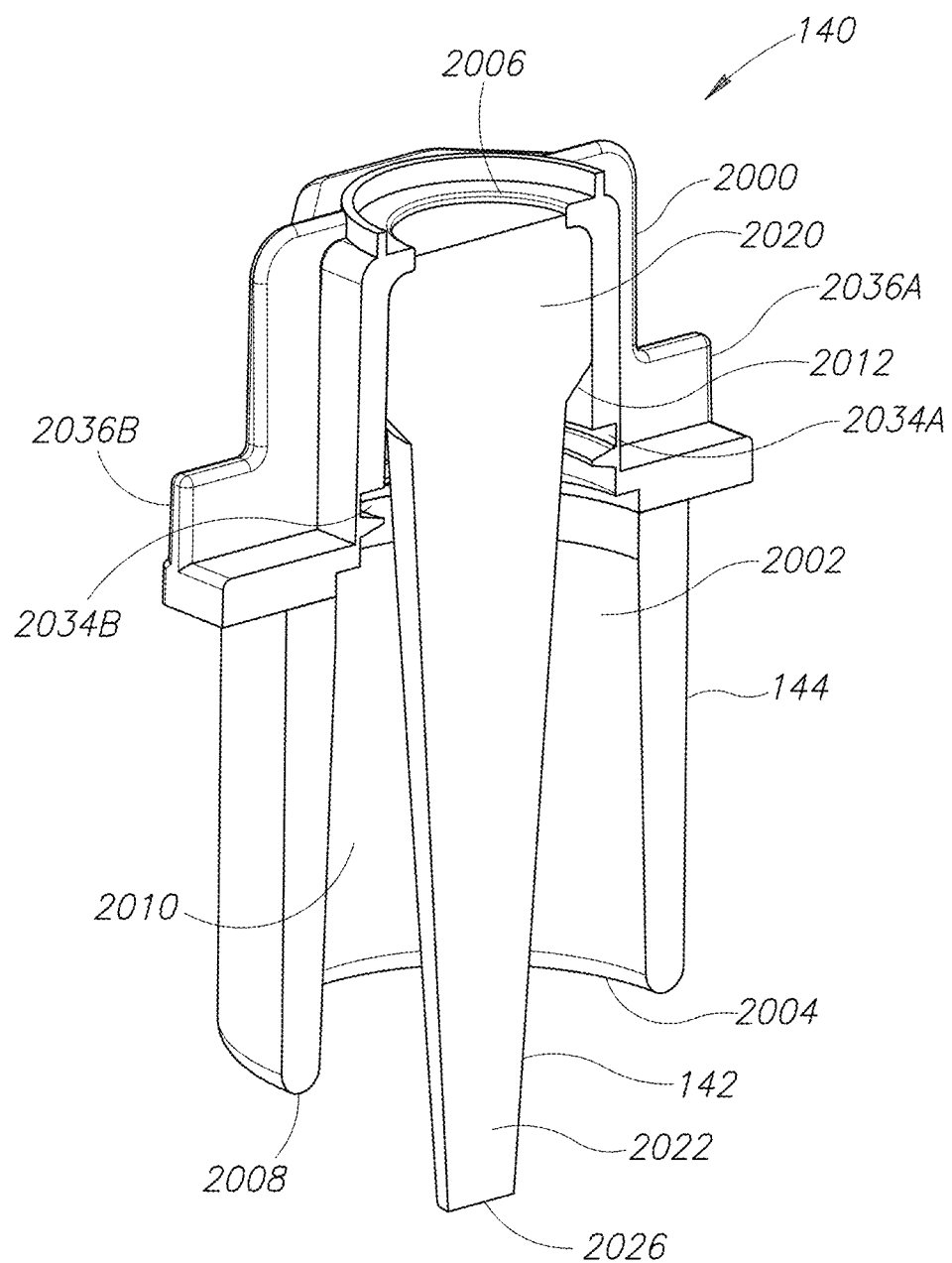
FIG. 31 is a perspective sectional view of the cap.

Referring to FIG. 31, the cap 140 includes an outer cap 2000 that is substantially identical to the outer cap 920 (see FIGS. 21-23A and 26) of the injection probe assembly 130. The skirt portion 144 of the cap 140 is a subcomponent of the outer cap 2000 and is substantially identical to the skirt portion 988 (see FIGS. 23A and 26) of the outer cap 920 (see FIGS. 21-23A and 26).

Figure 30:
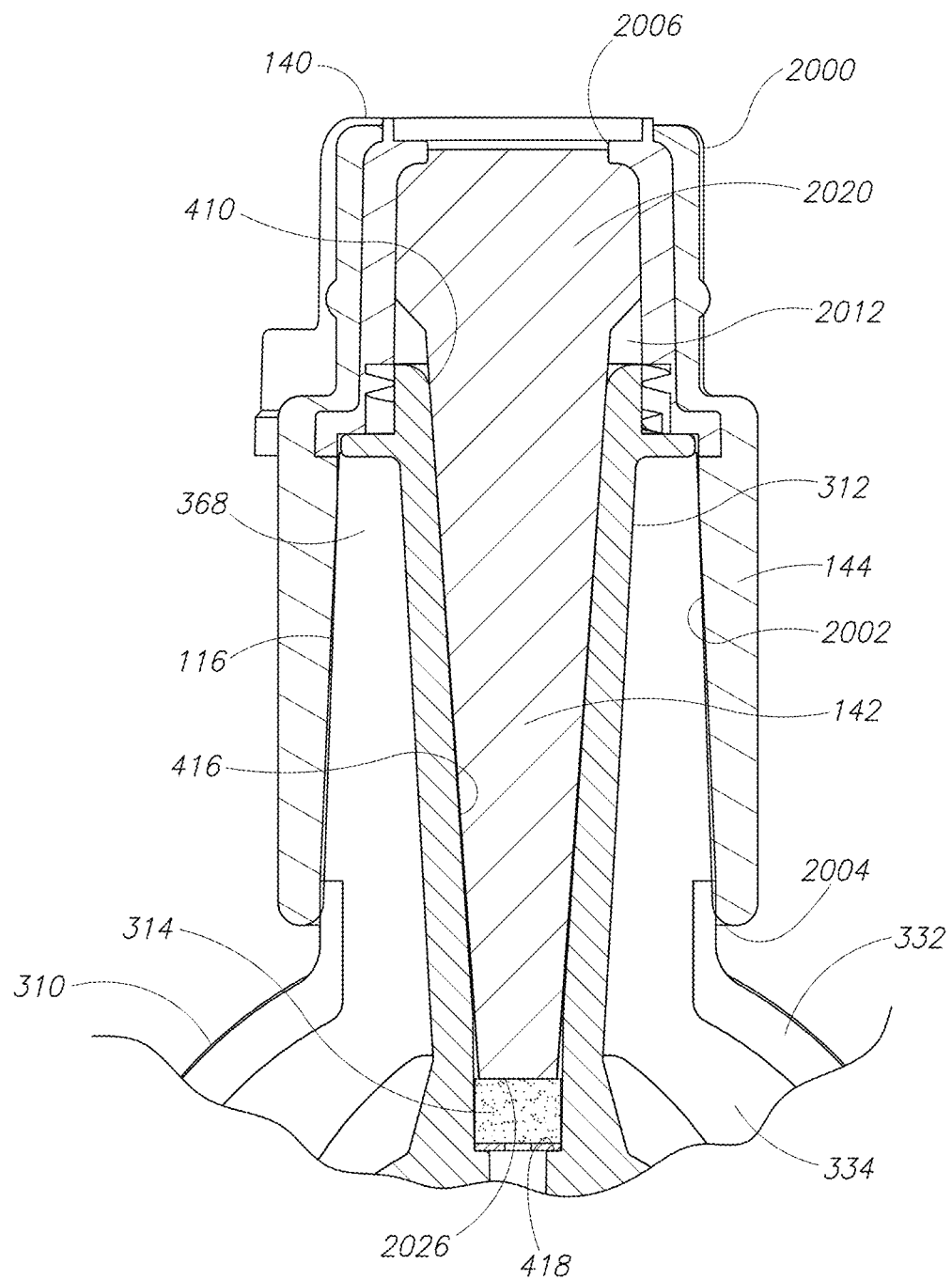
FIG. 30 is a lateral cross-sectional view of the cap installed on the injection port of the MIC of FIG. 1A.

The outer cap 2000 has an open-ended through-channel 2002 formed therein that extends between first and second openings 2004 and 2006. The skirt portion 144 has a lower edge 2008 that defines the first opening 2004 into the through-channel 2002. As shown in FIG. 30, the injection port 116 may be inserted into the through-channel 2002 through the first opening 2004. Returning to FIG. 31, a first channel portion 2010 adjacent the first opening 2004 is defined by the skirt portion 144. The through-channel 2002 has a second channel portion 2012 opposite the first channel portion 2010.

The stem portion 142 has a tethered end 2020 opposite a free end 2022. The tethered end 2020 is attached to the outer cap 2000 inside the second channel portion 2012 and closes the second opening 2006. The stem portion 142 extends from its tethered end 2020 through the through-channel 2002, exits therefrom through the first opening 2004, and terminates at an end surface 2026 positioned beyond the lower edge 2008 of the skirt portion 144.

A semi-conductive outer coating (not shown), such as a semi-conductive layer of paint, is applied to the outer surface of the cap 140. This outer coating (not shown) covers the tethered end 2020 of the stem portion 142 within the second opening 2006. Thus, the entire exposed outer surface of the cap 140 is semi-conductive.

Figure 28:
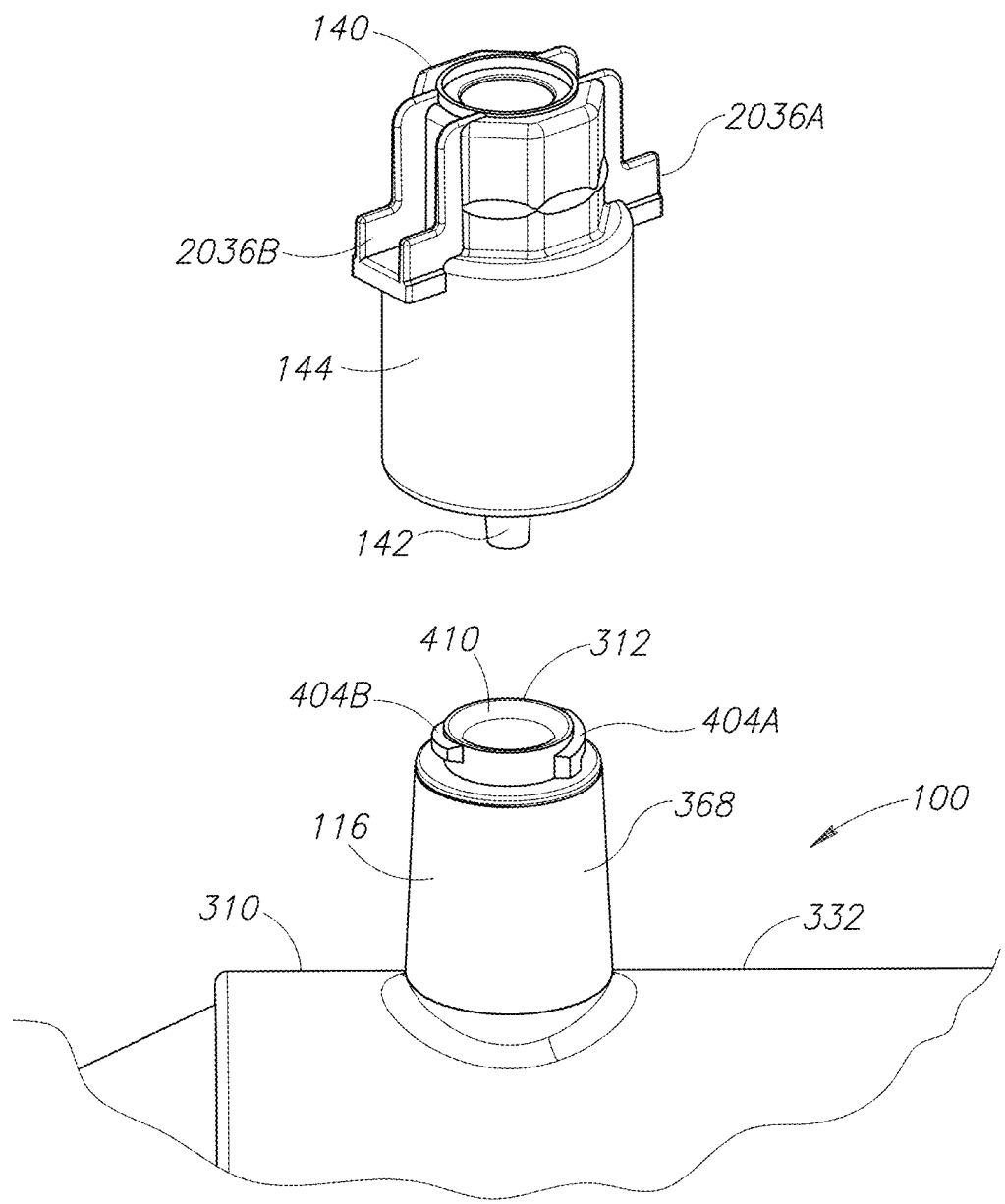
FIG. 28 is a perspective side view of a cap being inserted into the injection port of the MIC of FIG. 1A.

Referring to FIG. 30, when the cap 140 is attached to the injection port 116, the stem portion 142 fills and closes the outer opening 410 in embodiments that include the LPI 312 or the outer opening 370' (see FIG. 18) in embodiments that omit the LPI 312. Together, the outer cap 2000 and the stem portion 142 completely cover and seal the injection port 116. Referring to FIG. 28, the seal formed between the cap 140 and the injection port 116 is fluid tight and prevents any fluids (e.g., the water 940 illustrated in FIGS. 24A and 24B) outside the cap 140 and/or the MIC 100 from entering the injection port 116.

Referring to FIG. 28, in embodiments that include the LPI 312, the stem portion 142 is inserted into the portion of the LPI 312 lining the injection port 116. In other words, referring to FIG. 30, the stem portion 142 is inserted into the tapered first through channel 416 through the outer opening 410. If the RFP plug 314 is positioned inside the first through channel 416, the end surface 2026 of the stem portion 142 may displace and/or compress the RFP plug 314 (against the shoulder 418) inside the first through channel 416.

On the other hand, referring to FIG. 18, in embodiments that omit the LPI 312, the stem portion 142 (see FIGS. 1A, 28, 30, and 31) is inserted into the tapered channel 376' through the outer opening 370'. If the RFP plug 314 (see FIGS. 3, 4, and 30) is positioned inside the tapered channel 376', the end surface 2026 (see FIGS. 30 and 31) of the stem portion 142 may displace and/or compress the RFP plug 314 (against the outer sidewall 368' adjacent the inner opening 372' of the tapered channel 376') inside the tapered channel 376'.

Referring to FIG. 30, as mentioned above, the cap 140 may be characterized as being permanent because the cap 140 closes the injection port 116 electrically. The stem portion 142 is constructed from electrically insulating material, and the skirt portion 144 is constructed from electrically semi-conductive material. The stem portion 142 seals the first through channel 416 or the tapered channel 376' (see FIG. 18) with electrically insulating material. In embodiments that include the LPI 312, the outer sidewall 368 (formed in the insulation portion 334) is received inside the first channel portion 2010 (see FIG. 31) between the stem portion 142 and the skirt portion 144. On the other hand, referring to FIG. 18, in embodiments that omit the LPI 312, the outer sidewall 368' (formed in the insulation portion 334') of the MIC body 310' is received inside the first channel portion 2010 (see FIG. 31) between the stem portion 142 and the skirt portion 144. In this manner, the skirt portion 144 covers the insulating outer sidewall 368 or 368' with an electrically semi-conductive material. Further, along its lower edge 2008, the skirt portion 144 contacts the semi-conductive outer insulation shield 332 of the MIC body 310 (which may be connected to ground by a ground wire) in embodiments that include the LPI 312 or the semi-conductive outer insulation shield 332' (see FIG. 18) of the MIC body 310' (which may be connected to ground by a ground wire) in embodiments that omit the LPI 312.

Referring to FIG. 31, in embodiments that include the LPI 312, the cap 140 includes connectors 2034A and 2034B configured to mate with the connectors 404A and 404B (see FIG. 28), respectively, of the LPI 312. The connectors 2034A and 2034B may be substantially identical to the connectors 994A and 994B (see FIGS. 23B and 26). The connectors 2034A and 2034B are positioned between the first and second channel portions 2010 and 2012.

Referring to FIG. 30, by coupling the cap 140 to the injection port 116 using the connectors 2034A and 2034B (see FIG. 31) and the connectors 404A and 404B (see FIG. 28), the connection formed between the cap 140 and the injection port 116 may withstand higher injection pressures (e.g., greater than about 30 psi) than connections formed between conventional caps and an injection port, which are typically interference fits or detent-type connections. For example, the connection between the cap 140 and the injection port 116 may remained sealed and not leak when the treatment fluid 120 has been injected at a pressure within a range of about 30 psi to about 1000 psi. Further, this connection will remain sealed and not leak at pressures below 30 psi.

The connectors 2034A and 2034B (see FIG. 31) are configured to break before the connectors 404A and 404B. In this manner, the cap 140 will not damage the LPI 312. Further, the cap 140 may absorb external forces and help shield the LPI 312 from damage.

Figure 29:
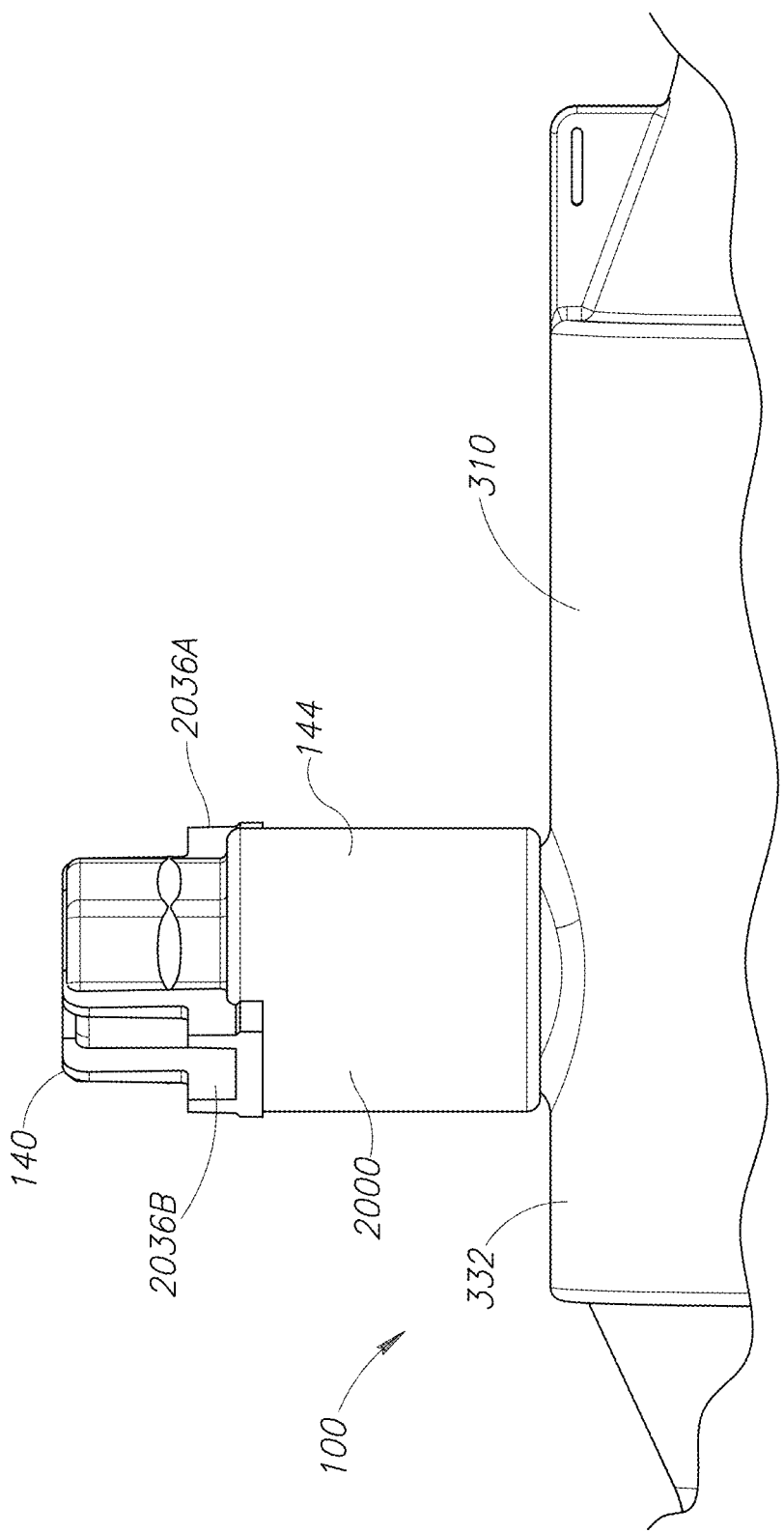
FIG. 29 is a side view of the cap installed on the injection port of the MIC of FIG. 1A.

Referring to FIGS. 28 and 29, optionally, the cap 140 includes one or more gripping projections 2036A and 2036B substantially identical to the gripping projections 996A and 996B (see FIG. 26). The cap 140 may be gripped by the gripping projections 2036A and 2036B and twisted. In other words, one of the gripping projections 2036A and 2036B is pushed upon at the same time the other of the gripping projections 2036A and 2036B is pulled. This configuration helps overcome adhesion between the cap 140 and the MIC 100. The gripping projections 2036A and 2036B may be used to rotate the cap 140 such that the connectors 2034A and 2034B (see FIG. 31) receive and mate with the connectors 404A and 404B (see FIG. 28), respectively, when twisted in a first direction, and disengage with the connectors 404A and 404B, respectively, when twisted in a second direction opposite the first direction.

In the embodiment illustrated, the gripping projections 2036A and 2036B are positioned with respect to the connectors 2034A and 2034B (see FIG. 31) to provide a visual indication of whether the cap 140 is coupled to or uncoupled from the MIC 100. In the embodiment illustrated, when the substantially collinear gripping projections 2036A and 2036B are substantially aligned with the MIC axis 340 (see FIG. 5), the cap 140 is uncoupled from the MIC 100. On the other hand, the cap 140 is coupled to the MIC 100 when the substantially collinear gripping projections 2036A and 2036B are substantially orthogonal to the MIC axis 340 (see FIG. 5).

Referring to FIG. 1A, the cap 140 does not have a pulling eyelet (like either of the pulling eyelets 258 and 260) that can be mistaken for the pulling eyelet 258 of the cap 257 or the pulling eyelet 260 of the cable accessory 112. Thus, the cap 140 will not be mistakenly removed by a lineman who is unfamiliar with injection components. This improves safety because removing a conventional cap that is covering an injection port alongside an energized cable has been known to cause dangerous flashovers. Further, because the cap 140 does not have a pulling eyelet, the cap 140 has a lower profile than caps that include such eyelets.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A cable accessory for injecting a fluid into a cable comprising a stranded conductor, the fluid being a cable treatment or rejuvenation fluid configured to be injected into the cable, the cable accessory comprising:
   a first end configured to be coupled to the cable;
   a second end configured to be coupled to an external cable accessory;
   a through-channel extending along a longitudinal axis between the first and second ends;
   an insulation portion;
   an inner semi-conductor portion positioned between the insulation portion and the through-channel, the inner semi-conductor portion lining a portion of the through-channel, the portion comprising an interior chamber configured to receive an end portion of the stranded conductor therein, the inner semi-conductor portion extending to the second end but not the first end;
   an injection port configured to introduce the fluid into the interior chamber, which allows the fluid to flow into the stranded conductor of the cable; and
   a valved injection adapter positioned inside the interior chamber and adjacent to the injection port, the valved injection adapter being openable by an injection probe to allow the fluid to flow therethrough into the interior chamber.

2. The cable accessory of claim 1, further comprising:
   a conductor configured to be positioned in the second end and to be surrounded by the inner semi-conductor portion, the conductor being couplable to the stranded conductor inside the interior chamber.

3. The cable accessory of claim 2, wherein the conductor is a solid metal rod.

4. The cable accessory of claim 2, wherein the conductor is a flexible stranded conductor.

5. The cable accessory of claim 1, further comprising:
   an outer body that comprises the insulation portion and the inner semi-conductor portion; and
   an inner body that is less permeable to the fluid than the outer body, the inner body lining a lined portion of the interior chamber.

6. The cable accessory of claim 1, wherein the cable accessory is rotatable by 360 degrees about the longitudinal axis with respect to the external cable accessory when the second end is coupled to the external cable accessory.

7. The cable accessory of claim 1, wherein the external cable accessory is a splice, a load-break elbow, a dead-break elbow, or a T-body.

8. The cable accessory of claim 1, further comprising:
   an outer semi-conductor portion, the first end being formed by the outer semi-conductor portion; and
   a conductor configured to be connected to the end portion of the stranded conductor inside the interior chamber, the second end comprising the conductor, which is configured to extend into the external cable accessory and form an electrical connection therewith.

9. The cable accessory of claim 8, wherein an outside portion of the second end is defined by the insulation portion.

10. The cable accessory of claim 9, wherein the outer semi-conductor portion is a first semi-conductor portion,
    the insulation portion is a first insulation portion,
    the external cable accessory comprises a second semi-conductor portion surrounding a second insulation portion, and
    the outside portion of the second end is configured to be received by the second insulation portion with the first semi-conductor portion contacting the second semi-conductor portion.

11. The cable accessory of claim 1, further comprising:
    an inner body lining the injection port and at least a lined portion of the interior chamber, the inner body being less permeable with respect to the fluid than the insulation portion and the inner semi-conductor portion.

12. The cable accessory of claim 1, further comprising:
a conductor configured to be connected to the end portion of the stranded conductor inside the interior chamber.

13. A cable accessory for use with an external cable accessory and a cable having a conductor, the cable accessory comprising:
a body portion defining a through-channel that extends along an axis from a first open end to a second open end, the first open end being configured to receive the conductor of the cable, the second open end being formed in a body end portion configured to be received inside the external cable accessory, the through-channel passing through an interior chamber formed in the body portion, an end portion of the conductor of the cable being positionable inside the interior chamber, the body portion comprising an insulation portion and an inner semi-conductor portion, the inner semi-conductor portion being positioned between the insulation portion and the through-channel, the inner semi-conductor portion lining a lined portion of the through-channel, the lined portion extending from the second open end to the interior chamber and excluding the first open end;
a conductive rod having a first portion extending outwardly from the body end portion through the second open end to be received inside the external cable accessory and to form an electrical connection therewith, the conductive rod having a second portion configured to be coupled to the end portion of the conductor to form an electrical connection between the conductor and the conductive rod, the second portion with the conductor coupled thereto being positionable inside the interior chamber with the first portion extending outward from the end portion;
an injection port opening into the interior chamber, a cable treatment or rejuvenation fluid being injectable into the conductor of the cable through the injection port; and
a valved injection adapter positioned inside the interior chamber and adjacent to the injection port, the valved injection adapter being openable by an injection probe into the injection port to allow the cable treatment or rejuvenation fluid to flow therethrough.

14. The cable accessory of claim 13, wherein the body end portion is a second end portion,
the body portion comprises a first end portion configured to be coupled to the cable,
the body portion comprises an outer semi-conductor portion, the first end portion being formed by the outer semi-conductor portion, and
an outside portion of the second end portion is defined by the insulation portion.

15. The cable accessory of claim 14, wherein the outer semi-conductor portion is a first semi-conductor portion,
the insulation portion is a first insulation portion,
the external cable accessory comprises a second semi-conductor portion surrounding a second insulation portion, and
the outside portion of the second end portion is configured to be received by the second insulation portion with the first semi-conductor portion contacting the second semi-conductor portion.

16. The cable accessory of claim 13, further comprising:
an inner body lining the injection port and at least a portion of the interior chamber, the inner body being less permeable with respect to the cable treatment or rejuvenation fluid than the insulation portion and the inner semi-conductor portion.

17. The cable accessory of claim 1, further comprising:
a first semi-conductor portion, the first end being formed by the first semi-conductor portion, the insulation portion being a first insulation portion, an outside portion of the second end being defined by the first insulation portion, the external cable accessory comprising a second semi-conductor portion surrounding a second insulation portion, and the outside portion of the second end being configured to be received by the second insulation portion with the first semi-conductor portion contacting the second semi-conductor portion.

18. A cable accessory for injecting a fluid into a cable comprising a stranded conductor, the fluid being a cable treatment or rejuvenation fluid configured to be injected into the cable, the cable accessory comprising:
a first end configured to be coupled to the cable;
a second end configured to be coupled to an external cable accessory, the external cable accessory comprising a second semi-conductor portion surrounding a second insulation portion;
a through-channel extending along a longitudinal axis between the first and second ends;
a first insulation portion, an outside portion of the second end being defined by the first insulation portion;
an inner semi-conductor portion positioned between the first insulation portion and the through-channel, the inner semi-conductor portion lining a portion of the through-channel, the portion comprising an interior chamber configured to receive an end portion of the stranded conductor therein, the inner semi-conductor portion extending to the second end but not the first end;
a first semi-conductor portion, the first end being formed by the first semi-conductor portion, the outside portion of the second end is configured to be received by the second insulation portion with the first semi-conductor portion contacting the second semi-conductor portion; and
an injection port configured to introduce the fluid into the interior chamber, which allows the fluid to flow into the stranded conductor of the cable.

19. The cable accessory of claim 18, further comprising:
a conductor configured to be connected to the end portion of the stranded conductor inside the interior chamber, the second end comprising the conductor, the inner semi-conductor portion surrounding the conductor at the second end, the conductor being configured to extend into the external cable accessory and form an electrical connection therewith.

20. The cable accessory of claim 19, wherein the conductor is a solid metal rod.

21. The cable accessory of claim 19, wherein the conductor is a flexible stranded conductor.

22. The cable accessory of claim 18, further comprising:
an outer body that comprises the first insulation portion and the inner semi-conductor portion; and
an inner body that is less permeable to the fluid than the outer body, the inner body lining a lined portion of the interior chamber.

23. The cable accessory of claim 18, further comprising:
an injection probe configured to be received inside the injection port.

24. The cable accessory of claim 18, wherein the cable accessory is rotatable by 360 degrees about the longitudinal axis with respect to the external cable accessory when the second end is coupled to the external cable accessory.

25. The cable accessory of claim 18, wherein the external cable accessory is a splice, a load-break elbow, a dead-break elbow, or a T-body.

26. The cable accessory of claim 18, further comprising:
an inner body lining the injection port and at least a lined portion of the interior chamber, the inner body being less permeable with respect to the fluid than the first insulation portion and the inner semi-conductor portion.

27. The cable accessory of claim 18, further comprising:
a conductor configured to be connected to the end portion of the stranded conductor inside the interior chamber.

28. A cable accessory for use with an external cable accessory and a cable, the external cable accessory comprising a second semi-conductor portion surrounding a second insulation portion, the cable having a conductor, the cable accessory comprising:
a body portion defining a through-channel that extends along an axis from a first open end to a second open end, the first open end being configured to receive the conductor of the cable, the body portion comprising a first end portion, a second end portion, a first semi-conductor portion, a first insulation portion, and an inner semi-conductor portion, the first end portion being configured to be coupled to the cable, the second open end being formed in a second end portion, the second end portion being configured to be received inside the external cable accessory, the first end portion being formed by the first semi-conductor portion, the through-channel passing through an interior chamber formed in the body portion, an end portion of the conductor of the cable being positionable inside the interior chamber, an outside portion of the second end portion is defined by the first insulation portion, the outside portion of the second end portion is configured to be received by the second insulation portion with the first semi-conductor portion contacting the second semi-conductor portion, the inner semi-conductor portion being positioned between the first insulation portion and the through-channel, the inner semi-conductor portion lining a lined portion of the through-channel, the lined portion extending from the second open end to the interior chamber and excluding the first open end;
a conductive rod having a first portion extending outwardly from the second end portion through the second open end to be received inside the external cable accessory and to form an electrical connection therewith, the conductive rod having a second portion configured to be coupled to the end portion of the conductor to form an electrical connection between the conductor and the conductive rod, the second portion with the conductor coupled thereto being positionable inside the interior chamber with the first portion extending outward from the end portion; and
an injection port opening into the interior chamber, a cable treatment or rejuvenation fluid being injectable into the conductor of the cable through the injection port.

29. The cable accessory of claim 28, further comprising:
an inner body lining the injection port and at least a portion of the interior chamber, the inner body being less permeable with respect to the cable treatment or rejuvenation fluid than the insulation portion and the inner semi-conductor portion.

30. The cable accessory of claim 28, wherein the through-channel extends along a longitudinal axis; and
the cable accessory is rotatable by 360 degrees about the longitudinal axis with respect to the external cable accessory when the second end portion is received inside the external cable accessory.

\* \* \* \* \*